US012786236B2

(12) United States Patent
Wu

(10) Patent No.: US 12,786,236 B2
(45) Date of Patent: Nov. 3, 2026

(54) MANAGING MULTICAST DATA COMMUNICATION

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 1 day.

(21) Appl. No.: 18/701,968

(22) PCT Filed: Oct. 20, 2022

(86) PCT No.: PCT/US2022/047217
§ 371 (c)(1),
(2) Date: Apr. 17, 2024

(87) PCT Pub. No.: WO2023/069580
PCT Pub. Date: Apr. 27, 2023

(65) Prior Publication Data

US 2025/0247427 A1 Jul. 31, 2025

Related U.S. Application Data

(60) Provisional application No. 63/264,602, filed on Nov. 26, 2021, provisional application No. 63/279,031, (Continued)

(51) Int. Cl.
*H04L 29/06* (2006.01)
*H04L 9/40* (2022.01)
*H04W 72/30* (2023.01)

(52) U.S. Cl.
CPC .......... *H04L 63/166* (2013.01); *H04W 72/30* (2023.01)

(58) Field of Classification Search
CPC ............................ H04L 63/166; H04W 72/30
(Continued)

(56) References Cited

U.S. PATENT DOCUMENTS

2018/0049060 A1* 2/2018 Fujishiro .............. H04W 72/30
2020/0037165 A1* 1/2020 Kunz ................. H04W 12/106
(Continued)

FOREIGN PATENT DOCUMENTS

EP 4 178 235 A1 5/2023
JP 2018-523349 A 8/2018
(Continued)

OTHER PUBLICATIONS

Office Action for Japanese Application No. 2024-523955, dated Jul. 15, 2025.
(Continued)

*Primary Examiner* — Jeffrey C Pwu
*Assistant Examiner* — Samuel Ambaye
(74) *Attorney, Agent, or Firm* — MARSHALL, GERSTEIN & BORUN LLP

(57) ABSTRACT

A radio access network (RAN) can perform a method for managing security protection for multicast and/or broadcast services (MBS). The method includes receiving (802), from a core network (CN) via a DL tunnel, a data packet associated with an MBS session; prior to transmitting the data packet to a plurality of UEs, determining (804) which security protection to apply to the data packet based on an identity of the DL tunnel; and transmitting (806) the data packet to the plurality of UEs using the determined security protection. A UE can receive (902), from a RAN, a configuration for establishing a logical channel with the RAN; receive (904), from the RAN via the logical channel, a data packet associated with an MBS session; determine (906) which security protection to apply to the data packet based
(Continued)

on the configuration; and apply (908) the determined security protection to the data packet.

15 Claims, 27 Drawing Sheets

Related U.S. Application Data filed on Nov. 12, 2021, provisional application No. 63/270,285, filed on Oct. 21, 2021.

(58) Field of Classification Search
USPC .......................................................... 713/151
See application file for complete search history.

(56) References Cited

U.S. PATENT DOCUMENTS

| | | | | |
|---|---|---|---|---|
| 2021/0067958 | A1* | 3/2021 | Lee | H04W 12/106 |
| 2021/0378053 | A1 | 12/2021 | Saily et al. | |
| 2022/0015063 | A1* | 1/2022 | Byun | H04W 76/40 |

FOREIGN PATENT DOCUMENTS

| | | | |
|---|---|---|---|
| JP | 2021-508968 | A | 3/2021 |
| WO | WO-2022/017527 | A1 | 1/2022 |
| WO | WO-2022/030454 | A1 | 2/2022 |
| WO | WO-2022/087106 | A1 | 4/2022 |
| WO | WO-2022/174827 | A1 | 8/2022 |

OTHER PUBLICATIONS

"3rd Generation Partnership Project; Technical Specification Group Services and System Aspects; Study of Security Aspects of Enhancements for 5G Multicast-Broadcast Services (MBS) (Release 17)," 3GPP Draft (Oct. 18, 2021).

"5G; Security Architecture and Procedures for 5G System (3GPP TS 33.501 version 15.14.0 Release 15)," ETSI Technical Specification (Sep. 27, 2021).

International Search Report and Written Opinion for Application No. PCT/US2022/047217, dated Feb. 16, 2023.

* cited by examiner

MANAGING MULTICAST DATA COMMUNICATION

CROSS-REFERENCE TO RELATED APPLICATIONS

This patent application is a national stage application, filed under 35 U.S.C. § 371, of International Application No. PCT/US2022/047217, filed Oct. 20, 2022 and entitled "Managing Multicast Data Communication," which claims priority to U.S. Provisional Application No. 63/264,602, filed Nov. 26, 2021 and entitled "Managing Data Security in Multicast, Broadcast, and Unicast Communications," which claims priority to U.S. Provisional Application No. 63/279,031, filed Nov. 12, 2021 and entitled "Managing Multicast Data Communication," which claims priority to U.S. Provisional Application No. 63/270,285, filed Oct. 21, 2021 and entitled "Managing Multicast Data Communication," the disclosures of which are incorporated by reference herein in their entireties.

FIELD OF THE DISCLOSURE

This disclosure relates to wireless communications and, more particularly, to managing data communication and security protection for multicast and/or broadcast services (MBS) data and non-MBS data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP sublayer defined for the Evolved Universal Terrestrial Radio Access (EUTRA) radio interface (see Third Generation Partnership Project (3GPP) specification TS 36.323) and New Radio (NR) (see 3GPP specification TS 38.323) provides sequencing of protocol data units (PDUs) in the uplink direction from a user device (also known as a user equipment or "UE") to a base station, as well as in the downlink direction from the base station to the UE. The PDCP sublayer also provides services for signaling radio bearers (SRBs) to the Radio Resource Control (RRC) sublayer. The PDCP sublayer further provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

The UE in some scenarios can concurrently utilize resources of multiple nodes (e.g., base stations or components of a distributed base station or disaggregated base station) of a radio access network (RAN), interconnected by a backhaul. When these network nodes support different radio access technologies (RATs), this type of connectivity is referred to as multi-radio dual connectivity (MR-DC).

When operating in MR-DC, the cell(s) associated with the base station operating as a master node (MN) define a master cell group (MCG), and the cells associated with the base station operating as a secondary node (SN) define the secondary cell group (SCG). The MCG covers a primary cell (PCell) and zero, one, or more secondary cells (SCells), and the SCG covers a primary secondary cell (PSCell) and zero, one, or more SCells. The UE communicates with the MN (via the MCG) and the SN (via the SCG). In other scenarios, the UE utilizes resources of one base station at a time, in single connectivity (SC). The UE in SC only communicates with the MN, via the MCG. A base station and/or the UE determines when the UE should establish a radio connection with another base station. For example, a base station can determine to hand the UE over to another base station, and initiate a handover procedure. The UE in other scenarios can concurrently utilize resources of another RAN node (e.g., a base station or a component of a distributed or disaggregated base station), interconnected by a backhaul.

UEs can use several types of SRBs and DRBs. So-called "SRB1" resources carry RRC messages, which in some cases include NAS messages over the dedicated control channel (DCCH), and "SRB2" resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and can also be referred to as MCG SRBs. "SRB3" resources allow the UE and the SN to exchange RRC messages related to the SN, and can also be referred to as SCG SRBs. Split SRBs allow the UE to exchange RRC messages directly with the MN via lower-layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MN or SN but using the lower-layer resources of both the MN and the SN can be referred to as split DRBs. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

UEs can perform handover procedures to switch from one cell to another, whether in SC or DC operation. These procedures involve messaging (e.g., RRC signaling and preparation) among RAN nodes and the UE. The UE may handover from a cell of a serving base station to a target cell of a target base station, or from a cell of a first distributed unit (DU) of a serving base station to a target cell of a second DU of the same base station, depending on the scenario. In DC scenarios, UEs can perform PSCell change procedures to change PSCells. These procedures involve messaging (e.g., RRC signaling and preparation) among RAN nodes and the UE. The UE may perform a PSCell change from a PSCell of a serving SN to a target PSCell of a target SN, or from a PSCell of a source DU of a base station to a PSCell of a target DU of the same base station, depending on the scenario. Further, the UE may perform handover or PSCell change within a cell for synchronous reconfiguration.

Base stations that operate according to fifth-generation (5G) New Radio (NR) requirements support significantly larger bandwidth than fourth-generation (4G) base stations. Accordingly, the Third Generation Partnership Project (3GPP) has proposed that for Release 15, user equipment units (UEs) support a 100 MHz bandwidth in frequency range 1 (FR1) and a 400 MHz bandwidth in frequency range (FR2). Due to the relatively wide bandwidth of a typical carrier in 5G NR, 3GPP has proposed for Release 17 that a 5G NR base station be able to provide multicast and/or broadcast service(s) (MBS) to UEs. MBS can be useful in many content delivery applications, such as transparent IPv4/IPv6 multicast delivery, IPTV, software delivery over wireless, group communications, Internet of Things (IoT) applications, V2X applications, and emergency messages related to public safety, for example.

5G NR provides both point-to-point (PTP) and point-to-multipoint (PTM) delivery methods for the transmission of MBS packet flows over the radio interface. In PTP communications, a RAN node transmits different copies of each MBS data packet to different UEs over the radio interface, while in PTM communications a RAN node transmits a single copy of each MBS data packet to multiple UEs over the radio interface. In some scenarios, however, it is unclear how, if at all, the RAN node applies security protection (e.g., using a security algorithm, security key) to the MBS data packets.

SUMMARY

A radio access network (RAN) and/or a user equipment (UE) can implement the techniques of this disclosure for managing security checking and/or security protection for multicast and/or broadcast services (MBS). For example, a UE can implement the techniques of this disclosure for managing security checking or verification (e.g., decryption and/or integrity protection) for data packets received from a RAN, including data packets associated with multicast and/or broadcast services (MBS).

Initially, a RAN receives a data packet associated with an MBS session from a core network (CN) over a downlink (DL) tunnel. Prior to transmitting the data packet to a plurality of UEs, the RAN can determine which security check scheme and/or which security protection to apply to the data packet based on an identity of the DL tunnel. In one implementation, if the RAN determines that the DL tunnel is a common DL tunnel, the RAN can determine that the data packet is to be transmitted to the plurality of UEs using multicast or one or more MBS radio bearers (MRBs). In another implementation, if the RAN determines that the DL tunnel is a DL tunnel specific to only one of the plurality of UEs, the RAN can determine that the data packet for the UE is to be transmitted via unicast or a DRB. In either of these implementations, the RAN can either apply a null security check scheme (which may include, for example, a null security protection) to the data packet (effectively refraining from applying any security check scheme and/or security protection to the data packet), or a non-null security check scheme and/or a non-null security protection to the data packet. The non-null security check scheme and/or non-null security protection can be individual (i.e., specific) to only one of the plurality of UEs, or common to all of the plurality of UEs that receive the data packet.

Prior to the UE receiving the data packet from the RAN over a logical channel, the UE receives a configuration from the RAN to establish the logical channel. Based on the configuration, the UE can determine which security check scheme and/or security protection to apply to incoming data packets. In one implementation, if the UE determines from the configuration that the logical channel is a channel that is dedicated to multicast traffic (e.g., a multicast traffic channel (MTCH)), the UE expects the data packet to be transmitted from the RAN using multicast. In another implementation, if the UE determines from the configuration that the logical channel is not a channel that is dedicated to multicast traffic (e.g., a dedicated traffic channel (DTCH) or a dedicated control channel (DCCH)), the UE expects the data packet to be received via unicast. In yet another implementation, if the UE determines that the configuration includes a group radio network temporary identifier (G-RNTI), the UE expects the data packet to be transmitted from the RAN using multicast. In any of these implementations, the UE can either apply a null security check scheme (which may include, for example a null security protection) to the data packet (effectively refraining from applying any security check scheme and/or security protection to the data packet), or apply a non-null security check scheme and/or a non-null security protection to the data packet. The non-null security check scheme and/or non-null security protection can be specific to the UE, or common to the UE and other UEs that also receive the data packet.

An example embodiment of these techniques is a method in a RAN for managing security protection for MBS. The method includes receiving, by processing hardware and from a core network (CN) via a downlink (DL) tunnel, a data packet associated with an MBS session; prior to transmitting the data packet to a plurality of UEs, determining, by the processing hardware, which security protection to apply to the data packet based on an identity of the DL tunnel; and transmitting, by the processing hardware, the data packet to the plurality of UEs using the determined security protection. The security protection can be a null security protection or a non-null security protection (e.g., a UE-specific security protection, or a common security protection). Another example embodiment of these techniques is a RAN including processing hardware and configured to implement the method above.

Another example embodiment of these techniques is a method in a UE for managing security protection for MBS. The method includes receiving, by processing hardware and from a radio access network (RAN), a configuration for establishing a logical channel with the RAN; receiving, by the processing hardware and from the RAN via the logical channel, a data packet associated with an MBS session; determining, by the processing hardware, which security protection to apply to the data packet based on the configuration; and applying, by the processing hardware, the determined security protection to the data packet. The security protection can be a null security protection or a non-null security protection (e.g., a UE-specific security protection, or a common security protection). Another example embodiment of these techniques is a UE including processing hardware and configured to implement the method above.

Yet another example embodiment of these techniques is a method in a UE for managing security checking for MBS. The method includes receiving, by processing hardware from a radio access network (RAN), a data packet associated with an MBS session; determining, by the processing hardware and based on a configuration according to which the data packet was received from the RAN, what security check scheme to apply to the data packet; and processing the data packet according to the determined security check scheme.

Still another example embodiment of these techniques is a UE that includes processing hardware (e.g., one or more processors and instructions stored on a non-transitory computer-readable medium) configured to implement the method above.

DETAILED DESCRIPTION OF THE DRAWINGS

Figure 1A:
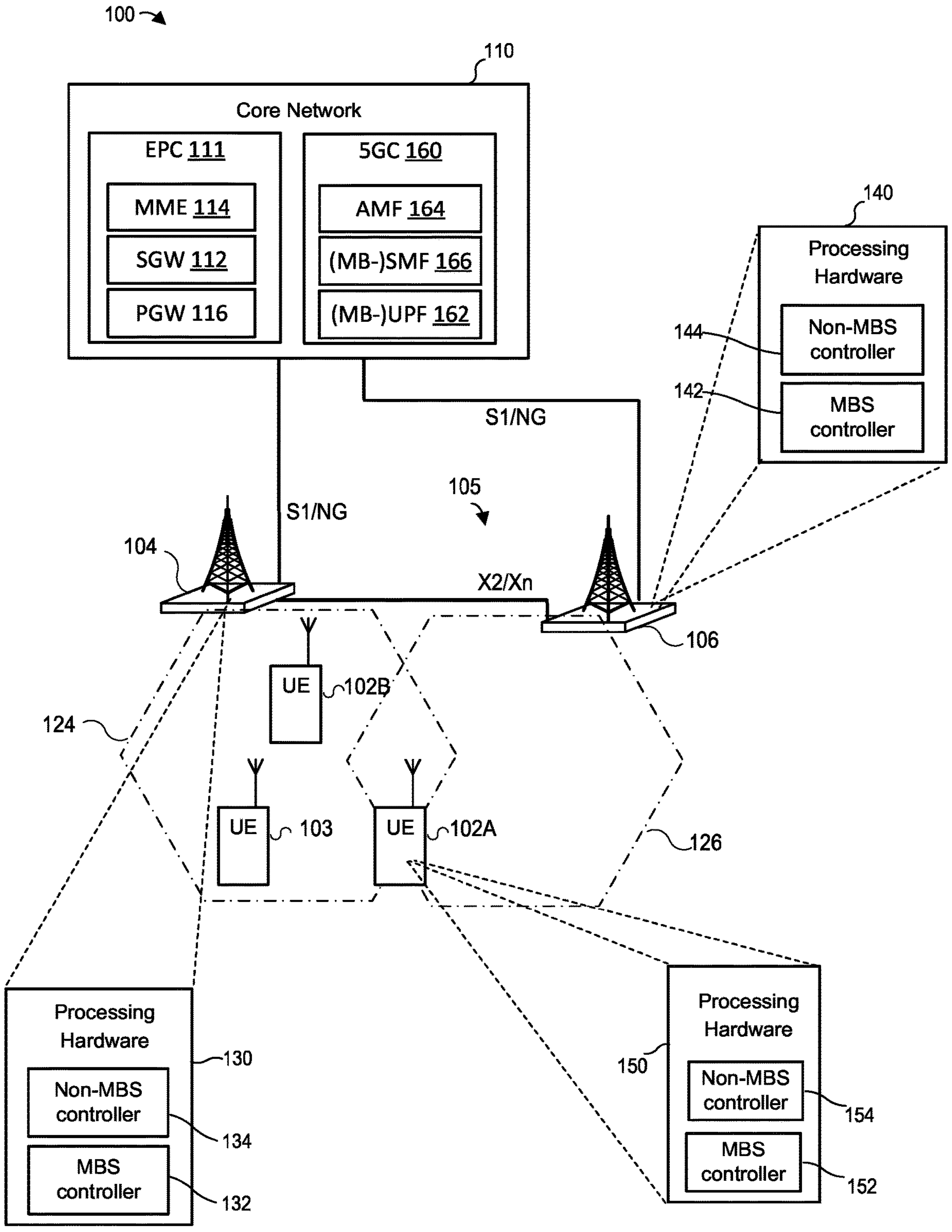
FIG. 1A is a block diagram of an example system in which techniques of this disclosure for managing security protection on a data communication between a UE and a RAN can be implemented.

Generally speaking, a RAN and/or a CN implement the techniques of this disclosure to manage transmission of multicast and/or broadcast services (MBS). A CN can request that a base station configure a common downlink (DL) tunnel via which the CN can transmit MBS data for an MBS session to the base station, for multiple UEs. In response to the request, the base station transmits a configuration of the common DL tunnel to the CN. The configuration can include transport-layer information such as an Internet Protocol (IP) address and a tunnel identifier (e.g., a Tunnel Endpoint Identifier (TEID)). Additionally, and generally speaking, a UE of this disclosure implements security protection checking for a downlink data packet, including MBS data packets, based on the manner in which the data packet arrives from the RAN.

Initially, the RAN receives a data packet associated with an MBS session from a core network (CN) over a downlink (DL) tunnel. Prior to transmitting the data packet to a plurality of UEs, the RAN can determine which security check scheme or security protection to apply to the data packet based on an identity of the DL tunnel (e.g., based on whether the DL tunnel is a common DL tunnel or specific to a UE). For example, the RAN can apply a null security check scheme to the data packet (effectively refraining from applying any security protection to the data packet, e.g., a non-null security protection) or can apply a non-null security check scheme and/or security protection to the data packet, which can be individual (i.e., specific) to only one of the multiple UEs, or common to all of the UEs that receive the data packet.

The UE can determine which security check scheme or security protection to apply to a received data packet based on such factors as the HARQ process identifier the RAN used to transmit the data packet, the format of the DCI according to which the transmission of the data packet occurred, the SPS multicast radio resource in which the transmission of the data packet occurred, the temporary identity the RAN used to scramble the CRC in the DCI, whether the RAN used a multicast, broadcast, or unicast configuration to transmit the data packet, the identifier of the logical channel on which the RAN transmitted the data packet, etc. The UE can either apply a null security check scheme and/or a null security protection to the data packet (effectively refraining from applying any security checking and/or protection to the data packet), or apply a non-null security check scheme and/or a non-null security protection to the data packet. The non-null security check scheme and/or non-null security protection can be specific to the UE, or common to the UE and other UEs that also receive the data packet.

The base station can also configure one or more logical channels toward the UEs, and/or one or more MRBs associated with the MBS session, where there may be a one-to-one mapping between each logical channel and each MRB. The each MRB can be a broadcast, multicast or unicast MRB. After receiving MBS data for the MBS session via the common DL tunnel, the base station can determine which security check scheme or security protection to apply to the MBS data, such as a null security check scheme (which may include a null security protection), or a non-null security check scheme and/or non-null security protection (e.g., a UE-specific security protection, or a common security protection), and subsequently transmit the (security-protected) MBS data via the one or more logical channels to one or more UEs that have joined the MBS session. If the base station determines to apply a null security check scheme and/or a null security protection to the MBS data (effectively refraining from applying security checking and/or security protection to the MBS data), the UE can receive the original MBS data packet (and thus need not apply security protection to the original MBS data packet). If the base station determines to apply a non-null security check scheme and/or a non-null security protection to the MBS data, the UE can receive a security-protected MBS data packet and subsequently apply a non-null security check scheme and/or non-null security protection to the security-protected MBS data packet(s) to obtain the original MBS data packet. In some implementations, the base station transmits MBS data to multiple UEs via a single logical channel. Further, if there are multiple quality-of-service (QOS) flows for the MBS session, a single logical channel may be associated with the multiple QoS flows, or there may be a one-to-one mapping between each QoS flow and each logical channel.

FIG. 1A depicts an example wireless communication system 100 in which techniques of this disclosure for managing security protection for MBS can be implemented. The wireless communication system 100 includes user equipment (UEs) 102A, 102B, 103 as well as base stations 104, 106 of a radio access network (RAN) 105 connected to a core network (CN) 110. In other implementations or scenarios, the wireless communication system 100 may instead include more or fewer UEs, and/or more or fewer base stations, than are shown in FIG. 1A. The base stations 104, 106 can be of any suitable type, or types, of base stations, such as an evolved node B (eNB), a next-generation eNB (ng-eNB), or a 5G Node B (gNB), for example. As a more specific example, the base station 104 may be an eNB or a gNB, and the base stations 106 may be a gNB.

The base station 104 supports a cell 124, and the base station 106 supports a cell 126. The cell 124 partially overlaps with the cell 126, so that the UE 102A can be in range to communicate with base station 104 while simultaneously being in range to communicate with the base station 106 (or in range to detect or measure signals from the base station 106). The overlap can make it possible for the UE 102A to hand over between the cells (e.g., from the cell 124 to the cell 126) or base stations (e.g., from the base station 104 to the base station 106) before the UE 102A experiences radio link failure, for example. Moreover, the overlap allows the various dual connectivity (DC) scenarios. For example, the UE 102A can communicate in DC with the base station 104 (operating as a master node (MN)) and the base station 106 (operating as a secondary node (SN)). When the UE 102A is in DC with the base station 104 and the base station 106, the base station 104 operates as a master eNB (MeNB), a master ng-eNB (Mng-eNB), or a master gNB (MgNB), and the base station 106 operates as a secondary gNB (SgNB) or a secondary ng-eNB (Sng-eNB).

In non-MBS (unicast) operation, the UE 102A can use a radio bearer (e.g., a DRB or an SRB)) that at different times terminates at an MN (e.g., the base station 104) or an SN (e.g., the base station 106). For example, after handover or SN change to the base station 106, the UE 102A can use a radio bearer (e.g., a DRB or an SRB) that terminates at the base station 106. The UE 102A can apply one or more security keys when communicating on the radio bearer, in the uplink (from the UE 102A to a base station, such as the base station 104 or 106) and/or downlink (from the base station to the UE 102A) direction. The UE 102A can use the security key(s) (e.g., integrity key and/or encryption key) to perform security protection (e.g., integrity protection and/or encryption) to generate security-protected data packets and transmit to the base station the security-protected data via a (first) logical channel (ID) associated with the radio bearer. The base station can receive the security-protected data packets via the first logical channel (ID) from the UE 102A and use one or more security keys to decrypt and/or perform integrity check on the security-protected data packets. Similarly, the base station can use the security key(s) (e.g., integrity key and/or encryption key) to perform security protection (e.g., integrity protection and/or encryption) to generate security-protected data packets and transmit to the UE 102A the security-protected data via a (second) logical channel (ID) associated with the radio bearer. The UE 102A can receive the security-protected data packets via the second logical channel from the base station and use one or more security keys to decrypt and/or perform integrity check on the security-protected data packets. The first logical channel (ID) and second logical channel (ID) can be the same logical channel (ID) or different logical channels (IDs). The security key(s) used by the UE 102A and the base station can be the same or different. In cases where the radio bearer is a DRB, the security key(s) in some implementations are associated with a user-plane or the DRB, such as an encryption key $K_{UPenc}$ and/or an integrity key $K_{UPint}$. In cases where the radio bearer is an SRB, the security key(s) in some implementations are associated with a user-plane or the SRB, such as an encryption key $K_{RRCenc}$ and/or an integrity key $K_{RRCint}$. In non-MBS operation, the UE 102A transmits data via the radio bearer on (i.e., within) an uplink (UL) bandwidth part (BWP) of a cell to the base station, and/or receives data via the radio bearer on a downlink (DL) BWP of the cell from the base station. The UL BWP can be an initial UL BWP or a dedicated UL BWP, and the DL BWP can be an initial DL BWP or a dedicated DL BWP. The UE 102A can receive paging, system information, public warning message(s), or a random access response on the DL BWP. In this non-MBS operation, the UE 102A can be in a connected state. Alternatively, the UE 102A can be in an idle or inactive state if the UE 102A supports small data transmission in the idle or inactive state.

In MBS operation, the UE 102A can use an MRB that at different times terminates at an MN (e.g., the base station 104) or an SN (e.g., the base station 106). For example, after handover or SN change, the UE 102A can use an MRB that terminates at the base station 106, which can be operating as an MN or SN. In some scenarios, a base station (e.g., the MN or SN) can transmit MBS data over unicast radio resources (i.e., the radio resources dedicated to the UE 102A) to the UE 102A via the MRB. In other scenarios, the base station (e.g., the MN or SN) can transmit MBS data over multicast radio resources (i.e., the radio resources common to the UE 102A and one or more other UEs), or a DL BWP of a cell from the base station to the UE 102A via the MRB. The DL BWP can be an initial DL BWP, a dedicated DL BWP, or an MBS DL BWP (i.e., a DL BWP that is specific to MBS, or not for unicast). In some scenarios, a base station (e.g., the MN or SN) can utilize the MRB or the DRB to transmit application-level messages, such as security key(s), to the UE 102A. The base station can receive the security key(s) from a core network or another base station or generate the security key(s) by itself. The base station can apply the security key(s) when performing security protection to MBS data (e.g., protect integrity of MBS data and/or encrypt MBS data) and transmit the encrypted and/or integrity protected MBS data over radio resources to the UE 102A. Alternatively, the core network can apply the security key(s) when performing security protection to MBS data (e.g., protect integrity of MBS data and/or encrypt MBS data), and transmit the encrypted and/or integrity protected MBS data to the UE 102A via the base station. Correspondingly, the UE 102A can apply the security key(s) to perform a corresponding security protection (e.g., decrypt MBS data and/or check integrity of the MBS data) when receiving the MBS data. In other scenarios, the base station can refrain from applying security protection to MBS data and transmit the MBS data in its original form to the UE 102A. Correspondingly, the UE 102A can omit applying security protection to MBS data received from the base station.

The base station 104 includes processing hardware 130, which can include one or more general-purpose processors (e.g., central processing units (CPUs)) and a computer-readable memory storing machine-readable instructions executable on the one or more general-purpose processor(s), and/or special-purpose processing units. The processing hardware 130 in the example implementation of FIG. 1A includes an MBS controller 132 that is configured to manage or control transmission of MBS information received from the CN 110 or an edge server. For example, the MBS controller 132 can be configured to support radio resource control (RRC) configurations, procedures and messaging associated with MBS procedures and security protection, and/or other operations associated with those configurations and/or procedures, as discussed below. The processing hardware 130 can also include a non-MBS controller 134 that is configured to manage or control one or more RRC configurations and/or RRC procedures when the base station 104 operates as an MN or SN during a non-MBS operation.

The base station 106 includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes an MBS controller 142 and a non-MBS controller 144, which may be similar to the controllers 132 and 134, respectively, of base station 130. Although not shown in FIG. 1A, the RAN 105 can include additional base stations with processing hardware similar to the processing hardware 130 of the base station 104 and/or the processing hardware 140 of the base station 106.

The UE 102A includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes an MBS controller 152 that is configured to manage or control reception of MBS information. For example, the UE MBS controller 152 can be configured to support RRC configurations, procedures and messaging associated with MBS procedures and security protection, and/or other operations associated with those configurations and/or procedures, as discussed below. The processing hardware 150 can also include a non-MBS controller 154 configured to manage or control one or more RRC configurations and/or RRC procedures in accordance with any of the implementations discussed below, when the UE 102A communicates with an MN and/or an SN during a non-MBS operation. Although not shown in FIG. 1A, the UE 102B may include processing hardware similar to the processing hardware 150 of the UE 102A.

The CN 110 may be an evolved packet core (EPC) 111 or a fifth-generation core (5GC) 160, both of which are depicted in FIG. 1A. The base station 104 may be an eNB supporting an S1 interface for communicating with the EPC 111, an ng-eNB supporting an NG interface for communicating with the 5GC 160, or a gNB that supports an NR radio interface as well as an NG interface for communicating with the 5GC 160. The base station 106 may be an EUTRA-NR DC (EN-DC) gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104 and 106 may support an X2 or Xn interface.

Among other components, the EPC 111 can include a serving gateway (SGW) 112, a mobility management entity (MME) 114, and a packet data network gateway (PGW) 116. The SGW 112 is generally configured to transfer user-plane packets related to audio calls, video calls, Internet traffic, etc., and the MME 114 is configured to manage authentication, registration, paging, and other related functions. The PGW 116 provides connectivity from a UE (e.g., UE 102A or 102B) to one or more external packet data networks, e.g., an Internet network and/or an Internet Protocol (IP) Multimedia Subsystem (IMS) network. The 5GC 160 includes a user plane function (UPF) 162 and an access and mobility management (AMF) 164, and/or a session management function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

The UPF 162, AMF 164, and/or SMF 166 can be configured to support MBS. For example, the SMF 166 can be configured to manage or control MBS transport, configure the UPF 162 and/or RAN 105 for MBS flows, and/or manage or configure one or more MBS sessions or PDU sessions for MBS for a UE (e.g., UE 102A or 102B). The UPF 162 is configured to transfer MBS data packets (e.g., related to audio, video, Internet traffic, etc.) to the RAN 105. The UPF 162 and/or SMF 166 can be configured for both non-MBS unicast service and MBS, or for MBS only.

Generally, the wireless communication system 100 may include any suitable number of base stations supporting NR cells and/or EUTRA cells. More particularly, the EPC 111 or the 5GC 160 may be connected to any suitable number of base stations supporting NR cells and/or EUTRA cells. Although the examples below refer specifically to specific CN types (EPC, 5GC) and radio access technology (RAT) types (5G NR and EUTRA), in general the techniques of this disclosure can also apply to other suitable radio access and/or core network technologies, such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB, and the base station 106 can operate as an SgNB or an Sng-eNB. The UE 102A can communicate with the base station 104 and the base station 106 via the same RAT, such as EUTRA or NR, or via different RATs.

When the base station 104 is an MeNB and the base station 106 is an SgNB, the UE 102A can be in EN-DC with the MeNB 104 and the SgNB 106. When the base station 104 is an Mng-eNB and the base station 106 is an SgNB, the UE 102A can be in next generation (NG) EUTRA-NR DC (NGEN-DC) with the Mng-eNB 104 and the SgNB 106. When the base station 104 is an MgNB and the base station 106 is an SgNB, the UE 102A can be in NR-NR DC (NR-DC) with the MgNB 104 and the SgNB 106. When the base station 104 is an MgNB and the base station 106 is an Sng-eNB, the UE 102A can be in NR-EUTRA DC (NE-DC) with the MgNB 104 and the Sng-eNB 106.

Although not shown in FIG. 1A, the CN 110 communicatively connects the UE 102A, UE 102B, and/or UE 103 to an MBS network via the RAN 105. The MBS network can provide MBS to the UE 102A, UE 102B, and/or UE 102C in many content delivery applications, such as transparent IPv4/IPv6 multicast delivery, IPTV, software delivery over wireless, group communications, IoT applications, V2X applications, and emergency messages related to public safety. To this end, an entity (e.g., a server or a group of servers) operating in the MBS network supports packet exchange with the 102A, UE 102B, and/or UE 103. The packets can convey signaling (such as session initiation protocol (SIP) messages, IP messages, or other suitable messages) as well as data ("or media") such as text messages, audio and/or video.

Figure 1B:
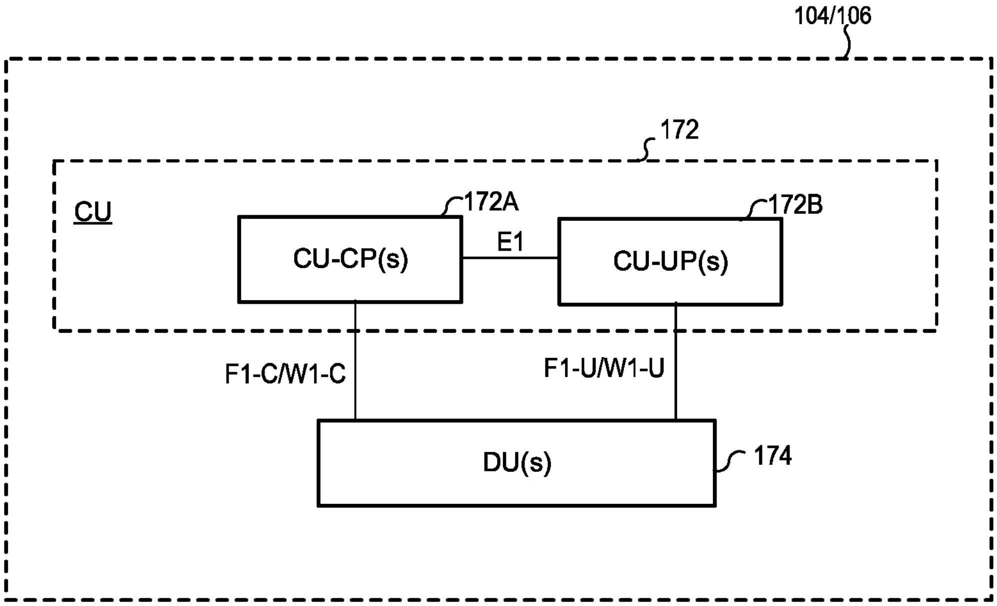
FIG. 1B is a block diagram of an example, distributed implementation of any one or more of the base stations of the RAN of FIG. 1A.

FIG. 1B depicts an example distributed implementation of any one or more of the base stations 104 and 106. In this implementation, the base station 104, 106 includes a central unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include some or all of the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 104) operates as an MN or an SN. The processing hardware can also include a physical (PHY) layer controller configured to manage or control one or more PHY layer operations or procedures.

In some implementations, the CU 172 can include one or more logical nodes (CU-CP(s) 172A) that host the control plane part of the Packet Data Convergence Protocol (PDCP) protocol of the CU 172 and/or the radio resource control (RRC) protocol of the CU 172. The CU 172 can also include one or more logical nodes (CU-UP(s) 172B) that host the user plane part of the PDCP protocol and/or service data adaptation protocol (SDAP) protocol of the CU 172. The CU-CP(s) 172A can transmit non-MBS control information and MBS control information, and the CU-UP(s) 172B can transmit non-MBS data packets and MBS data packets, as described herein.

The CU-CP(s) 172A can be connected to multiple CU-UPs 172B through the E1 interface. The CU-CP(s) 172A select the appropriate CU-UP(s) 172B for the requested services for the UE 102A. In some implementations, a single CU-UP 172B can be connected to multiple CU-CPs 172A through the E1 interface. A CU-CP 172A can be connected to one or more DUs 174*s* through an F1-C interface. A CU-UP 172B can be connected to one or more DUs 174 through an F1-U interface under the control of the same CU-CP 172A. In some implementations, one DU 174 can be connected to multiple CU-UPs 172B under the control of the same CU-CP 172A. In such implementations, the connectivity between a CU-UP 172B and a DU 174 is established by the CU-CP 172A using bearer context management functions.

The description above can apply to the UEs 102A, 102B, and/or 103.

Figure 2A:
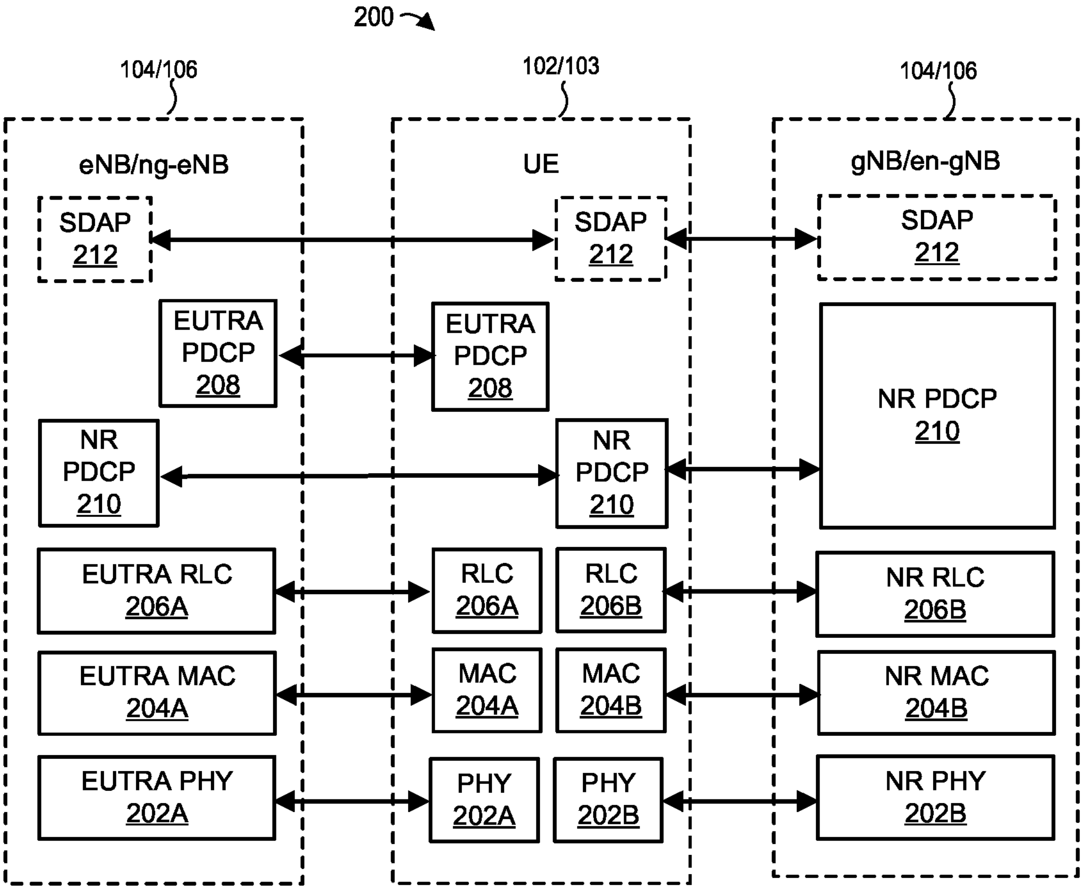
FIG. 2A depicts an example protocol stack according to which the UE of FIG. 1A can communicate with base stations of FIG. 1A.

FIG. 2A illustrates, in a simplified manner, an example protocol stack 200 according to which a UE (e.g., UE 102A, 102B or 103) can communicate with an eNB/ng-eNB or a gNB (e.g., one or more of the base stations 104, 106). In the example protocol stack 200, a PHY sublayer 202A of EUTRA provides transport channels to a EUTRA MAC sublayer 204A, which in turn provides logical channels to a EUTRA RLC sublayer 206A. The EUTRA RLC sublayer 206A in turn provides RLC channels to a EUTRA PDCP sublayer 208 and, in some cases, to an NR PDCP sublayer 210. Similarly, an NR PHY 202B provides transport channels to an NR MAC sublayer 204B, which in turn provides logical channels to an NR RLC sublayer 206B. The NR RLC sublayer 206B in turn provides RLC channels to an NR PDCP sublayer 210. The UE, in some implementations, supports both the EUTRA and the NR stack as shown in FIG. 2A, to support handover between EUTRA and NR base stations and/or to support DC over EUTRA and NR interfaces. Further, as illustrated in FIG. 2A, the UE can support layering of NR PDCP 210 over EUTRA RLC 206A, and an SDAP sublayer 212 over the NR PDCP sublayer 210. Sublayers are also referred to herein as simply "layers."

The EUTRA PDCP sublayer 208 and the NR PDCP sublayer 210 receive packets (e.g., from an IP layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets." The packets can be MBS packets or non-MBS packets. MBS packets may include application content for an MBS service (e.g., IPv4/IPv6 multicast delivery, IPTV, software delivery over wireless, group communications, IoT applications, V2X applications, and/or emergency messages related to public safety), for example. As another example, MBS packets may include application control information for the MBS.

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 may be SDAP PDUs, IP packets, or Ethernet packets, for example.

In scenarios where the UE operates in EN-DC with the base station 104 operating as an MeNB and the base station 106 operating as an SgNB, the wireless communication system 100 can provide the UE with an MN-terminated bearer that uses EUTRA PDCP sublayer 208, or an MN-terminated bearer that uses NR PDCP sublayer 210. The wireless communication system 100 in various scenarios can also provide the UE with an SN-terminated bearer, which uses only the NR PDCP sublayer 210. The MN-terminated bearer may be an MCG bearer, a split bearer, or an MN-terminated SCG bearer. The SN-terminated bearer may be an SCG bearer, a split bearer, or an SN-terminated MCG bearer. The MN-terminated bearer may be an SRB (e.g., SRB1 or SRB2) or a DRB. The SN-terminated bearer may be an SRB or a DRB.

In some implementations, a base station (e.g., base station 104, 106) broadcasts or multicasts MBS data packets via one or more MRBs, and in turn the receives the MBS data packets via the MRB(s). The base station can include configuration(s) of the MRB(s) in multicast configuration parameters (which can also be referred to as MBS configuration parameters) described below. In some implementations, the base station broadcasts the MBS data packets via RLC sublayer 206, MAC sublayer 204, and PHY sublayer 202, and correspondingly, the UE uses PHY sublayer 202, MAC sublayer 204, and RLC sublayer 206 to receive the MBS data packets. In such implementations, the base station and the UE may not use PDCP sublayer 208 and a SDAP sublayer 212 to communicate the MBS data packets. In other implementations, the base station transmits the MBS data packets via PDCP sublayer 208, RLC sublayer 206, MAC sublayer 204, and PHY sublayer 202, and correspondingly, the UE uses PHY sublayer 202, MAC sublayer 204, RLC sublayer 206 and PDCP sublayer 208 to receive the MBS data packets. In such implementations, the base station and the UE may not use a SDAP sublayer 212 to communicate the MBS data packets. In yet other implementations, the base station transmits the MBS data packets via the SDAP sublayer 212, PDCP sublayer 208, RLC sublayer 206, MAC sublayer 204, and PHY sublayer 202 and, correspondingly, the UE uses the PHY sublayer 202, MAC sublayer 204, RLC sublayer 206, PDCP sublayer 208, and SDAP sublayer 212 to receive the MBS data packets.

Figure 2B:
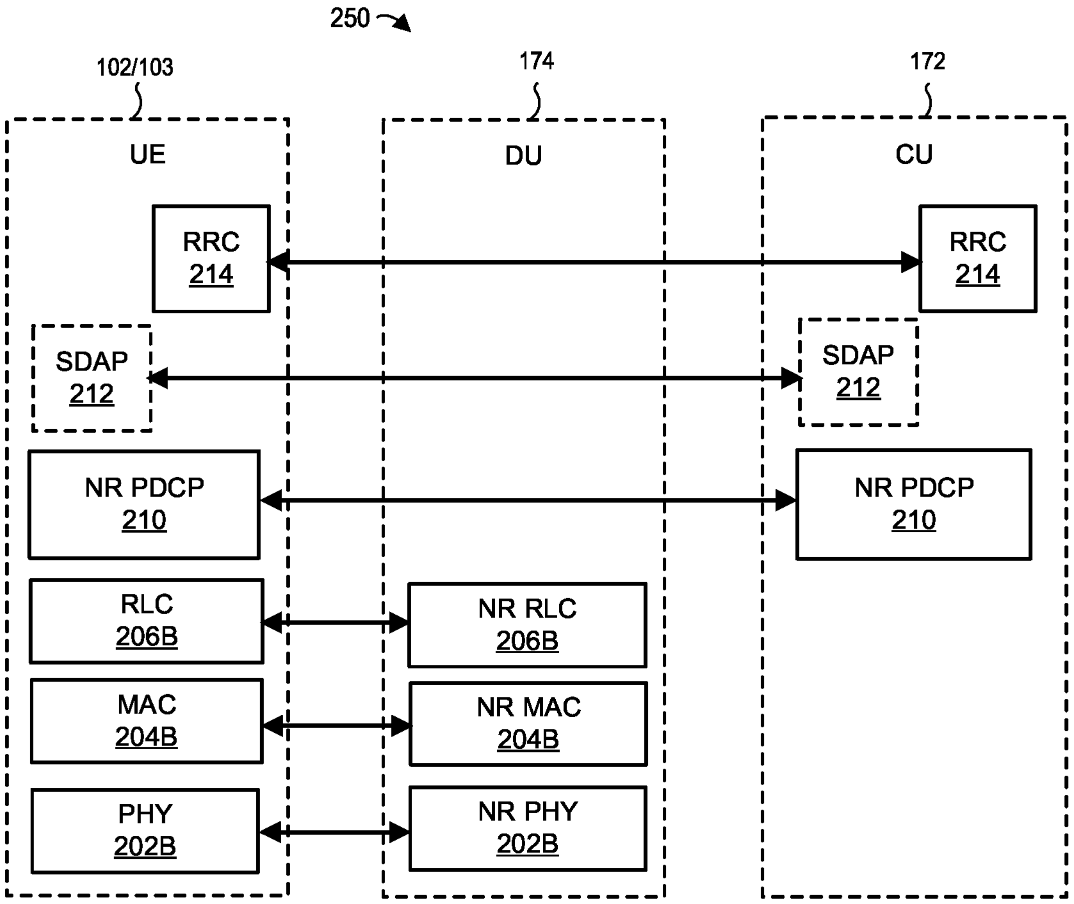
FIG. 2B is a block diagram of an example protocol stack according to which the UE of FIG. 1A can communicate with a DU and a CU of a base station.

FIG. 2B illustrates, in a simplified manner, an example protocol stack 250 which the UE (e.g., UE 102A, 102B or 103) can communicate with a DU (e.g., DU 174) and a CU (e.g., CU 172). The radio protocol stack 200 is functionally split as shown by the radio protocol stack 250 in FIG. 2B. The CU at any of the base stations 104 or 106 can hold all the control and upper layer functionalities (e.g., RRC 214, SDAP 212, NR PDCP 210), while the lower layer operations (e.g., NR RLC 206B, NR MAC 204B, and NR PHY 202B)

are delegated to the DU. To support connection to a 5GC, NR PDCP 210 provides SRBs to RRC 214, and NR PDCP 210 provides DRBs to SDAP 212 and SRBs to RRC 214.

Figure 3:
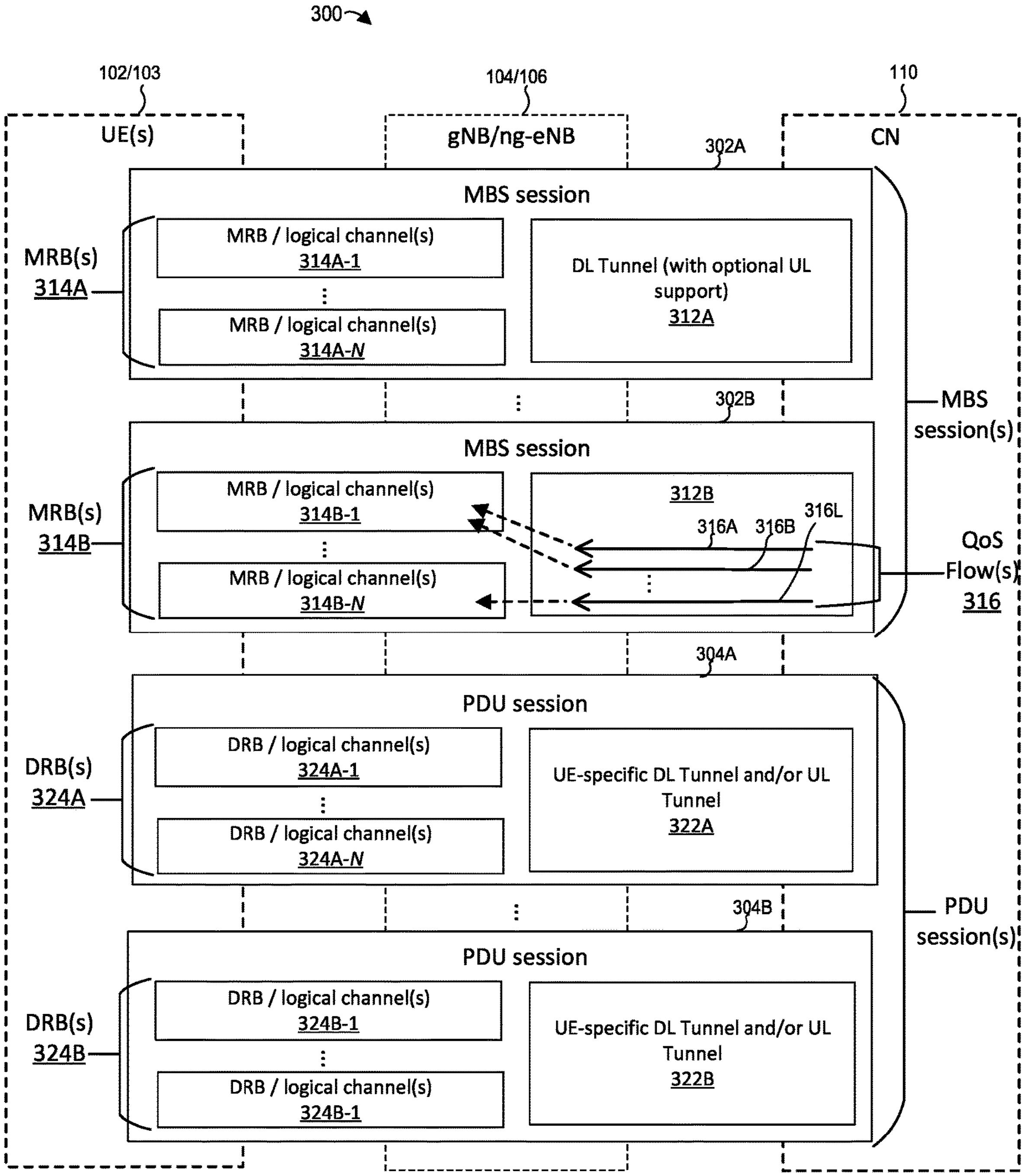
FIG. 3 is a block diagram illustrating example tunnel architectures for MBS sessions and PDU sessions, respectively.

Referring to FIG. 3, an MBS session 302A can include a tunnel 312A with endpoints at the CN 110 and the base station 104/106. The MBS session 302A can correspond to a certain session ID such as a Temporary Mobile Group Identity (TMGI), for example. The MBS data can include IP packets, TCP/IP packets, UDP/IP packets, Real-Time Transport Protocol (RTP)/UDP/IP packets, or RTP/TCP/IP packets, for example.

In some cases, the CN 110 and/or the base station 104/106 configure the tunnel 312A only for MBS traffic directed from the CN 110 to the base station 104/106, and the tunnel 312A can be referred to as a downlink (DL) tunnel. In other cases, however, CN 110 and the base station 104/106 use the tunnel 312A for downlink as well as for uplink (UL) MBS traffic to support, for example, commands or service requests from the UEs. Further, because the base station 104/106 can direct MBS traffic arriving via the tunnel 312A to multiple UEs, the tunnel 312A can be referred to as a common tunnel or a common DL tunnel.

The tunnel 312A can operate at the transport layer or sublayer, e.g., on the User Datagram Protocol (UDP) protocol layered over Internet Protocol (IP). As a more specific example, the tunnel 312A can be associated with the General Packet Radio System (GPRS) Tunneling Protocol (GTP). The tunnel 312A can correspond to a certain IP address (e.g., an IP address of the base station 104/106) and a certain Tunnel Endpoint Identifier (TEID) (e.g., assigned by the base station 104/106), for example. More generally, the tunnel 312A can have any suitable transport-layer configuration. The CN 110 can specify the IP address and the TEID address in header(s) of a tunnel packet including an MBS data packet and transmit the tunnel packet downstream to the base station 104/106 via the tunnel 312A. The header(s) can include the IP address and/or the TEID. For example, the header(s) include an IP header and an GTP header including the IP address and the TEID, respectively. The base station 104/106 accordingly can identify data packets traveling via the tunnel 312A using the IP address and/or the TEID.

As illustrated in FIG. 3, the base station 104/106 maps traffic in the tunnel 312A to N radio bearers 314A-1, 314A-2, . . . , 314A-N, which may be configured as MBS radio bearers or MRBs, where N>1. Each MRB can correspond to a respective logical channel. As discussed above, the PDCP sublayer provides support for radio bearers such as SRBs, DRBs, and MRBs, and a EUTRA or NR MAC sublayer provides logical channels to a EUTRA or NR RLC sublayer. Each of the MRBs 314A for example can correspond to a respective MBS traffic channel (MTCH). The base station 104/106 and the CN 110 can also maintain another MBS session 302B, which similarly can include a tunnel 312B corresponding to MRBs 314B-1, 314B-2, . . . , 314B-N, where N>1. Each of the MRBs 314B can correspond to a respective logical channel.

The MBS traffic can include one or multiple QOS flows, for each of the tunnels 312A, 312B, etc. For example, the MBS traffic on the tunnel 312B can include a set of flows 316 including QoS flows 316A, 316B, . . . , 316L. Further, a logical channel of an MRB can support a single QoS flow or multiple QoS flows. In the example configuration of FIG. 3, the base station 104/106 maps the QoS flows 316A and 316B to the MTCH of the MRB 314B-1, and the QoS flow 316L to the MTCH of the MRB 314B-N.

In various scenarios, the CN 110 can assign different types of MBS traffic to different QoS flows. A flow with a relatively high QoS value can correspond to audio packets, and a flow with a relatively low QoS value can correspond to video packets, for example. As another example, a flow with a relatively high QoS value can correspond to I-frames or complete images used in video compression, and a flow with a relatively low QoS value can correspond to P-frames or predicted pictures that include only changes to I-frames.

With continued reference to FIG. 3, the base station 104/106 and the CN 110 can maintain one or more PDU sessions to support unicast traffic between the CN 110 and particular UEs. A PDU session 304A can include a UE-specific DL tunnel and/or UE-specific DL tunnel 322A corresponding to one or more DRBs 324A, such as a DRB 324A-1, 324A-2, . . . , 324-N. Each of the DRBs 324A can correspond to a respective logical channel, such as a DTCH.

Figure 4:
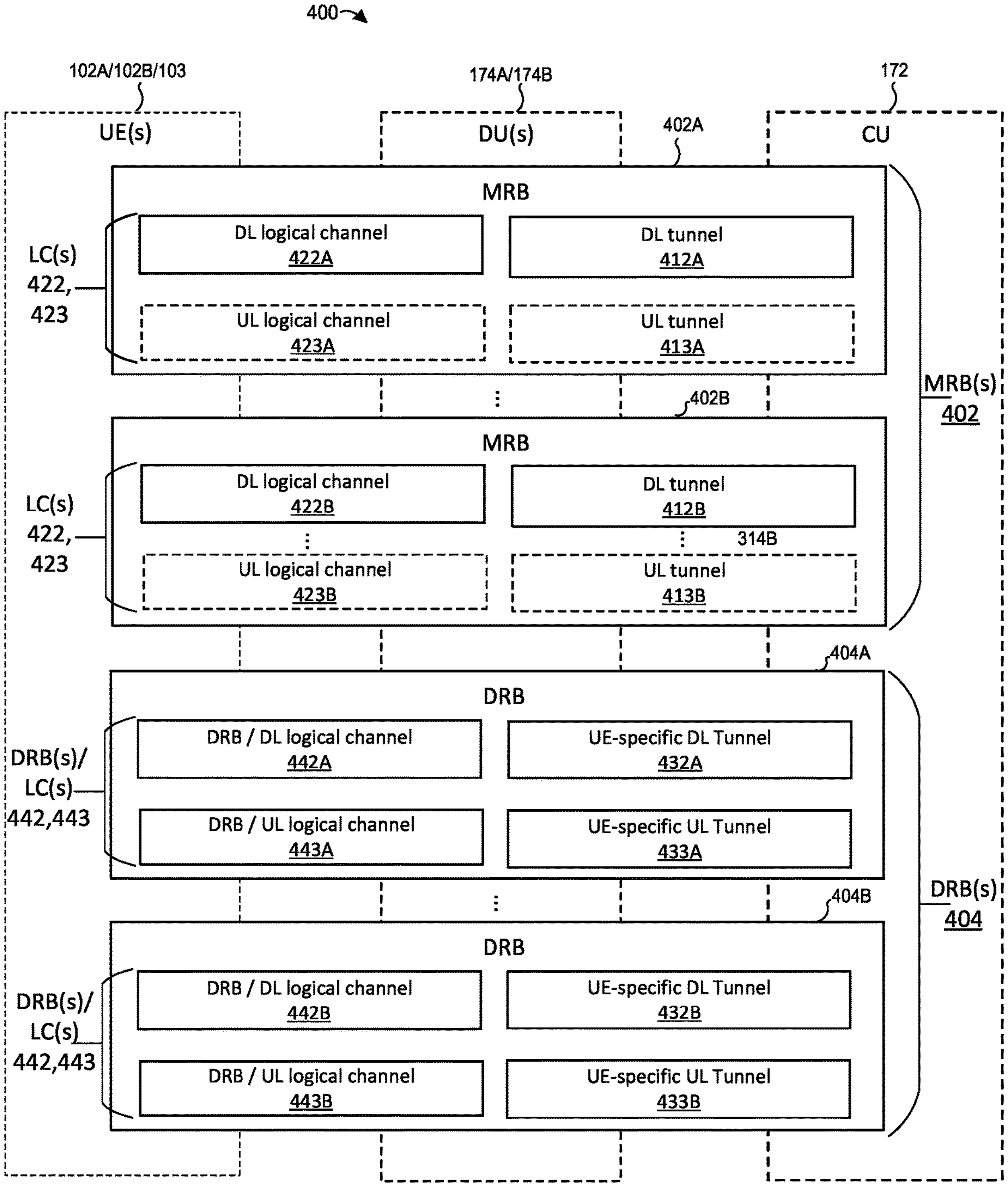
FIG. 4 is a block diagram illustrating example MRBs and DRBs which a distributed base station can configure for communicating multicast, broadcast, and/or unicast traffic with UEs, which can be implemented in a distributed base station of FIG. 1B.

Now referring to FIG. 4, when the base station 104/106 is implemented in a distributed manner, the CU 172 and the DU 174A/174B can establish tunnels for downlink data and/or uplink data associated with an MRB or a DRB. The MRB 314A-1 discussed above can be implemented as an MRB 402A connecting the CU 172 to multiple UEs such as the UE 102A and 102B, for example. The MRB 402A can include a DL tunnel 412A connecting the CU 172 and the DU 174A/174B, and a DL logical channel 422A corresponding to the DL tunnel 412A. In particular, the DU 174A/174B can map downlink traffic received via the DL tunnel 412A to the DL logical channel 422A, which can be an MTCH or a DTCH, for example. The DL tunnel 412A can be a common DL tunnel via which the CU 172 transmits MBS data packets to multiple UEs. Alternatively, the DL tunnel 412A can be a UE-specific DL tunnel via which the CU 172 transmits MBS data packets to a particular UE.

Optionally, the MRB 402A also includes a UL tunnel 413A connecting the CU 172 and the DU 174A/174B, and a UL logical channel 423A corresponding to the UL tunnel 413A. The UL logical channel 423A can be a DTCH, for example. The DU 174A/174B can map uplink traffic received via the UL logical channel 423A to the UL tunnel 413A.

The tunnels 412A and 413A can operate at the transport layer or sublayer of the F1-U interface. As a more specific example, the CU 172 and the DU 174A/174B can utilize an F1-U for user-plane traffic, and the tunnels 412A and 413A can be associated with the GTP-U protocol layered over UDP/IP, where IP is layered over suitable data link and physical (PHY) layers. Further, the MRB(s) 402 and/or the DRB(s) 404 in at least some of the cases additionally support control-plane traffic. More particularly, the CU 172 and the DU 174A/174B can exchange F1-AP messages over an F1-C interface that relies on a Stream Control Transmission Protocol (SCTP) layered over IP, where IP is layered over suitable data link and PHY layers similar to F1-U.

Similarly, an MRB 402B can include a DL tunnel 412B and, optionally, an UL tunnel 413B. The DL tunnel 412B can correspond to a DL logical channel 422B, and the UL tunnel 413B can correspond to the UL logical channel 423B.

The CU 172 in some cases uses a DRB 404A to transmit MBS data packets or unicast data packets associated with a PDU session, to a particular UE (e.g., the UE 102A or the UE 102B). The DRB 404A can include a UE-specific DL tunnel 432A connecting the CU 172 and the DU 174A/174B, and a DL logical channel 442A corresponding to the DL tunnel 432A In particular, the DU 174A/174B can map downlink traffic received via the DL tunnel 432A to the DL logical channel 442A, which can be a DTCH, for example. The DRB 404A further includes a UE-specific UL tunnel 433A connecting the CU 172 and the DU 174A/174B, and a UL logical channel 443A corresponding to the UL tunnel 433A. The UL logical channel 443A can be a PUSCH, for example. The DU 174A/174B can map uplink traffic received via the UL logical channel 443A to the UL tunnel 433A.

Similarly, a DRB 404B can include a UE-specific DL tunnel 432B corresponding to a DL logical channel 442B, and a UE-specific UL tunnel 433B corresponding to a UL logical channel 443B.

Figure 5A:
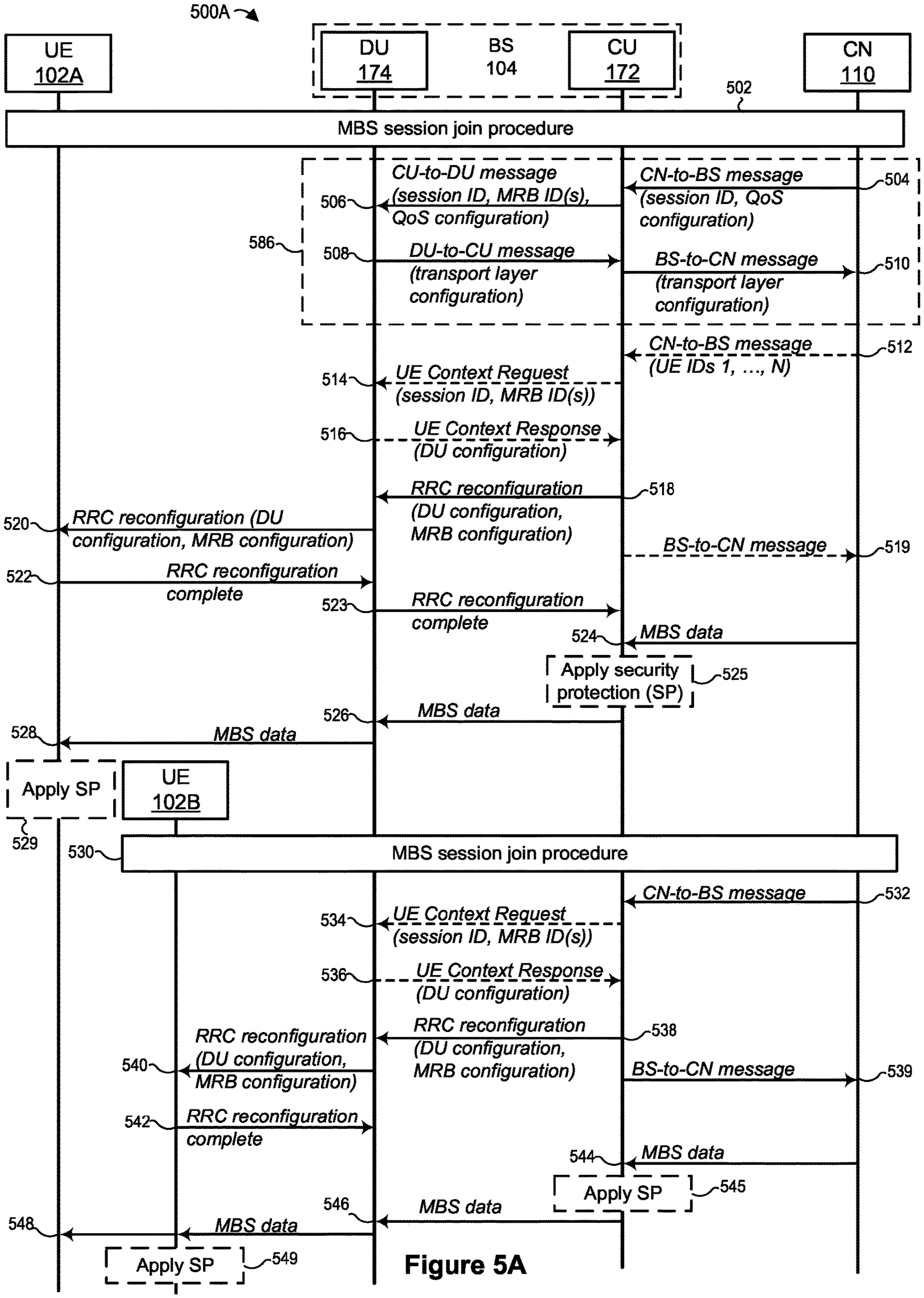
FIG. 5A is a message sequence of an example method for configuring resources for transmitting MBS data of an MBS session to multiple UEs, which can be implemented in a distributed base station of FIG. 1B.

Referring to FIG. 5A, the base station 104, implemented as a distributed base station, configures a common tunnel for MBS data in response to the CN requesting resources for an MBS session, and subsequently determines which security protection to apply to the MBS data prior to transmitting the MBS data to the UE 102A and/or UE 102B. After receiving the MBS data, the UE 102A and/or UE 102B can determine which security protection to apply to the MBS data. The UE 102A in a scenario 500A initially performs 502 an MBS session join procedure with the CN 110 via the base station 104 to join a certain MBS session. In some scenarios, the UE 102A subsequently performs additional one or more MBS join procedures, and event 502 accordingly is a first one of multiple MBS join procedures. When the base station 104 configures a common DL tunnel for MBS traffic rather than a UE-specific tunnel, the procedures 502 and 586 can occur in either order. In other words, the base station 104 can configure a common DL tunnel before even a single UE joins the MBS session.

To perform the MBS session join procedure, the UE 102A in some implementations sends an MBS session join request message to the CN 110 via the base station 104. In response, the CN 110 can send an MBS session join response message to the UE 102A via the base station 104 to grant the UE 102A access to the first MBS session. In some implementations, the UE 102A can include an MBS session ID of the MBS session in the MBS session join request message. The CN 110 in some cases includes the MBS session ID in the MBS session join response message. In some implementations, the UE 102A can send an MBS session join complete message to the CN 110 via the base station 104 in response to the MBS session join response message.

The UE 102A in some cases performs additional MBS session join procedure(s) with the CN 110 via the RAN 105 (e.g., the base station 104 or base station 106) to join additional MBS session(s). For example, the UE 102A can perform a second MBS session join procedure with the CN 110 via the RAN 105 to join a second MBS session. Similar to event 402, the UE 102A in some implementations can send a second MBS session join request message to the CN 110 via the base station 104, and the CN 110 can respond with a second MBS session join response message to grant the UE 102A access to the second MBS session. In some implementations, the UE 102A can send a second MBS session join complete message to the CN 110 via the base station 104 in response to the second MBS session join response message. In some implementations, the UE 102A can include a second MBS session ID of the second MBS session in the second MBS session join request message. The CN 110 optionally includes the second MBS session ID in the second MBS session join response message. In some implementations, the UE 102A can include the first and second MBS session IDs in an MBS session join request message (e.g., the first MBS session join request message) to join the first and second MBS sessions at the same time. In such cases, the CN 110 can send an MBS session response message to grant either the first MBS session or the second MBS session, or both the first and MBS sessions.

In some implementations, the MBS session join request message, MBS session join response message, and MBS session join complete message can be session initiation protocol (SIP) messages. In other implementations, the MBS session join request message, MBS session join response message, and MBS session join complete message can be NAS messages such as 5G mobility management (5GMM) messages or 5G session management messages (5GSM). In the case of the 5GSM messages, the UE 102A can transmit to the CN 110 via the base station 104 a (first) UL container message including the MBS session join request message, the CN 110 can transmit to the UE 102A via the base station 104 a DL container message including the MBS session join response message, and the UE 102A can transmit to the CN 110 via the base station 104 a (second) UL container message including the MBS session join complete message. These container messages can be 5GMM messages. In some implementations, the MBS session join request message, MBS session join response message, and MBS session join complete message can be a PDU Session Modification Request message, a PDU Session Modification Command message, and a PDU Session Modification Complete message, respectively. To simplify the following description, the MBS session join request message, the MBS session join response message, and/or the MBS session join complete message can represent the container messages.

In some implementations, the UE 102A can perform a PDU session establishment procedure with the CN 110 via the base station 104 to establish a PDU session in order to perform the (first) MBS session join procedure. During the PDU session establishment procedure, the UE 102A can communicate a PDU session ID of the PDU session with the CN 110 via the base station 104.

In some implementations, before performing the (first) MBS session join procedure (event 502), the base station 104 can perform a security activation procedure (e.g., RRC security mode procedure) with the UE 102A to activate security protection (e.g., integrity protection/integrity check and/or encryption/decryption) on data communications during an MBS session with the UE 102A. In one implementation of the security activation procedure, the base station 104 can send a security activation command message (e.g., SecurityModeCommand message) to the UE 102A, e.g., via an SRB, and in response, the UE 102A can activate security (e.g., integrity protection and/or encryption) on data communications during the MBS session with the base station 104 and transmit a security activation complete message (e.g., SecurityModeComplete message) to the base station 104, e.g., via the SRB. In some implementations, the UE 102A can perform the (first) MBS session join procedure after performing the security activation procedure, so that the (first) MBS session join procedure is protected by the security. In other implementations, the UE 102A can perform the (first) MBS session join procedure before performing the security activation procedure.

Before, during, or after the (first) MBS session join procedure (event 502), the CN 110 can send 504 a (first) CN-to-BS message including the first MBS session ID and/or PDU session ID to the CU 172 to request the CU 172 to configure resources for the first MBS session. In response to receiving 504 the first CN-to-BS message, the CU 172 sends 506 a CU-to-DU message to the DU 174 to request a set-up for an MBS context and/or a common DL tunnel for the first MBS session. In response to receiving 506 the first CU-to-DU message, the DU 174 sends 508, to the CU 172, a DU-to-CU message including a first DU DL transport layer configuration to configure a common CU-to-DU DL tunnel for the first MBS session. In some implementations, the CU-to-DU message is a generic F1AP message or a dedicated F1AP message defined specifically to convey this type of a request (e.g., MBS Context Setup Request message). In some implementations, the DU-to-CU message of event 508 is a generic F1AP message or a dedicated F1AP message defined specifically for this purpose (e.g., MBS Context Setup Response message). The CN 110 can additionally include QoS configuration(s) for the first MBS session. In such cases, the CU 172 can include the QoS configuration(s) in the CU-to-DU message (event 506).

The CU 172 sends 510 a first BS-to-CN message (e.g., MBS Session Resource Setup Response message) in response to the message of event 504. The CU 172 can include the first MBS session ID and/or the PDU session ID in the first BS-to-CN message. The first BS-to-CN message can include a DL transport layer configuration to configure a common DL tunnel for the CN 110 to send MBS data to the CU 172. The DL transport layer configuration includes a transport layer address (e.g., an IP address and/or a TEID) to identify the common DL tunnel. In some implementations, the CN-to-BS message of event 504 is a generic NGAP message or a dedicated NGAP message defined specifically for requesting resources for an MBS session (e.g., MBS Session Resource Setup Request message). In some implementations, the BS-to-CN message of event 510 is a generic NGAP message or a dedicated NGAP message defined specifically to convey resources for an MBS session (e.g., MBS Session Resource Setup Response message). In such cases, the CN-to-BS message of event 504 and the BS-to-CN message of event 510 can be non-UE-specific messages.

In some implementations, the QoS configuration(s) include QOS parameters for the MBS session. In some implementations, the QoS configuration includes configuration parameters to configure one or more QoS flows for the MBS session (see FIG. 3). In some implementations, the configuration parameters include one or more QoS flow IDs identifying the QoS flow(s). Each of the QoS flow ID(s) identifies a particular QOS flow of the QoS flow(s). In some implementations, the configuration parameters include QoS parameters for each QoS flow. The QoS parameters can include a 5G QOS identifier (5QI), a priority level, packet delay budget, packet error rate, averaging window, and/or a maximum data burst volume. The CN 110 can specify different values of the QOS parameters for the QoS flows.

The events 504, 506, 508, and 510 are collectively referred to in FIG. 5A as an MBS session resource setup procedure 586.

In cases where the CN 110 grants the additional MBS session(s) for the UE 102A in the additional MBS session join procedure(s), the CN 110 can include the additional MBS session ID(s) and, optionally, QOS configuration(s) for the additional MBS session ID(s) in the first CN-to-BS message, the second CN-to-BS message, or additional CN-to-BS message(s) similar to the first or second CN-to-BS message. In such cases, the CU 172 includes additional transport layer configuration(s) for the additional MBS session(s) to configure additional common DL tunnel(s) in the first BS-to-CN message, the second BS-to-CN message, or additional BS-to-CN message(s) similar to the first or second BS-to-CN message. Each of the transport layer configuration(s) configures a particular common DL tunnel of the common DL tunnel(s) and can be associated to a particular MBS session of the additional MBS session(s). Alternatively, the CN 110 can perform additional MBS session resource setup procedure(s) with the CU 172 to obtain the additional transport layer configuration(s) from the CU 172, similar to the single-session MBS session resource setup procedure 586 shown in FIG. 5A. The transport layer configurations can be different to distinguish between different common DL tunnels. In particular, any pair of the transport layer configurations can have different IP addresses, different DL TEIDs, or different IP addresses as well as different DL TEIDs.

In some implementations, the CN 110 can indicate, in the first CN-to-BS message, a list of UEs joining the first MBS session. In other implementations, the CN 110 can send 512 to the CU 172 a second CN-to-BS message indicating a list of UEs joining the first MBS session. The CN 110 can include the first MBS session ID and/or the PDU session ID in the second CN-to-BS message. The CU 172 can send 519 a second BS-to-CN message to the CN 110 in response to the second CN-to-BS message 512. In such cases, the second CN-to-BS message can be a non-UE-specific message, i.e., a message not specific for the UE 102A or the UE 102B. The CU 172 can include the first MBS session ID and/or the PDU session ID in the second BS-to-CN message. For example, the list of UEs includes the UE 102A and/or UE 102B. To indicate a list of UEs, the CN 110 can include a list of (CN UE interface ID, RAN UE interface ID) pairs, each identifying a particular UE of the UEs. The CN 110 assigns the CN UE interface ID, and the CU 172 assigns the RAN UE interface ID. Before the CN 110 sends the list of (CN UE interface ID, RAN UE interface ID) pairs, the CU 172 sends a BS-to-CN message (e.g., a NGAP message, an INITIAL UE MESSAGE or PATH SWITCH REQUEST message) including the RAN UE interface ID to the CN 110 for each of the UEs, and the CN 110 sends a CN-to-BS message (e.g., a NGAP message, an INITIAL CONTEXT SETUP REQUEST message or PATH SWITCH REQUEST ACKNOWLEDGE message) including the CN UE interface ID to the CU 172 for each of the UEs. In one example, the list of pairs includes a first pair of (a first CN UE interface ID and a first RAN UE interface ID) identifying the UE 102A and a second pair of (a second CN UE interface ID, a second RAN UE interface ID) identifying the UE 102B. In some implementations, the "CN UE interface ID" can be an "AMF UE NGAP ID" and the "RAN UE interface ID" can be a "RAN UE NGAP ID". In other implementations, the CN 110 can include a list of UE IDs each identifying a particular UE of the UEs. In some implementations, the CN 110 can assign the UE IDs and send each of the UE IDs to a particular UE of the UEs in a NAS procedure (e.g., a registration procedure) that the CN 110 performs with the particular UE. For example, the list of UE IDs can include a first UE ID of the UE 102A and a second UE ID of the UE 102B. In some implementations, the UE IDs are S-Temporary Mobile Subscriber Identities (S-TMSIs) (e.g., 5G-S-TMSIs). Before the CN 110 sends the list of UE IDs, the CU 172 can receive the UE ID from the UE 102A or the CN 110 for each of the UEs. For example, the CU 172 can receive a RRC message (e.g., a RRCSetupComplete message) including the UE ID from the UE 102A during a RRC connection establishment procedure. In another example, the CU 172 can receive a CN-to-BS message (e.g., a NGAP message, an INITIAL CONTEXT SETUP REQUEST message or UE INFORMATION TRANSFER message) including the UE ID from the CN 110.

In other implementations, the CN 110 can send 512 to the CU 172 a second CN-to-BS message indicating (only) the UE 102A (e.g., but not the UE 102B) joins the first MBS session. The second CN-to-BS message can be a UE-associated message for the UE 102A. That is, the second CN-to-BS message is specific for the UE 102A. In response to receiving the second CN-to-BS message, the CU 172 can send 514 to the DU 174 a UE Context Request message for the UE 102A. In some implementations, the CU 172 can include, in the UE Context Request message, the first MBS session ID and/or MRB ID(s) of MRB(s) associated to the first MBS session (ID). In response to the UE Context Request message, the DU 174 sends 516 to the CU 172 a UE Context Response message including configuration parameters for the UE 102A to receive MBS data of the first MBS session. In some implementations, the CU 172 can include the QoS configuration(s) in the UE Context Request message. In such cases, the CU 172 may or may not include the QoS configuration(s) in the CU-to-DU message. (Some of) the configuration parameters may be associated to the MRB(s)/MRB ID(s). In some implementations, the DU 174 generates a DU configuration to include the configuration parameters and includes the DU configuration in the UE Context Response message. In some implementations, the DU configuration can be a CellGroupConfig IE. In other implementations, the DU configuration can be an MBS specific IE. In some implementations, the configuration parameters configure one or more logical channels (LCs) associated with the MRB(s). The DU 174 configures a logical channel (ID) (value) to be associated to a particular MRB (ID) (value). For example, the configuration parameters include one or more logical channel IDs (LCIDs) to configure the one or more logical channel. Each of the LCIDs identifies a particular logical channel of the one or more logical channels. In some implementations the DU 174 refrains from configuring a LCID (value) to be associated with different MRBs associated to different MBS sessions (e.g., including the first MBS session and the additional MBS session(s)). In other implementations, the DU 174 refrains from configuring a LCID (value) to be associated with different MRBs associated to the same MBS session (e.g., the first MBS session). In such implementations, the DU 174 may configure the an LCID (value) to be associated with different MRBs where each is associated with a particular MBS session.

In some implementations, the second CN-to-BS message and the second BS-to-CN message can be a PDU Session Resource Modify Request message and a PDU Session Resource Modify Response message, respectively.

In cases where the CN 110 grants the additional MBS session(s) for the UE 102A in the additional MBS session join procedure(s), the CN 110 can include the additional MBS session ID(s) and/or QoS configuration(s) for the additional MBS session ID(s) in the first CN-to-BS message or the second CN-to-BS message. In such cases, the CU 172 can include the additional MBS session ID(s) in the CU-to-DU message, and the DU 174 include, in the DU-to-CU message, additional DU transport layer configuration(s) to configure additional CU-to-DU DL tunnel(s) for the additional MBS session(s). Alternatively, the CU 172 can perform additional MBS context setup procedure(s) with the DU 174 to obtain the additional DU DL transport layer configuration(s), similar to the events 506 and 508. In some implementations, the CU 172 includes, in the first BS-to-CN message, additional CU DL transport layer configuration(s) for the additional MBS session(s) to configure additional CN-to-BS common DL tunnel(s). Each of the transport layer configuration(s) configures a particular DL tunnel of the common CN-to-BS DL tunnel(s) and can be associated to a particular MBS session of the additional MBS session(s). Alternatively, the CN 110 can perform additional MBS session resource setup procedure(s) with the CU 172 to obtain the additional CU DL transport layer configuration(s) from the CU 172, similar to the MBS session resource setup procedure 586. The transport layer configurations can be different to distinguish between different common DL tunnels. In particular, any pair of the transport layer configurations can have different IP addresses, different DL TEIDs, or different IP addresses as well as different DL TEIDs.

In some implementations, the CN 110 includes the QoS configuration(s) in the second CN-to-BS message. In such cases, the CN 110 may include the QoS configuration(s) in the first CN-to-BS message, or omit the QoS configuration(s). In some implementations, the DU 174 generates the configuration parameters for the UE 102A to receive MBS data of the first MBS session in response receiving the CU-to-DU message or the UE Context Request message. In some implementations, the CU 172 includes the QoS configuration(s) in the UE Context Request message and/or the CU-to-DU message. The DU 174 can determine the content of the configuration parameters in accordance with the QoS configuration(s). When the CU 172 includes the QoS configuration(s) neither in the CU-to-DU message nor the UE Context Request message, the DU 174 can determine values of the configuration parameters in accordance with a predetermined QoS configuration.

In some implementations, the UE Context Request message and the UE Context Response message are a UE Context Setup Request message and a UE Context Setup Response message, respectively. In other implementations, the UE Context Request message and the UE Context Response message are a UE Context Modification Request message and a UE Context Modification Response message, respectively.

After receiving 516 the UE Context Response message, the CU 172 generates an RRC reconfiguration message including the configuration parameters and one or more MRB configurations and transmits 518 the RRC reconfiguration message to the DU 174. In turn, the DU 174 transmits 520 the RRC reconfiguration message to the UE 102A. The UE 102A then transmits 522 a RRC reconfiguration complete message to the DU 174, which in turn transmits 523 the RRC reconfiguration complete message to the CU 172.

In some implementations, the CU 172 generates a PDCP PDU including the RRC reconfiguration message and sends 518 a CU-to-DU message including the PDCP PDU to the DU 174, and the DU 174 retrieves the PDCP PDU from the CU-to-DU message and transmits 520 the PDCP PDU to the UE 102A via the RLC layer 206B, MAC layer 204B and PHY layer 202B. The UE 102A receives 520 the PDCP PDU from the DU 174 via the PHY layer 202B, MAC layer 204B and RLC layer 206B. In some implementations, the UE 102A generates a PDCP PDU including the RRC reconfiguration complete message and transmits 522 the PDCP PDU to the DU 174 via the RLC layer 206B, MAC layer 204B and PHY layer 202B. The DU 174 receives 522 the PDCP PDU from the UE 102A via the PHY layer 202B, MAC layer 204B and RLC layer 206B and sends 523 a DU-to-CU including the PDCP PDU to the CU 172. The CU 172 retrieves the PDCP PDU from the DU-to-CU message and retrieves the RRC reconfiguration complete message from the PDCP PDU.

Before or after receiving 516 the UE Context Response message, the CU 172 can send 519 a second BS-to-CN message to the CN 110 in response to the second CN-to-BS message 408. In some implementations, the CU 172 sends 519 the second BS-to-CN message to the CN 110 before receiving 523 the RRC reconfiguration complete message. In other implementations, the CN 110 sends 519 the second BS-to-CN message to the CN 110 after receiving 523 the RRC reconfiguration complete message. The CU 172 can include the first CN UE interface ID and the first RAN UE interface ID in the second BS-to-CN message. Alternatively, the CU 172 can include the first UE ID in the second BS-to-CN message.

In some implementations, respective instances of the events 512, 514, 516, 518, 519, 520, 522, 523 occur for each of the UE 102A and the UE 102B. The configuration parameters for the UE 102A and the UE 102B to receive MBS data of the first MBS session can be the same.

In some implementations, the CU 172 includes the CU DL transport layer configuration(s) in the second BS-to-CN message and/or the additional BS-to-CN message. In other words, the CU 172 can send the same CU DL transport layer configuration(s) in BS-to-CN messages in responses to CN-to-BS messages indicating UEs joining the same MBS session. In such implementations, the CN 110 can blend the MBS resource setup procedure 586 and the second CN-to-BS and BS-to-CN messages into a single procedure.

In cases where the CU 172 performs the MBS resource setup procedure 586 (e.g., events 504, 510) with the CN 110 to establish the common CN-to-BS DL tunnel for the first MBS session, the CU 172 may refrain from including a DL transport layer configuration for the first MBS session in the second BS-to-CN message. In such cases, the CN 110 may refrain from including a UL transport layer configuration for the first MBS session in the second CN-to-BS message. In cases where the DU 174 performs the MBS resource setup procedure 590 (e.g., events 506, 508) with the CU 172 to establish the common CU-to-DU DL tunnel for the first MBS session, the DU 174 may refrain from including a DL transport layer configuration for the first MBS session in the UE Context Response message. In such cases, the CU 172 may refrain from including a UL transport layer configuration for the first MBS session in the UE Context Request message.

After receiving 510 the first BS-to-CN message or 519 the second BS-to-CN message, the CN 110 can send 524 MBS data (e.g., one or multiple MBS data packets) to the CU 172 via the common CN-to-BS DL tunnel, which in turn sends the 526 the MBS data to the DU 174 via the common CU-to-DU tunnel. The DU 174 transmits (e.g., multicast or unicast) 528 the MBS data via the one or more logical channels to the UE 102A. The UE 102A receives 528 the MBS data via the one or more logical channels. For example, the CU 172 receives 524 an MBS data packet, generates a PDCP PDU including the MBS data packet and transmits 526 the PDCP PDU to the DU 174. In turn, the DU 174 generates a MAC PDU including the logical channel ID and the PDCP PDU, and transmits 528 the MAC PDU to the UE 102A using multicast or unicast. The UE 102A receives 528 the MAC PDU transmitted from the DU 174 using multicast or unicast, retrieves the PDCP PDU and the logical channel ID from the MAC PDU, identifies the PDCP PDU associated with the MRB and retrieves the MBS data packet from the PDCP PDU.

In some implementations, after the CN 110 sends 524 MBS data to the CU 172, the CU 172 can determine 525 which security protection to apply to the MBS data based on certain criteria, prior to transmitting (e.g., multicast or unicast) 528 the MBS data to the UE 102A via the DU 174. For example, if the CU 172 determines that an MBS data packet is received via the common CN-to-BS DL tunnel, the CU 172 determines to apply a null security protection, effectively refraining from applying security protection to the received MBS data packet. Additional criteria will be discussed further below with reference to FIGS. 6A-6S. In any event, if the CU 172 determines to apply security protection to the received MBS data packet, the CU 172 can apply at least one security function (e.g., integrity protection and/or encryption) to the MBS data packet to generate a security-protected MBS data packet. More particularly, when integrity protection is enabled, the CU 172 generates a message authentication code for integrity (MAC-I) for protecting integrity of the MBS data packet, so that security-protected MBS data packet includes the MBS data and the MAC-I. When encryption is enabled, the CU 172 encrypts the MBS data packet to generate an encrypted MBS data packet, so that security-protected MBS data packet is an encrypted MBS data packet. Further, when both integrity protection and encryption are enabled, the CU 172 can generate a MAC-I for protecting integrity of the MBS data packet and encrypt the MBS data packet along with the MAC-I to generate an encrypted MBS packet and an encrypted MAC-I.

If the CU 172 determines to refrain from applying 525 security protection to an MBS data packet, the CU 172 in turn sends 526 the MBS data packet to the DU 174 via the common CU-to-DU tunnel. The DU 174 transmits (e.g., multicast or unicast) 528 the MBS data packet via the one or more logical channels to the UE 102A. If the CU 172 applies 525 security protection to an MBS data packet to obtain a security-protected MBS data packet and transmits 528 the security-protected MBS data packet to the UE 102A via the DU 174, the UE 102A can receive the security-protected MBS data packet and subsequently apply 529 security protection or a security check scheme to the security-protected MBS data packet(s) to obtain the original MBS data packet. In some implementations, the CU 172 can generate a PDCP PDU including the (security-protected) MBS data packet and a PDCP sequence number and transmit 526 the PDCP PDU to the DU 174 via a DL tunnel. The CU 172 can transmit the PDCP PDU to another DU via another DL tunnel. To simplify the following description, the MBS data packet can represent the PDCP PDU including the MBS data packet.

The DU 174 can transmit the MBS data packet via multicast or unicast. To transmit MBS data packet via multicast, the DU 174 in some implementations generates a MAC PDU including the MBS data packet and transmits 528 a multicast transmission including the MAC PDU as described below. To transmit the MBS data packet via unicast, the DU 174 in some implementations generates a MAC PDU including the MBS data packet and transmits 528 a unicast transmission including the MAC PDU to the UE 102A. To transmit or schedule the unicast transmission, the DU 174 can generate a downlink control information (DCI), generates a cyclic redundancy check (CRC) of the DCI and scrambles the CRC with a UE-specific ID (e.g., a cell Radio Network Temporary Identifier (C-RNTI)) of the UE 102A. The DU 174 transmits the DCI and scrambled CRC on a PDCCH. The UE 102A receives the DCI and the scrambled CRC on the PDCCH and receives the unicast transmission in accordance with the DCI. The UE 102A confirms that the DCI or unicast transmission is addressed to the UE 102A in accordance with the ID of the UE 102A. The UE 102A retrieves the MBS data packet from the unicast transmission. In the DCI, the DU 174 can include configuration parameters to schedule the unicast transmission, similar to a DCI for a multicast transmission as described below. In some implementations, a DCI format of the DCI for the unicast transmission can be the same as a DCI format of the DCI for the multicast transmission. In other implementations, a DCI format of the DCI for the unicast transmission can be different from a DCI format of the DCI for the multicast transmission.

In some implementations, the UE 102 can determine 529 which security check scheme and/or security protection to apply to the received MBS data packet based on certain criteria. For example, if the UE 102 determines that the MBS data packet was transmitted from the base station 104 using multicast, the UE 102A can determine to apply a null security check scheme, effectively refraining from applying decryption, integrity verification, or another security check scheme to the received MBS data packet. Additional criteria will be discussed further below with reference to FIGS. 6A-6S. In any event, if the MBS data packet is security-protected, the UE 102A can retrieve the MBS data packet from the security-protected MBS data packet. If the security-protected MBS data packet is an encrypted MBS data packet, the UE 102A can decrypt the encrypted MBS data packet using the appropriate decryption function and a security key previously provided by the base station 104 to obtain the MBS data. If the security-protected MBS data packet is the integrity-protected MBS data packet including the MBS data and the MAC-I, the UE 102A can determine whether the MAC-I is valid. If the UE 102A confirms that the MAC-I is valid, the UE 102A retrieves the MBS data packet. If, however, the UE 102A determines that the MAC-I is invalid, the UE 102A discards the MBS data packet. In some implementations, the UE 102A may maintain a counter to count the number of invalid MAC-Is received along with MBS data packets. If the counter reaches a particular counter value, the UE 102A can stop receiving MBS data. The UE 102A can pre-determine the counter value or receive a configuration configuring the counter value, from the CU 172 via the DU 174. In such cases, the UE 102A can perform a RRC connection re-establishment procedure with a CU (e.g., the CU 172 or another CU) via a DU (e.g., the DU 174 or another DU). Alternatively, the UE 102A can perform a MBS session release procedure or a PDU session release procedure with the CN 110 to release or leave the MBS session. Finally, when the security-protected MBS data packet is both encrypted and integrity-protected, with encrypted MBS data and an encrypted MAC-I, the UE 102A can decrypt the encrypted MBS packet and encrypted MAC-I to obtain the MBS data and the MAC-I. The UE 102A then can verify that the MAC-I is valid for the MBS data. If the UE 102A confirms that the MAC-I is valid, the UE 102A retrieves and processes the MBS data. Otherwise, when the UE 102A determines that the MAC-I is invalid, the UE 102A discards the MBS data.

In some implementations, the DU 174 generates a downlink control information (DCI) and a cyclic redundancy check (CRC) scrambled with an ID (e.g., a cell Radio Network Temporary Identifier (C-RNTI) or a group RNTI (G-RNTI)) of the UE 102A to transmit the MBS data packet. The DU 174 transmits the DCI and scrambled CRC to the UE 102A, e.g., on a physical downlink control channel (PDCCH). The UE 102A can confirm that the MBS data packet is addressed to the UE 102A according to the ID of the UE 102. In some implementations, the UE 102 can determine 529 which security protection to apply to the received MBS data packet based on certain criteria. For example, if the UE 102 determines that the MBS data packet was transmitted from the base station 104 using multicast, the UE 102A can determine to apply a null security protection, effectively refraining from applying security protection to the received MBS data packet. Additional criteria will be discussed further below with reference to FIGS. 7A-7E. In any event, if the MBS data packet is security-protected, the UE 102A can retrieve the MBS data packet from the security-protected MBS data packet. If the security-protected MBS data packet is an encrypted MBS data packet, the UE 102A can decrypt the encrypted MBS data packet using the appropriate decryption function and a security key previously provided by the base station 104 to obtain the MBS data. If the security-protected MBS data packet is the integrity-protected MBS data packet including the MBS data and the MAC-I, the UE 102A can determine whether the MAC-I is valid. If the UE 102A confirms that the MAC-I is valid, the UE 102A retrieves the MBS data packet. If, however, the UE 102A determines that the MAC-I is invalid, the UE 102A discards the MBS data packet. In some implementations, the UE 102A may maintain a counter to count the number of invalid MAC-Is received along with MBS data packets. If the counter reaches a particular counter value, the UE 102A can stop receiving MBS data. The UE 102A can pre-determine the counter value or receive a configuration configuring the counter value, from the CU 172 via the DU 174. In such cases, the UE 102A can perform a RRC connection re-establishment procedure with a CU (e.g., the CU 172 or another CU) via a DU (e.g., the DU 174 or another DU). Alternatively, the UE 102A can perform a MBS session release procedure or a PDU session release procedure with the CN 110 to release or leave the MBS session. Finally, when the security-protected MBS data packet is both encrypted and integrity-protected, with encrypted MBS data and an encrypted MAC-I, the UE 102A can decrypt the encrypted MBS packet and encrypted MAC-I to obtain the MBS data and the MAC-I. The UE 102A then can verify that the MAC-I is valid for the MBS data. If the UE 102A confirms that the MAC-I is valid, the UE 102A retrieves and processes the MBS data. Otherwise, when the UE 102A determines that the MAC-I is invalid, the UE 102A discards the MBS data.

In some implementations, the one or more MRB configurations configuring one or more MRBs are associated with the first MBS session. In some implementations, the configuration parameters also include one or more RLC bearer configurations, each associated with a particular MRB. Each of the MRB configuration(s) can include an MRB ID, a PDCP configuration, the first MBS session ID, a PDCP reestablishment indication (e.g., reestablishPDCP), and/or a PDCP recovery indication (e.g., recoveryPDCP). In some implementations, the PDCP configuration can be a PDCP-Config IE for DRB. In some implementations, the RLC bearer configuration can be an RLC-BearerConfig IE. In some implementations, the RLC bearer configuration may include a logical channel (LC) ID configuring a logical channel. In some implementations, the logical channel can be an MTCH. In other implementations, the logical channel can be a DTCH. In some implementations, the configuration parameters may include logical channel configuration (e.g., LogicalChannelConfig IE) for configuring the logical channel. In some implementations, the RLC bearer configuration may include the MRB ID.

In some implementations, the CU 172 can configure the MRB as a DL-only RB in the MRB configuration. For example, the CU 172 refrains from including UL configuration parameters in the PDCP configuration within the MRB configuration to configure the MRB as a DL only RB. The CU 172 only includes DL configuration parameters in the MRB configuration, e.g., as described above. In such cases, the CU 172 configures the UE 102A not to transmit UL PDCP data PDU via the MRB to the DU 174 and/or the CU 172 by excluding the UL configuration parameters for the MRB in the PDCP configuration in the MBR configuration. In another example, the DU 174 refrains from including UL configuration parameters in the RLC bearer configuration. In such cases, the DU 174 configures the UE 102A not to transmit control PDU(s) via the logical channel to the base station 104 by excluding the UL configuration parameters from the RLC bearer configuration.

In cases where the DU 174 includes UL configuration parameter(s) in the RLC bearer configuration, the UE 102A may transmit control PDU(s) (e.g., PDCP Control PDU(s) and/or RLC Control PDU(s)) via the logical channel to the DU 174 using the UL configuration parameter(s). If the control PDU is a PDCP control PDU, the DU 174 can send the PDCP control PDU to the CU 172. For example, the CU 172 may configure the UE to receive MBS data with a (de) compression protocol (e.g., robust header compression (ROHC) protocol), e.g., in the MRB configuration. In this case, when the CU 172 receives 524 an MBS data packet from the CN 110, the CU 172 compresses the MBS data packet with the compression protocol to obtain a compressed MBS data packet and transmits 526 a PDCP PDU including the compressed MBS data packet to the DU 174 via the common CU-to-DU DL tunnel. In turn, the DU 174 transmits (e.g., multicast or unicast) 528 the PDCP PDU to the UE 102A via the logical channel. When the UE 102A receives the PDCP PDU via the logical channel, the UE 102A retrieves the compressed MBS data packet from the PDCP PDU. The UE 102A decompresses the compressed MBS data packet with the (de) compression protocol to obtain the original MBS data packet. In such cases, the UE 102A may transmit a PDCP Control PDU including, a header compression protocol feedback (e.g., interspersed ROHC feedback) for operation of the header (de) compression protocol, via the logical channel to the DU 174. In turn, the DU 174 sends the PDCP Control PDU to the CU 172 via a UE-specific UL tunnel, i.e., the UL tunnel is specific for the UE 102A. In some implementations, the CU 172 can include, in the UE Context Request message, a CU UL transport layer configuration configuring the UE-specific UL tunnel. The CU UL transport layer configuration includes a CU transport layer address (e.g., an Internet Protocol (IP) address) and a CU UL TEID to identify the UE-specific UL tunnel.

In some implementations, the MRB configuration can be an MRB-ToAddMod IE including an MRB ID (e.g., mrb-Identity or MRB-Identity). An MRB ID identifies a particular MRB of the MRB(s). The base station 104 set the MRB IDs to different values. In cases where the CU 172 has configured DRB(s) to the UE 102A for unicast data communication, the CU 172 in some implementations can set one or more of the MRB ID(s) to values different from DRB ID(s) of the DRB(s). In such cases, the UE 102A and the CU 172 can distinguish whether an RB is an MRB or DRB in accordance an RB ID of the RB. In other implementations, the CU 172 can set one or more of the MRB ID(s) to values which can be the same as the DRB ID(s). In such cases, the UE 102A and the CU 172 can distinguish whether an RB is an MRB or DRB in accordance an RB ID of the RB and a RRC IE configuring the RB. For example, a DRB configuration configuring a DRB is a DRB-ToAddMod IE including a DRB identity (e.g., drb-Identity or DRB-Identity) and a PDCP configuration. Thus, the UE 102A can determine an RB is a DRB if the UE 102A receives a DRB-ToAddMod IE configuring the RB, and determine an RB is an MRB if the UE 102A receives an MRB-ToAddMod IE configuring the RB. Similarly, the CU 172 can determine an RB is an DRB if the CU 172 transmits a DRB-ToAddMod IE configuring the RB to the UE 102, and determine an RB is an MRB if the CU 172 transmits an MRB-ToAddMod IE configuring the RB to the UE 102A.

In some implementations, the configuration parameters for receiving MBS data of the first MBS session include one or more logical channel (LC) IDs to configure one or more logical channels. In some implementations, the logical channel(s) can be dedicated traffic channel(s) (DTCH(s)). In other implementations, the logical channel(s) can be multicast traffic channel(s) (MTCH(s)).

In some implementations, the configuration parameters may or may not include a G-RNTI. The RRC reconfiguration messages for UEs (e.g., the UE 102A and the UE 102B) joining the first MBS session, include the same configuration parameters for receiving MBS data of the first MBS session. In some implementations, the RRC reconfiguration messages for the UEs may include the same or different configuration parameters for receiving non-MBS data.

In some implementations, the configuration parameters can include dynamic scheduling multicast configuration parameter(s) for the UE 102A to receive multicast transmissions (each) including MBS data. In some implementations, the dynamic scheduling multicast configuration parameter(s) can include at least one of the following configuration parameters:

- Group radio network temporary identifier (G-RNTI). The DU 174 dynamically schedules each multicast transmission, including a particular MAC PDU, for a group of UEs including the UE 102A by generating a DCI, scrambling a CRC of the DCI with the G-RNTI, and transmitting the DCI and the scrambled CRC on a PDCCH. The MAC PDU can include an MBS data packet or a portion of an MBS data packet. The UE 102A receives the DCI and scrambled CRC on the PDCCH and verifies the scrambled CRC with the G-RNTI. For each multicast transmission, after the UE 102A verifies the (scrambled) CRC is valid, the UE 102 receives the multicast transmission in accordance with the corresponding DCI and retrieves the particular MAC PDU from the multicast transmission. In this case, each multicast transmission is a dynamic scheduling multicast transmission used in the following description. In some implementations, each DCI includes configuration parameters configuring a dynamic scheduling multicast radio resource scheduling the corresponding multicast transmission. In some implementations, the configuration parameters can include at least one of the following parameters. The configuration parameters of the each DCI can include the same values and/or different values for the following configuration parameters.
  - Frequency domain resource assignment
  - Time domain resource assignment
  - Virtual resource block (VRB)-to-physical resource block (PRB) mapping
  - Modulation and coding scheme (MCS)
  - New data indicator
  - Redundancy version
  - HARQ process number
  - Downlink assignment index
  - PUCCH resource indicator
- HARQ codebook (ID), which indicates a HARQ acknowledgement (ACK) codebook index for a corresponding HARQ ACK codebook for a dynamic scheduling multicast transmission received by the UE 102A. The DU 174 uses the HARQ codebook (ID) to receive a HARQ ACK. In cases where the configuration parameters do not include the HARQ codebook (ID), the UE 102A and DU 174 may use a HARQ codebook (ID) for unicast transmission. In some implementations, the UE 102A can receive the HARQ codebook (ID) for unicast transmission in the DU configuration from the DU 174. In other implementations, the UE 102A can receive the HARQ codebook (ID) for unicast transmission in another DU configuration from the DU 174, similar to events 516, 518 and 520.

PUCCH resource configuration, which indicates a HARQ resource on a PUCCH where the UE 102A transmits a HARQ feedback (e.g., HARQ ACK and/or negative ACK (NACK)) for a dynamic scheduling multicast transmission. In cases where the configuration parameters do not include the PUCCH resource configuration, the UE 102A and DU 174 can use a PUCCH resource configuration for unicast transmissions to communicate HARQ feedback.

HARQ NACK only indication, which configures the UE 102A to only transmit a HARQ negative ACK (NACK) for a dynamic scheduling multicast transmission that the UE 102A receives from the DU 174 and from which the UE 102A fails to obtain a transport block. In some implementations, the UE 102A fails to obtain the transport block because the UE 102A fails a cyclic redundancy check (CRC) for the transport block or the UE 102A does not receive the dynamic scheduling multicast transmission. In accordance with the indication, the UE 102A refrains from transmitting to the DU 174 a HARQ ACK for a dynamic scheduling multicast transmission that the UE 102A successfully receives and from which the UE 102A obtains a transport block. In cases where the configuration parameters do not include the indication, the UE 102A can transmit to the DU 174 a HARQ ACK for a dynamic scheduling multicast transmission that the UE 102A successfully receives and from which the UE 102A obtains a transport block.

HARQ ACK/NACK indication, which configures the UE 102A to transmit a HARQ NACK for a dynamic scheduling multicast transmission where the UE 102A fails to obtain a transport block and configures the UE 102A to transmit a HARQ ACK for a dynamic scheduling multicast transmission that the UE 102A successfully receives and from which the UE 102A obtains a transport block. In cases where the configuration parameters do not include the indication, the UE 102A refrains from transmitting to the DU 174 a HARQ ACK for a dynamic scheduling multicast transmission that the UE 102A successfully receives and from which the UE 102A obtains a transport block. In such cases, the UE 102A is only allowed to transmit to the DU 174 a HARQ NACK for a dynamic scheduling multicast transmission where the UE 102A fails to obtain a transport block.

HARQ ACK indication, which configures the UE 102A to transmit a HARQ ACK for a dynamic scheduling multicast transmission that the UE 102A successfully receives and from which the UE 102A obtains a transport block. In cases where the configuration parameters do not include the indication, the UE 102A refrains from transmitting to the DU 174 a HARQ ACK for a dynamic scheduling multicast transmission where the UE 102A successfully obtains a transport block. In such cases, the UE 102A is only allowed to transmit to the DU 174 a HARQ NACK for a dynamic scheduling multicast transmission where the UE 102A fails to obtain a transport block. In some implementations, the DU 174 can include either one of the HARQ NACK indication, HARQ ACK/NACK indication and HARQ ACK indication.

Modulation and coding scheme (MCS) configuration, which indicates a MCS table that the DU 174 uses to transmit dynamic scheduling multicast transmissions and the UE 102A uses to receive dynamic scheduling multicast transmissions. For example, the MCS table can be a MCS table defined in 3GPP specification 38.214 (e.g., a low-SE 64QAM table indicated in Table 5.1.3.1-3 of 3GPP TS 38.214 or a new table specific for multicast transmission). In some implementations, if DU 174 does not include the MCS configuration in the DU configuration, the UE 102A and DU 174 can apply a MCS table predefined in 3GPP specification 38.214. For example, the predefined MCS table can be a 256QAM table or a 64QAM table, e.g., indicated in Table 5.1.3.1-2 or non-low-SE 64QAM table indicated in Table 5.1.3.1-1 of the specification 38.214, respectively. In cases where the DU 174 does not include the MCS configuration in the DU configuration, the UE 102A and DU 174 can apply a MCS table for unicast transmission to receive dynamic scheduling multicast transmissions from the DU 174. In some implementations, the DU 174 can include, in the DU configuration, a physical downlink shared channel (PDSCH) configuration (e.g., PDSCH-Config) configuring the MCS table for unicast transmissions. In other implementations, the DU 174 can transmit to the UE 102A another DU configuration including the PDSCH configuration, similar to events 516, 518, and 520.

Aggregation factor, which is the number of repetitions for dynamic scheduling multicast transmission(s). The DU 174 can transmit (i.e., multicast) a number of repetitions of a dynamic scheduling multicast transmission in accordance the aggregation factor, and the UE 102A receives the repetitions based on the aggregation factor. In cases where the DU 174 does not include the aggregation factor in the DU configuration, the UE 102A in some implementations can apply an aggregation factor for unicast transmission(s). In some implementations, the DU 174 can include the aggregation factor for unicast transmission(s) to the UE 102A in the DU configuration. In other implementations, the DU 174 can transmit another DU configuration including the aggregation factor for unicast transmissions to the UE 102, similar to events 516, 518, and 520.

The RRC reconfiguration messages for UEs joining the first MBS session, include the same configuration parameters for receiving MBS data of the first MBS session. In some implementations, the RRC reconfiguration messages for the UEs may include the same or different configuration parameters for receiving non-MBS data.

In some implementations, the configuration parameters can include at least one semi-persistent scheduling (SPS) multicast configuration for the UE 102A to receive MBS data. Each of the at least one SPS multicast configuration can include at least one of the following parameters for SPS multicast transmissions.

Group configured scheduling radio network temporary identifier (G-CS-RNTI), which is used to activate or release an SPS multicast radio resource. The DU 174 can activate an SPS multicast radio resource for a group of UEs including the UE 102A by generating an SPS multicast radio resource activation command (i.e., a DCI), scrambling a CRC of the DCI with the G-CS- RNTI, and transmitting the DCI and the scrambled CRC on a PDCCH. After activating the SPS multicast radio resource, the DU 174 periodically transmits a multicast transmission on the SPS multicast radio resource in accordance with the DCI. The UE 102A receives the DCI and scrambled CRC on the PDCCH and verifies the scrambled CRC with the G-CS-RNTI. After the UE 102A verifies the (scrambled) CRC is valid, the UE 102A activates (receiving on) the SPS multicast radio resource in response to the DCI and periodically receives a multicast transmission on the SPS multicast radio resource in accordance with the SPS multicast radio resource activation command (i.e., DCI) before the UE 102 deactivates the SPS multicast radio resource. In this case, the multicast transmission is an SPS multicast transmission used in the following description. In some implementations, the DU 174 can deactivate (or release) the SPS multicast radio resource by generating an SPS multicast radio resource deactivation command (i.e., a DCI), scrambling a CRC of the DCI with the G-CS-RNTI, and transmitting the DCI and the scrambled CRC on a PDCCH. The UE 102A receives the DCI and scrambled CRC on the PDCCH and verifies the scrambled CRC with the G-CS-RNTI. After the UE 102A verifies the (scrambled) CRC is valid, the UE 102A deactivates the SPS multicast radio resource, i.e., stops receiving on the SPS multicast radio resource. Each of the SPS multicast transmissions includes a particular MAC PDU which can include an MBS data packet or a portion of an MBS data packet. In some implementations, the SPS multicast radio resource activation command (i.e., DCI) includes configuration parameters configuring the SPS multicast radio resource. In some implementations, the configuration parameters can include at least one of the following parameters.

- Frequency domain resource assignment
- Time domain resource assignment
- Virtual resource block (VRB)-to-physical resource block (PRB) mapping
- Modulation and coding scheme (MCS)
- New data indicator
- Redundancy version
- HARQ process number
- Downlink assignment index
- PUCCH resource indicator Periodicity, which indicates a periodicity of the SPS multicast radio resource.

Number of HARQ processes, which indicates a number of HARQ processes for communicating SPS multicast transmissions. The DU 174 uses at most the number of HARQ processes to transmit SPS multicast transmissions, and the UE 102A uses at most the number of HARQ processes to receive the SPS multicast transmissions.

HARQ codebook ID, which indicates a HARQ ACK codebook index for a corresponding HARQ ACK codebook for an SPS multicast transmission or an SPS multicast radio resource deactivation command received by the UE 102A. In cases where the configuration parameters do not include the HARQ codebook (ID), the UE 102A may use a HARQ codebook (ID) for dynamic scheduling multicast transmission as described above. Alternatively, the UE 102A may use a HARQ codebook (ID) for unicast transmission. In some implementations, the UE 102A can receive the HARQ codebook (ID) for unicast transmission in the DU configuration from the DU 174 as described above.

HARQ process ID offset, which indicates an offset used in deriving HARQ process IDs for the DU 174 to transmit SPS multicast transmissions and for the UE 102A to receive SPS multicast transmissions.

PUCCH resource configuration for SPS multicast transmission, which indicates a HARQ resource on a PUCCH where the UE 102A transmits HARQ feedback (e.g., HARQ ACK and/or negative ACK (NACK)) for an SPS multicast transmission. In cases where the configuration parameters do not include the PUCCH resource configuration for SPS multicast transmission, the UE 102 and DU 174 can use a PUCCH resource configuration for dynamic scheduling multicast transmission to communicate a HARQ feedback as described above. Alternatively, the UE 102 can use a PUCCH resource configuration for unicast transmissions. In some implementations, the UE 102 can use the PUCCH resource configuration for unicast transmissions as described above.

HARQ NACK only indication, which configures the UE 102A to only transmit a HARQ negative ACK (NACK) for an SPS multicast transmission that the UE 102 receives from the DU 174 and from which the UE 102 fails to obtain a transport block. In some implementations, the UE 102 fails to obtain the transport block, because the UE 102A fails a cyclic redundancy check (CRC) for the transport block or the UE 102A does not receive the dynamic scheduling multicast transmission. In accordance with the indication, the UE 102 refrains from transmitting to the DU 174 a HARQ ACK for an SPS multicast transmission that the UE 102 successfully receives and from which the UE 102A obtains a transport block. In cases where the configuration parameters do not include the indication, the UE 102A can transmit to the DU 174 a HARQ ACK for an SPS multicast transmission that the UE 102A successfully receives and from which the UE 102A obtains a transport block.

HARQ ACK/NACK indication, which configures the UE 102A to transmit a HARQ NACK for an SPS multicast transmission where the UE 102A fails to obtain a transport block and configures the UE 102A to transmit a HARQ ACK for an SPS multicast transmission that the UE 102A successfully receives and from which the UE 102A obtains a transport block. In cases where the configuration parameters do not include the indication, the UE 102A refrains from transmitting to the DU 174 a HARQ ACK for an SPS multicast transmission that the UE 102A successfully receives and obtains a transport block. In such cases, the UE 102A is only allowed to transmit to the DU 174 a HARQ NACK for an SPS multicast transmission where the UE 102A fails to obtain a transport block.

HARQ ACK indication, which configures the UE 102A to transmit a HARQ ACK for an SPS multicast transmission that the UE 102A successfully receives and from which the UE 102 obtains a transport block. In cases where the configuration parameters do not include the indication, the UE 102A refrains from transmitting to the DU 174 a HARQ ACK for an SPS multicast transmission where the UE 102A successfully obtains a transport block. In such cases, the UE 102A is only allowed to transmit to the DU 174 a HARQ NACK for an SPS multicast transmission where the UE 102A fails to obtain a transport block. In some implementations, the DU 174 can include either one of the HARQ NACK indication, HARQ ACK/NACK indication and HARQ ACK indication.

Aggregation factor, which is the number of repetitions for SPS multicast transmission(s). The DU 174 can transmit (i.e., multicast) a number of repetitions of an SPS multicast transmission in accordance the aggregation factor, and the UE 102A receives the repetitions based on the aggregation factor. In cases where the DU 174 does not include the aggregation factor in the DU configuration, the UE 102A and DU 174 in some implementations can apply an aggregation factor for dynamic scheduling multicast transmission as described above. Alternatively, the UE 102A and DU 174 can apply an aggregation factor for unicast transmission(s). In some implementations, the UE 102A and DU 174 can apply an aggregation factor for unicast transmission(s) as described above.

MCS configuration, which indicates a MCS table that the DU 174 uses to transmit an SPS multicast transmission and the UE 102A uses to receive the SPS multicast transmission. For example, the MCS table can be a MCS table defined in 3GPP specification 38.214 (e.g., a low-SE 64QAM table indicated in Table 5.1.3.1-3 of 3GPP TS 38.214 or a new table specific for multicast transmission). In some implementations, if DU 174 does not include the MCS configuration in the DU configuration, the UE 102 and DU 174 can apply a MCS table predefined in 3GPP specification 38.214. For example, the predefined MCS table can be a 256QAM table or a 64QAM table, e.g., indicated in Table 5.1.3.1-2 or non-low-SE 64QAM table indicated in Table 5.1.3.1-1 of the specification 38.214, respectively. In cases where the DU 174 does not include the MCS configuration in the DU configuration, the UE 102A and DU 174 in other implementations can apply a MCS table for dynamic scheduling multicast transmission to receive SPS multicast transmissions from the DU 174 as described above. Alternatively, the UE 102A and DU 174 can apply a MCS table for unicast transmission to receive SPS multicast transmissions from the DU 174. In some implementations the UE 102A and DU 174 can apply a MCS table for unicast transmission to receive SPS multicast transmissions from the DU 174 as described above. In some implementations, the DU 174 can include, in the DU configuration, a PDSCH configuration (e.g., PDSCH-Config) configuring the MCS table for unicast transmissions. In other implementations, the DU 174 can transmit to the UE 102A another DU configuration including the PDSCH configuration, similar to events 516, 518, and 520.

In some implementations, the CU 172 can include the MBS session join response message in the RRC reconfiguration message. The UE 102A can include the MBS session join complete message in the RRC reconfiguration complete message. Alternatively, the UE 102A can send a UL RRC message including the MBS session join complete message to the CU 172 via the DU 174. The UL RRC message can be a ULInformationTransfer message or any suitable RRC message that can include a UL NAS PDU. The CU 172 can include the MBS session join complete message in the second BS-to-CN message. Alternatively, the CU 172 can send to the CN 110 a BS-to-CN message (e.g., an UPLINK NAS TRANSPORT message) including the MBS session join complete message.

In other implementations, the CU 172 transmits a DL RRC message that includes the MBS session join response message to the UE 102A. The DL RRC message can be a DLInformationTransfer message, another RRC reconfiguration message, or any suitable RRC message that can include a DL NAS PDU. The UE 102A can send a UL RRC message including the MBS session join complete message to the CU 172 via the DU 174. The UL RRC message can be a ULInformationTransfer message, another RRC reconfiguration complete message or any suitable RRC message that can include a UL NAS PDU.

With continued reference to FIG. 5A, the UE 102B can perform 530 an MBS session join procedure similar to the procedure 502 discussed above. The UE 102B can perform a PDU session establishment procedure with the CN 110 via the base station 104 as described above. The UE 102B can communicate a PDU session ID with the CN 110 in the PDU session establishment procedure. In some implementations, the PDU session ID of the UE 102B can be the same as the PDU session ID of the UE 102A. In other implementations, the PDU session ID of the UE 102B can be different from the PDU session ID of the UE 102A. The UE 102B can join the same MBS session as the UE 102A by sending an MBS session join request and specifying the same MBS session ID. In this example scenario, the UE 102B joins the MBS session after the base station 104 has started transmitting 528 MBS data packets to the UE 102A. The CN 110 transmits 532, to the CU 172, a CN-to-BS message including the MBS session ID and/or the PDU session ID in order to indicate that the UE 102B should start receiving MBS data for an MBS session corresponding to the MBS session ID.

In some scenarios, the CU 172 or CN 110 determines that a DL tunnel for the MBS session identified in the event 532 already exists, and that there is no need to perform the procedure 586. Optionally, however, the CU 172 sends 534 a CU-to-DU message to the DU 174 to request a set-up for an MBS context and/or a common DL tunnel for the first MBS session, and the DU 174 responds 536 with a DU configuration.

The CU 172 transmits 538 an RRC reconfiguration message to the DU 174, and the DU 174 transmits 540 the RRC reconfiguration message to the UE 102B to configure the UE 102B to receive the MBS traffic. The RRC reconfiguration message can include or configure the same LCID (value), MRB configuration, and/or RLC bearer configuration as the event 520, when the UEs 102A and 102B operate in the same cell or different cells. Alternatively, when the UEs 102A and 102B operate in different cells, the RRC reconfiguration message can have a different G-RNTI, LCID, and/or RLC bearer configuration, for example. The RRC reconfiguration message can include the same MRB configuration as the event 520, when the UEs 102A and 102B operate in different cells, for example. As illustrated in FIG. 3, the CU 172 can map data packets arriving via the common CN-to-BS DL tunnel to one or more MRBs, each corresponding to a common CU-to-DU DL tunnel and/or a respective logical channel.

The UE 102B transmits 542 an RRC reconfiguration complete message(s) (e.g., RRCReconfigurationComplete message(s)) to the base station 104 in response to the RRC reconfiguration message(s) of event 540. Before or after receiving 542 the RRC reconfiguration complete message(s), the base station 104 in some cases sends 539 another BS-to-CN message to the CN 110, generally similar to the event 519. The BS-to-CN message can indicate an updated list of UEs associated with the MBS session specified in the event 532, for example. After the UE 102B has joined 530 the MBS session and obtained the necessary RRC configuration, the CU 172 continues to receive 544 MBS data via the common CN-to-BS DL tunnel and transmits 546 the MBS data to the DU 174 via the common CU-to-DU DL tunnel. In some implementations, the DU 174 transmits 548 the MBS data to the UE 102A and UE 102B using multicast. The UE 102A and UE 102B can receive 548 MBS data similar to event 528. Alternatively, the base station 104 can transmit 548 the MBS data to the UE 102A and UE 102B separately via unicast.

Figure 5B:
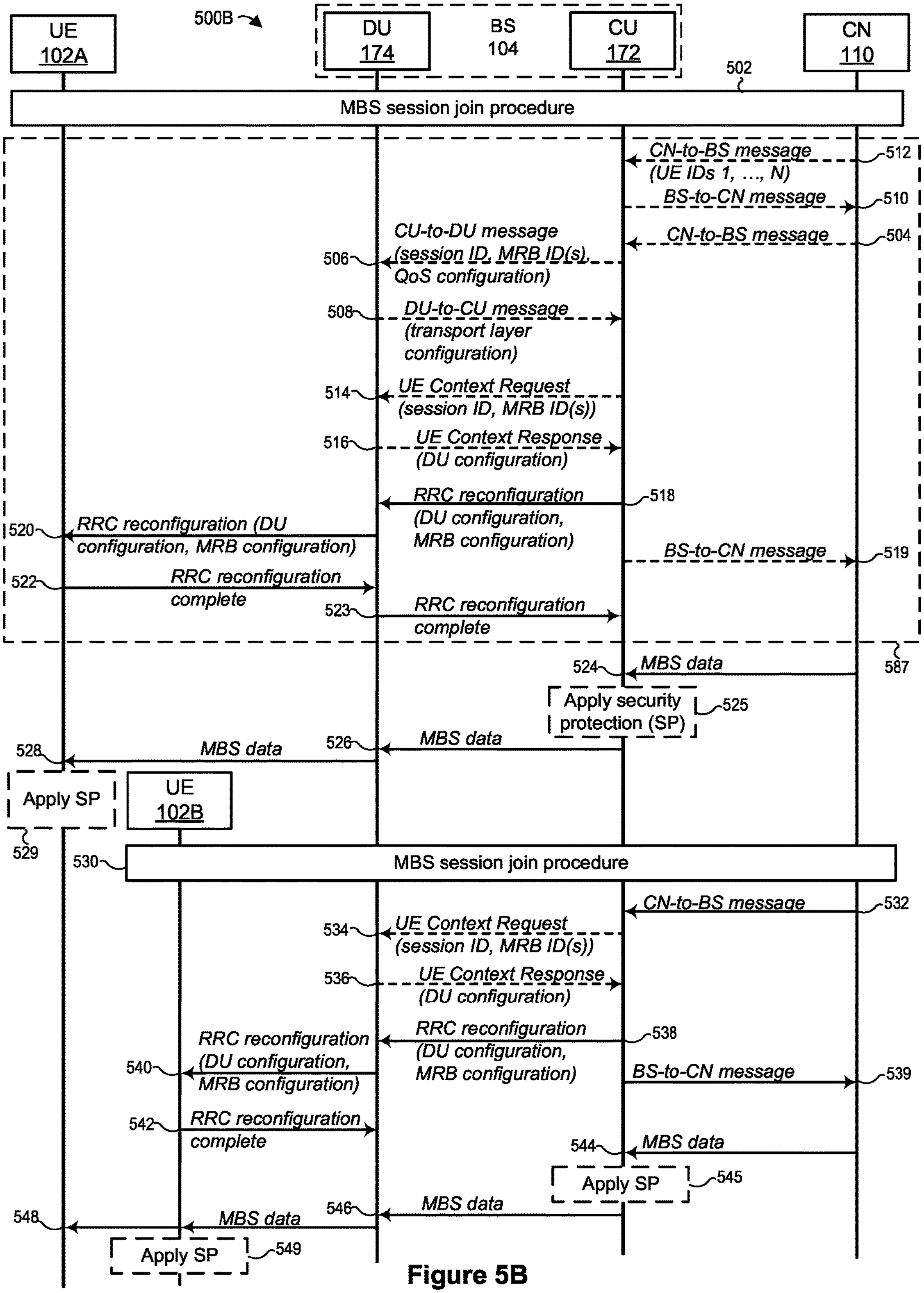
FIG. 5B is a message sequence of another example method for configuring resources for transmitting MBS data of an MBS session to multiple UEs, which can be implemented in a distributed base station of FIG. 1B.

Referring next to FIG. 5B, a scenario 500B is depicted which is generally similar to the scenario 500A. However, in the scenario 500B, the base station receives a list of UEs joining an MBS session prior to, rather than before, receiving a request to configure resources for the MBS session. Events in this scenario similar to those discussed above are labeled with the same reference numbers and the examples and implementations for FIG. 5A can apply to FIG. 5B. The differences between the scenarios of FIG. 5A and FIG. 5B are discussed below.

In some implementations, the CU 172 can perform an MBS session resource setup procedure (i.e., events 510 and 504) with the CN 110 in response to receiving 512 the second CN-to-BS message. In such implementations, the CU 172 transmits 510 the first BS-to-CN message to the CN 110 in response to receiving 512 the second CN-to-BS message. Then, the CN 110 transmits 504 the first CN-to-BS message to the CU 172 in response to receiving 510 the first BS-to-CN message. In such cases, the CN 110 may or may not include an MBS session ID (i.e., the first MBS session ID) in the first CN-to-BS message. The CN 110 can transmit 519 the BS-to-CN message in response to or after receiving 512 the second CN-to-BS message or 504 the first CN-to-BS message. After or in response to receiving 512 the second CN-to-BS message, transmitting 510 the second BS-to-CN message or receiving 504 the first CN-to-BS message, the CU 172 can transmit 506 the CU-to-DU message to the DU 174.

The events 512, 510, 504, 506, 508, 514, 516, 518, 519, 520, 522 and 523 are collectively referred to in FIG. 5B as an MBS resource setup and UE-specific MBS session configuration procedure 587. In cases where the CN 110 grants the additional MBS session(s) for the UE 102A in the additional MBS session join procedure(s), the CN 110 can perform MBS resource setup and UE-specific MBS session configuration procedure(s) with the base station 104 and UE 102A, similar to the procedure 587. In such cases, the CN 110 can include the additional MBS session ID(s) and, optionally, QoS configuration(s) for the additional MBS session ID(s) in CN-to-BS message(s) in the MBS resource setup and UE-specific MBS session configuration procedure(s), similar to the first or second CN-to-BS message. In such cases, the CU 172 includes additional transport layer configuration(s) for the additional MBS session(s) to configure additional common DL tunnel(s) in BS-to-CN message(s) in the MBS resource setup and UE-specific MBS session configuration procedure(s), similar to the first or second BS-to-CN message. Each of the transport layer configuration(s) configures a particular common DL tunnel of the common DL tunnel(s) and can be associated to a particular MBS session of the additional MBS session(s). The transport layer configurations can be different to distinguish between different common DL tunnels. In particular, any pair of the transport layer configurations can have different IP addresses, different DL TEIDs, or different IP addresses as well as different DL TEIDs.

Figure 5C:
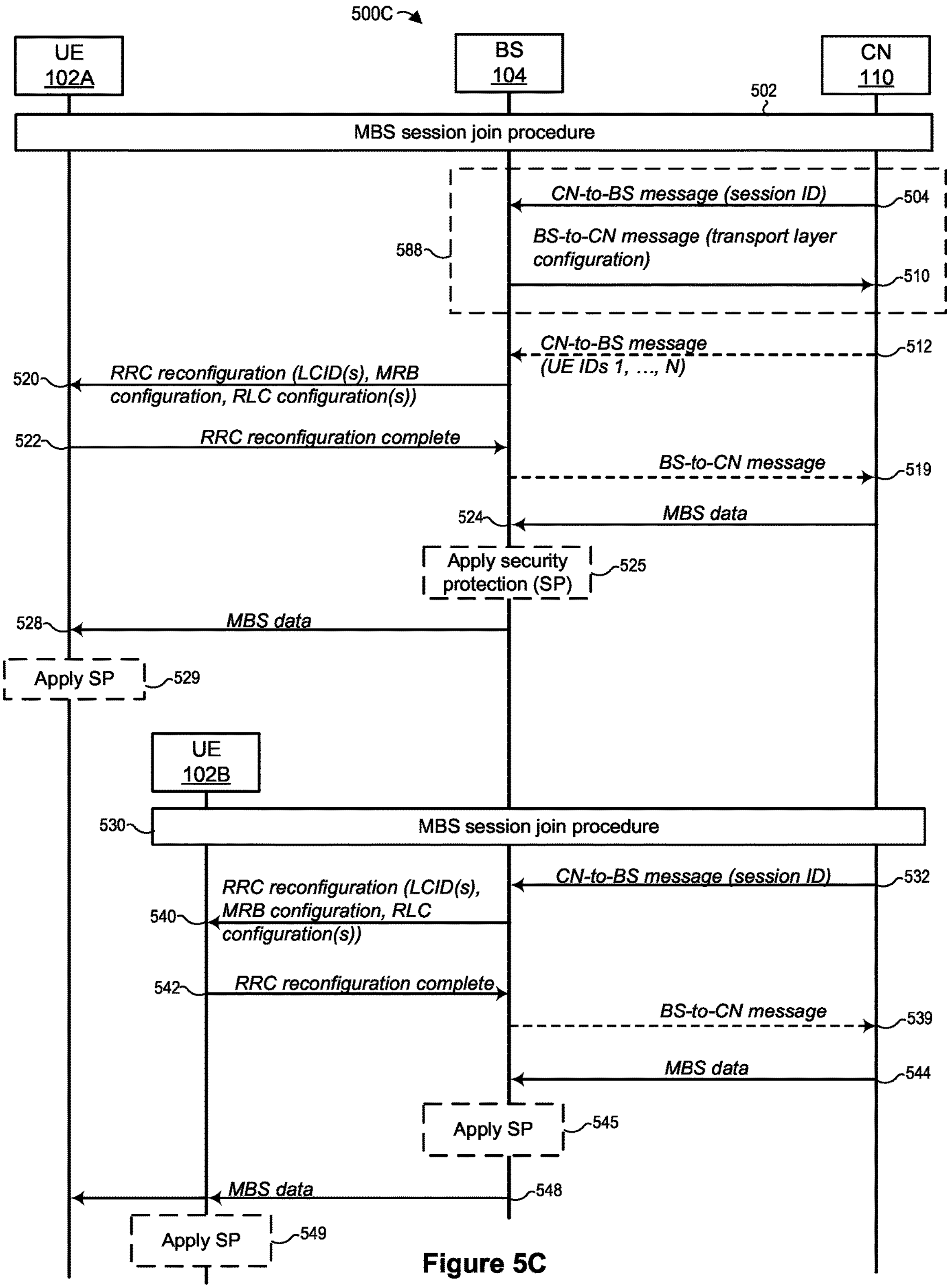
FIG. 5C is a message sequence of another example method for configuring resources for transmitting MBS data of an MBS session to multiple UEs, which can be implemented in a base station of FIG. 1A.

Next, FIG. 5C illustrates an example scenario 500C, which is generally similar to scenario 500A. However, in scenario 500C, the base station 104 is implemented as a non-distributed base station.

In scenario 500C, the UE 102A initially performs 502 an MBS session join procedure with the CN 110 via the base station 104 to join a certain MBS session. In some scenarios, the UE 102A subsequently performs additional one or more MBS join procedures, and event 502 accordingly is a first one of multiple MBS join procedures. Because the base station 104 configures a common DL tunnel for MBS traffic rather than a UE-specific tunnel, as discussed below, the procedures 502 and 588 can occur in either order. In other words, the base station 104 can configure a common DL tunnel before even a single UE joins the MBS session.

To perform the MBS session join procedure, the UE 102A in some implementations sends an MBS session join request message to the CN 110 via the base station 104. In response, the CN 110 can send an MBS session join response message to the UE 102A via the base station 104 to grant the UE 102A access to the first MBS session. In some implementations, the UE 102A can include an MBS session ID of the MBS session in the MBS session join request message. The CN 110 in some cases includes the MBS session ID in the MBS session join response message. In some implementations, the UE 102A can send an MBS session join complete message to the CN 110 via the base station 104 in response to the MBS session join response message.

The UE 102A in some cases performs additional MBS session join procedure(s) with the CN 110 via the RAN 105 (e.g., the base station 104 or base station 106) to join additional MBS session(s). For example, the UE 102A can perform a second MBS session join procedure with the CN 110 via the RAN 105 to join a second MBS session. Similar to event 502, the UE 102A in some implementations can send a second MBS session join request message to the CN 110 via the base station 104, and the CN 110 can respond with a second MBS session join response message to grant the UE 102A access to the second MBS session. In some implementations, the UE 102A can send a second MBS session join complete message to the CN 110 via the base station 104 in response to the second MBS session join response message. In some implementations, the UE 102A can include a second MBS session ID of the second MBS session in the second MBS session join request message. The CN 110 optionally includes the second MBS session ID in the second MBS session join response message. In some implementations, the UE 102A can include the first and second MBS session IDs in an MBS session join request message (e.g., the first MBS session join request message) to join the first and second MBS sessions at the same time. In such cases, the CN 110 can send an MBS session response message to grant either the first MBS session or the second MBS session, or both the first and MBS sessions.

In some implementations, the MBS session join request message, MBS session join response message, and MBS session join complete message can be session initiation protocol (SIP) messages. In other implementations, the MBS session join request message, MBS session join response message, and MBS session join complete message can be NAS messages such as 5G mobility management (5GMM) messages or 5G session management messages (5GSM). In the case of the 5GSM messages, the UE 102A can transmit to the CN 110 via the base station 104 a (first) UL container message including the MBS session join request message, the CN 110 can transmit to the UE 102A via the base station 104 a DL container message including the MBS session join response message, and the UE 102A can transmit to the CN 110 via the base station 104 a (second) UL container message including the MBS session join complete message. These container messages can be 5GMM messages. In some implementations, the MBS session join request message, MBS session join response message, and MBS session join complete message can be a PDU Session Modification Request message, a PDU Session Modification Command message, and a PDU Session Modification Complete message, respectively. To simplify the following description, the MBS session join request message, the MBS session join response message, and/or the MBS session join complete message can represent the container messages.

In some implementations, the UE 102A can perform a PDU session establishment procedure with the CN 110 via the base station 104 to establish a PDU session in order to perform the first MBS session join procedure and/or additional MBS session join procedure(s). During the PDU session establishment procedure, the UE 102A can communicate a PDU session ID of the PDU session with the CN 110 via the base station 104.

In some implementations, before performing the (first) MBS session join procedure (event 502), the base station 104 can perform a security activation procedure (e.g., RRC security mode procedure) with the UE 102A to activate security protection (e.g., integrity protection/integrity check and/or encryption/decryption) on data communications during an MBS session with the UE 102A, described above with respect to FIG. 5A.

Before, during, or after the (first) MBS session join procedure (event 502), the CN 110 can send 504 a (first) CN-to-BS message including the first MBS session ID and/or the PDU session ID to the base station 104 to request the base station 104 to configure resources for the first MBS session. The CN 110 can additionally include QoS configuration(s) for the first MBS session. In response, the base station 104 can send 510 a (first) BS-to-CN message (e.g., MBS Session Resource Setup Response message) including a DL transport layer configuration to configure a common DL tunnel for the CN 110 to send MBS data to the base station 104. The DL transport layer configuration includes a transport layer address (e.g., an IP address and/or a TEID) to identify the common DL tunnel. The base station 104 can include the first MBS session ID and/or the PDU session ID in the first BS-to-CN message.

In some implementations, the CN-to-BS message of event 504 can be a generic NGAP message or a dedicated NGAP message defined specifically for requesting resources for an MBS session (e.g., MBS Session Resource Setup Request message). In some implementations, the BS-to-CN message of event 510 is a generic NGAP message or a dedicated NGAP message defined specifically to convey resources for an MBS session (e.g., MBS Session Resource Setup Response message). In such cases, the CN-to-BS message of event 504 and the BS-to-CN message of event 510 can be non-UE-specific messages.

In some implementations, the QoS configuration(s) include QOS parameters for the MBS session. In some implementations, the QoS configuration includes configuration parameters to configure one or more QoS flows for the MBS session (see FIG. 3). In some implementations, the configuration parameters include one or more QoS flow IDs identifying the QoS flow(s). Each of the QoS flow ID(s) identifies a particular QOS flow of the QoS flow(s). In some implementations, the configuration parameters include QoS parameters for each QoS flow. The QoS parameters can include a 5G QOS identifier (5QI), a priority level, packet delay budget, packet error rate, averaging window, and/or a maximum data burst volume. The CN 110 can specify different values of the QoS parameters for the QoS flows.

The events 504 and 510 are collectively referred to in FIG. 5C as an MBS session resource setup procedure 588.

In cases where the CN 110 grants the additional MBS session(s) for the UE 102A in the additional MBS session join procedure(s), the CN 110 can include the additional MBS session ID(s) and, optionally, QoS configuration(s) for the additional MBS session ID(s) in the first or second CN-to-BS message. In such cases, the base station 104 includes additional transport layer configuration(s) for the additional MBS session(s) to configure additional common DL tunnel(s) in the first or second BS-to-CN message. Each of the transport layer configuration(s) configures a particular common DL tunnel of the common DL tunnel(s) and can be associated to a particular MBS session of the additional MBS session(s). Alternatively, the CN 110 can perform additional MBS session resource setup procedure(s) with the base station 104 to obtain the additional transport layer configuration(s) from the base station 104, similar to the single-session MBS session resource setup procedure 588 shown in FIG. 5C. The transport layer configurations can be different to distinguish between different common DL tunnels. In particular, any pair of the transport layer configurations can have different IP addresses, different DL TEIDs, or different IP addresses as well as different DL TEIDs.

In some implementations, the CN 110 can indicate, in the CN-to-BS message of event 504, a list of UEs joining the first MBS session. In other implementations, the CN 110 can send 512 to the base station 104 another, second CN-to-BS message indicating a list of UEs joining the first MBS session. The CN 110 can include the first MBS session ID and/or the PDU session ID in the second CN-to-BS message. The base station 104 can send 519 a second BS-to-CN message to the CN 110 in response to the second CN-to-BS message 512. In such cases, the second CN-to-BS message and the second BS-to-CN message can be non-UE-specific messages. For example, the list of UEs includes the UE 102A and/or UE 102B. To indicate a list of UEs, the CN 110 can include a list of (CN UE interface ID, RAN UE interface ID) pairs, each identifying a particular UE of the UEs. For example, the list of pairs includes a first pair of (a first CN UE interface ID and a first RAN UE interface ID) identifying the UE 102A and a second pair of (a second CN UE interface ID, a second RAN UE interface ID) identifying the UE 102B. In some implementations, the "CN UE interface ID" can be an "AMF UE NGAP ID" and the "RAN UE interface ID" can be a "RAN UE NGAP ID." In other implementations, the CN 110 can include a list of UE IDs, each identifying a particular UE in the set of UEs. In some implementations, the CN 110 can assign the UE IDs and send each of the UE IDs to a particular UE of the UEs in a NAS procedure (e.g., registration procedure) that the CN 110 performs with the particular UE. For example, the list of UE IDs can include a first UE ID of the UE 102A and a second UE ID of the UE 102B. In some implementations, the UE IDs are S-Temporary Mobile Subscriber Identities (S-TMSIs) (e.g., 5G-S-TMSIs).

In other implementations, the CN 110 can send 512 to the base station 104 a second CN-to-BS message indicating that the UE 102A joins the first MBS session. The CN 110 can include the first MBS session ID and/or the PDU session ID in the second CN-to-BS message. The second CN-to-BS message can be a UE-specific message for the UE 102A. The base station 104 can send 519 a second BS-to-CN message to the CN 110 in response to receiving 512 the second CN-to-BS message. The base station 104 can include the first MBS session ID and/or the PDU session ID in the second BS-to-CN message. The CN 110 can include the MBS session join response message for the UE 102A in the second CN-to-BS message. The base station 104 can include the first CN UE interface ID and the first RAN UE interface ID in the second CN-to-BS message. Alternatively, the base station 104 can include the first UE ID in the second CN-to-BS message. In such implementations, the CN 110 can send (not shown) an additional CN-to-BS message to the base station 104 to indicate that (only) the UE 102B joins the first MBS session. The additional CN-to-BS message can be a UE-specific message for the UE 102B. The CN 110 can include the MBS session join response message for the UE 102B in the additional CN-to-BS message. The CN 110 can include the second CN UE interface ID and the second RAN UE interface ID in the additional CN-to-BS message. Alternatively, the CN 110 can include the second UE ID in the additional CN-to-BS message. The base station 104 can send (not shown) an additional BS-to-CN message to the CN 110 in response to the additional CN-to-BS message.

In some implementations, the second CN-to-BS message and BS-to-CN message can be a PDU Session Resource Modify Request message and a PDU Session Resource Modify Response message, respectively.

In some implementations, the base station 104 can include the DL transport layer configuration(s) in the second BS-to-CN message and/or the additional BS-to-CN message. In other words, the base station 104 can send the same DL transport layer configuration(s) in BS-to-CN messages in responses to CN-to-BS messages indicating multiple UEs joining the same MBS session. In such implementations, the CN 110 can blend the MBS resource setup procedure 588 and the second and/or additional CN-to-BS and BS-to-CN messages into a single procedure.

In some implementations, the base station 104 can perform the MBS resource setup procedure 588 with the CN 110 in response to receiving the second CN-to-BS message. In such implementations, the base station 104 transmits the first BS-to-CN message to the CN 110 in response to receiving the second CN-to-BS message. Then, the CN 110 sends the first CN-to-BS message to the base station 104 in response to the first BS-to-CN message. In such cases, the CN 110 may or may not include an MBS session ID (i.e., the first MBS session ID) in the first CN-to-BS message.

In cases where the base station 104 performs the MBS resource setup procedure 588 with the CN 110 to establish the common DL tunnel for the first MBS session, the base station 104 may refrain from including a DL transport layer configuration for the first MBS session in the second BS-to-CN message. In such cases, the CN 110 may refrain from including a UL transport layer configuration for the first MBS session in the second CN-to-BS message.

After performing 588 the MBS session resource setup procedure or receiving 512 the second CN-to-BS message, the base station 104 generates RRC reconfiguration message(s) (e.g., RRCReconfiguration message(s)) including configuration parameters for the UE 102A to receive MBS data of the first MBS session. The base station 104 then transmits 520 the RRC reconfiguration message(s) to the UE 102A. In response, the UE 102A transmits 522 an RRC reconfiguration complete message(s) (e.g., RRCReconfigurationComplete message(s)) to the base station 104. The base station 104 can send 519 the second BS-to-CN message to the CN 110 before or after receiving the RRC reconfiguration complete message(s).

After receiving 510 the first BS-to-CN message or receiving 519 the second BS-to-CN message, the CN 110 can send 524 MBS data to the base station 104, which in turn transmits (e.g., multicast or unicast) 528 the MBS data via the one or more logical channels to the UE 102A. The UE 102A receives 528 the MBS data via the one or more logical channels. For example, the base station 104 receives 524 an MBS data packet, generates a PDCP PDU including the MBS data packet, generates a MAC PDU including the logical channel ID and the PDCP PDU, and transmits 528 the MAC PDU to the UE 102A. The UE 102A receives 528 the MAC PDU, retrieves the PDCP PDU and the logical channel ID from the MAC PDU, identifies the PDCP PDU associated with the MRB and retrieves the MBS data packet from the PDCP PDU.

In some implementations, after the CN 110 sends 524 MBS data to the base station 104, the base station 104 can determine 525 which security protection to apply to the MBS data, prior to transmitting (e.g., multicast or unicast) 528 the MBS data to the UE 102A, similar to the manner described above with respect to FIG. 5A. If the base station 104 applies 525 security protection to an MBS data packet to obtain a security-protected MBS data packet and transmits 528 the security-protected MBS data packet to the UE 102A, the UE 102A can receive the security-protected MBS data packet and subsequently apply 529 security protection to the security-protected MBS data packet(s) to obtain the original MBS data packet, similar to the manner described above with respect to FIG. 5A.

In some implementations, the configuration parameters can include one or more MRB configurations configuring one or more MRBs associated with the first MBS session. The configuration parameters can also include one or more RLC bearer configurations, each associated with a particular MRB. Each of the MRB configuration(s) can include an MRB ID, a PDCP configuration, the first MBS session ID, a PDCP reestablishment indication (e.g., reestablishPDCP), and/or a PDCP recovery indication (e.g., recoveryPDCP). In some implementations, the PDCP configuration can be a PDCP-Config IE for DRB. In some implementations, the RLC bearer configuration can be an RLC-BearerConfig IE. In some implementations, the RLC bearer configuration may include a logical channel (LC) ID configuring a logical channel. In some implementations, the configuration parameters or the MRB configuration may include logical channel configuration (e.g., LogicalChannelConfig IE) for configuring the logical channel. In some implementations, the RLC bearer configuration may include the MRB ID.

In some implementations, the base station 104 can configure the MRB as a DL-only RB in the MRB configuration. For example, the base station 104 can refrain from including UL configuration parameters in the PDCP configuration within the MBR configuration to configure the MRB as a DL-only RB. The base station 104 can include only DL configuration parameters in the MRB configuration, e.g., as described above. In such cases, the base station 104 configures the UE 102A to not transmit UL PDCP data PDU via the MRB to the base station 104 by excluding the UL configuration parameters for the MRB in the PDCP configuration in the MRB configuration. In another example, the base station 104 refrains from including UL configuration parameters in the RLC bearer configuration. In such cases, the base station 104 configures the UE 102A not to transmit the control PDU(s) via the logical channel to the base station 104 by excluding the UL configuration parameters from the RLC bearer configuration.

In cases where the base station 104 includes UL configuration parameter(s) in the RLC bearer configuration, the UE 102A may transmit control PDU(s) (e.g., PDCP Control PDU(s) and/or RLC Control PDU(s)) via the logical channel to the base station 104 using the UL configuration parameter(s). For example, the base station 104 may configure the UE to receive MBS data with a (de) compression protocol (e.g., robust header compression (ROHC) protocol). In this case, when the base station 104 receives 524 an MBS data packet from the CN 110, the base station 104 compresses the MBS data packet with the compression protocol to obtain compressed MBS data packet(s) and transmits 528 a PDCP PDU including the compressed MBS data packet to the UE 102A. When the UE 102A receives the compressed MBS data packet(s), the UE 102A decompresses the compressed MBS data packet(s) with the (de) compression protocol to obtain the original MBS data packet. In such cases, the UE 102A may transmit a PDCP Control PDU including, a header compression protocol feedback (e.g., interspersed ROHC feedback) for operation of the header (de) compression protocol, via the logical channel to the base station 104.

In some implementations, the MRB configuration can be an MRB-ToAddMod IE including an MRB ID (e.g., mrb-Identity or MRB-Identity). An MRB ID identifies a particular MRB of the MRB(s). The base station 104 sets the MRB IDs to different values. In cases where the base station 104 has configured DRB(s) to the UE 102A for unicast data communication, the base station 104 in some implementations can set the MRB ID(s) to values different from DRB ID(s) of the DRB(s). In such cases, the UE 102A and the base station 104 can distinguish whether an RB is an MRB or a DRB in accordance an RB ID of the RB. In other implementations, the base station 104 can set one or more of the MRB ID(s) to values which can be the same as one or more of the DRB ID(s). In such cases, the UE 102A and the base station 104 can distinguish whether an RB is an MRB or a DRB in accordance an RB ID of the RB and an RRC IE configuring the RB. For example, a DRB configuration configuring a DRB is a DRB-ToAddMod IE including a DRB identity (e.g., drb-Identity or DRB-Identity) and a PDCP configuration. Thus, the UE 102A and base station 104 can determine an RB is a DRB if the UE 102A receives a DRB-ToAddMod IE configuring the RB, and determine an RB is an MRB if the UE 102A receives an MRB-ToAddMod IE configuring the RB.

In some implementations, the configuration parameters for receiving MBS data of the first MBS session include one or more logical channel (LC) IDs to configure one or more logical channels. In some implementations, the logical channel(s) can be DTCH(s). In other implementations, the logical channel(s) can be MTCH(s). In some implementations, the configuration parameters might or might not include a G-RNTI. The RRC reconfiguration messages for UEs (e.g., the UE 102A and the UE 102B) joining the first MBS session, include the same configuration parameters for receiving MBS data of the first MBS session. In some implementations, the RRC reconfiguration messages for the UEs may include the same or different configuration parameters for receiving non-MBS data.

In some implementations, the base station 104 can include the MBS session join response message in the RRC reconfiguration message the base station 104 transmits 520 to the UE 102A. The UE 102A can include the MBS session join complete message in the RRC reconfiguration complete message of event 522. Alternatively, the UE 102A can send a UL RRC message including the MBS session join complete message to the base station 104. The UL RRC message can be a ULInformationTransfer message or any suitable RRC message that can include a UL NAS PDU. The base station 104 can include the MBS session join complete message in the second BS-to-CN message. Alternatively, the base station 104 can send the CN 110 a BS-to-CN message (e.g., an UPLINK NAS TRANSPORT message) including the MBS session join complete message to the CN 110.

In other implementations, the base station 104 transmits a DL RRC message that includes the MBS session join response message to the UE 102A. The DL RRC message can be a DLInformationTransfer message, another RRC reconfiguration message, or any suitable RRC message that can include a DL NAS PDU. The UE 102A can send a UL RRC message including the MBS session join complete message to the base station 104. The UL RRC message can be a ULInformationTransfer message, another RRC reconfiguration complete message or any suitable RRC message that can include a UL NAS PDU.

With continued reference to FIG. 5C, the UE 102B can perform 530 an MBS session join procedure similar to the procedure 502 discussed above. The UE 102B can perform a PDU session establishment procedure with the CN 110 via the base station 104 as described above. The UE 102B can communicate a PDU session ID with the CN 110 in the PDU session establishment procedure. The UE 102B can join the same MBS session as the UE 102A by sending an MBS session join request and specifying the same MBS session ID. In this example scenario, the UE 102B joins the MBS session after the base station 104 has started transmitting 528 MBS data packets to the UE 102A. The CN 110 transmits 532, to the base station 104, a CN-to-BS message including the MBS session ID and/or the PDU session ID in order to indicate that the UE 102B should start receiving MBS data for an MBS session corresponding to the MBS session ID. In some implementations, the PDU session IDs of the UE 102A and UE 102B can be the same (value). In other implementations, the PDU session IDs of the UE 102A and UE 102B can be the different (values).

The base station 104 or CN 110 determines that a DL tunnel for the MBS session identified in the event 532 already exists, and that there is no need to perform the procedure 588. The base station 104 transmits 540 an RRC reconfiguration message to the UE 102B to configure the UE 102B to receive the MBS traffic. The RRC reconfiguration message can include the same LCID (value), MRB configuration, and RLC bearer configuration as the event 520, when the UEs 102A and 102B operate in the same cell. When the UEs 102A and 102B operate in different cells, the RRC reconfiguration message can have a different, G-RNTI, LCID and/or RLC bearer configuration, for example. The RRC reconfiguration message can include the same MRB configuration as the event 520, when the UEs 102A and 102B operate in different cells. As illustrated in FIG. 3, the base station 104 can map data packets arriving via the common DL tunnel to one or more MRBs, each corresponding to a respective logical channel.

The UE 102B transmits 542 an RRC reconfiguration complete message(s) (e.g., RRCReconfigurationComplete message(s)) to the base station 104 in response to the RRC reconfiguration message(s) of event 540. Before or after receiving 542 the RRC reconfiguration complete message(s), the base station 104 in some cases sends 539 another BS-to-CN message to the CN 110, generally similar to the event 519. The BS-to-CN message can indicate an updated list of UEs associated with the MBS session specified in the event 532, for example. After the UE 102B has joined 530 the MBS session and obtained 540 the necessary RRC configuration, the base station 104 continues to receive 544 MBS data via the common DL tunnel. In some implementations, the base station 104 transmits 548 the MBS data to the UE 102A and UE 102B using multicast. The UE 102A and UE 102B can receive 548 MBS data similar to event 528. Alternatively, the base station 104 can transmit the MBS data to the UE 102A and UE 102B separately via unicast.

In some implementations, after the CN 110 sends 544 MBS data to the base station 104, the base station 104 can determine 545 which security protection to apply to the MBS data, similar to event 525, prior to transmitting (e.g., multicast or unicast) 548 the MBS data to the UE 102B. If the base station 104 applies 545 security protection to an MBS data packet to obtain a security-protected MBS data packet and transmits 548 the security-protected MBS data packet to the UE 102B, the UE 102B can receive the security-protected MBS data packet and subsequently apply 549 security protection to the security-protected MBS data packet(s), similar to event 529, to obtain the original MBS data packet.

Figure 5D:
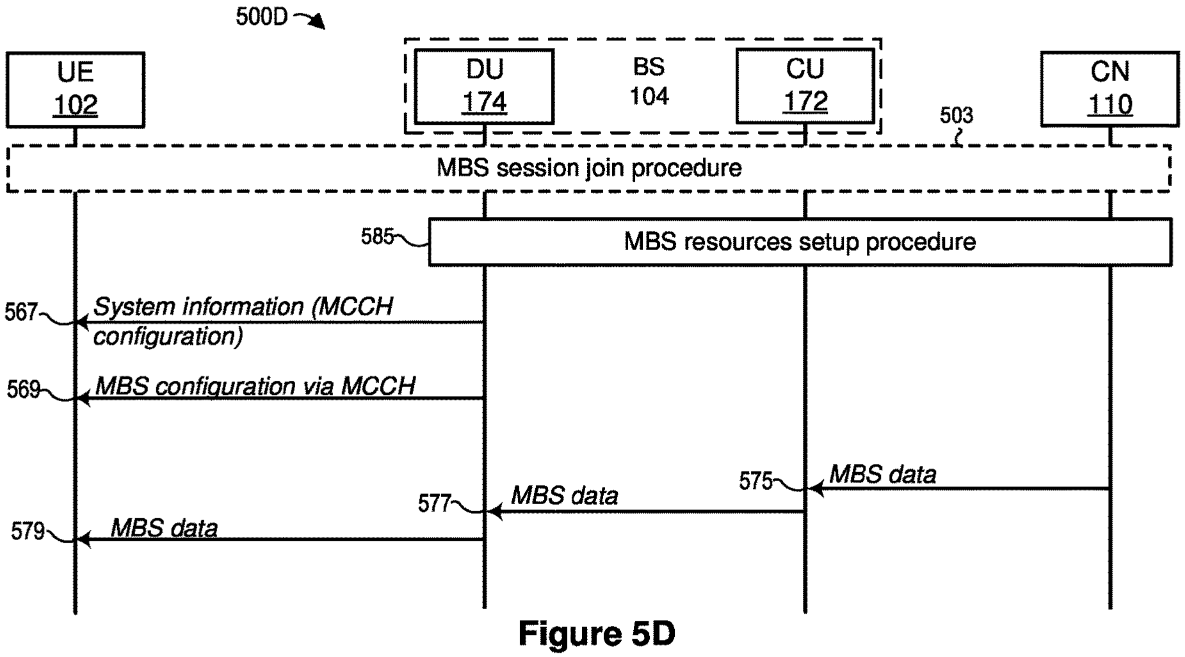
FIG. 5D is a message sequence diagram of a scenario similar to that of FIG. 5A or FIG. 5B, but in which a DU broadcasts an MBS configuration to multiple UEs via an MBS control channel, rather than provide the MBS configuration using an RRC procedure.

Referring next to FIG. 5D, a scenario 500D is depicted which is generally similar to the scenarios 500A, 500B and 500C. Events in this scenario similar to those discussed above are labeled with the same reference numbers and the examples and implementations for FIGS. 5A, 5B and 5C can apply to FIG. 5D. The differences among the scenarios of FIGS. 5A, 5B, 5C and 5D are discussed below.

In the scenario 500D, the base station 104 broadcasts a certain MBS session (e.g., identified by a (third) MBS session ID). The base station 104 can also multicast the MBS session(s) as described for FIG. 5A. The UE 102 (i.e., (each of) the UEs 102A and/or 102B) initially can perform 503 a (third) MBS session join procedure with the CN 110 via the base station 104 to join the MBS session, similar to the event 502 of FIG. 5A. Alternatively, the UE 102 does not perform an MBS session join procedure to receive (MBS data of) the third MBS session.

The CN 110 and base station 104 perform 585 an MBS resource setup procedure to establish a (first) common CN-to-BS DL tunnel and a (first) common CU-to-DU DL tunnel to transmit MBS data of the third MBS session, similar to the event 586 of FIG. 5A. Before, during or after the MBS resource setup procedure 585, the DU 174 transmits (e.g., broadcast) 567 system information (e.g., one or more system information blocks (SIBs)) including MBS control channel (MCCH) configuration on one or more cells (e.g., cell 124 and/or other cell(s) operated by the DU 174). In some implementations, the base station DU 174 can periodically transmit 567 the system information. The DU 174 transmits (e.g., broadcast) 569 at least one MBS configuration via a MCCH configured by the MCCH configuration.

In some implementations, the MCCH configuration includes configuration parameters such as a window start slot, a window duration, a modification period, and/or a repetition period and offset. The window duration indicates a duration (i.e., MCCH transmission window in units of e.g., (consecutive) slots), starting from a slot indicated by the window start slot, during which transmissions of MCCH information (i.e., transmission(s) of the MBS configuration(s) via MCCH) may be scheduled. The modification period defines periodically appearing boundaries, i.e., radio frames for which SFN mod the modification period=0. Contents of different transmissions of MCCH information can only be different if there is at least one such boundary in-between them. The repetition period and offset parameter defines a length and an offset of the MCCH repetition period. Transmissions of MCCH information are scheduled in radio frames for which system frame number (SFN) mod the repetition period length offset of the repetition period.

In some implementations, the MBS configuration includes MBS session information list includes a list of MBS session information IE(s) (i.e., information related one or more MBS sessions including the third MBS session). For example, an MBS session information IE includes an MBS session ID, a G-RNTI, MRB configuration(s), RLC configuration(s) and/or DRX information. The MBS session ID identifies an MBS session, the G-RNTI is used to schedule transmissions of MBS data of the MBS session, the MRB configuration(s) configures one or more broadcast MRBs, the RLC configuration(s) configures RLC parameters for the MRB(s), and the DRX information configures DRX related parameters for transmission of MBS data of the MBS session. Each of the MRB configuration(s) can configure an MRB. For example, a MRB configuration includes a PDCP configuration for the MRB. In the scenario 500C, an MBS session information IE in the list includes the third MBS session ID, MRB configuration(s) configuring one or more MRBs for the third MBS session, a G-RNTI used by the DU 174 to schedule transmissions of MBS data of the MRB(s) or the third MBS session, RLC configuration(s) for the MRB(s), and/or DRX information configuring DRX related parameters for transmission of MBS data of the MRB(s) or the third MBS session.

In some implementations, the DU 174 can (start to) transmit 567 the system information in response to performing 585 the MBS resource setup procedure. In some implementations, the CU 172 generates the system information and transmit the system information to the DU 174. In other implementations, the DU 174 generates the system information.

In some implementations, the DU 174 can (start to) transmit 569 the MBS configuration(s) in response to performing 585 the MBS resource setup procedure. In some implementations, the base station DU 174 can periodically transmit 569 the MBS configuration. In some implementations, the CU 172 generates the MBS configuration and transmit the MBS configuration to the DU 174. In other implementations, the DU 174 generates the MBS configuration. In yet other implementations, the CU 172 generates a (first) portion of the MBS configuration, and the DU 174 generates a (second) portion of the MBS configuration (i.e., the rest of the MBS configuration). Details of these different implementations will be described below.

In some implementations, the CU 172 can transmit to the DU 174 a CU-to-DU message including configuration parameters for the third MBS session, such as the third MBS session ID, QoS configuration(s), DRX cycle configuration, MRB ID(s) of the MRB(s), and/or PDCP configuration(s) of the MRB(s). In some implementations, the DU 174 can generate the MBS session information IE in accordance with the configuration parameters. In some implementations, the DU 174 can generate at least a portion of the MBS session information IE, e.g., in accordance with preconfigured value(s). For example, the DU 174 can generate the MRB configuration(s), which includes the PDCP configuration(s), the MRB ID(s) and/or the third MBS session ID received from the CU 172. Alternatively, the DU 174 can generate the MRB configuration(s), which includes the PDCP configuration(s), the MRB ID(s) and/or the third MBS session ID with preconfigured values. In some implementations, the DU 174 may not include a MRB ID in the MRB configuration(s). The DU 174 can generate the RLC configuration(s) (e.g., including the MRB ID(s)) for the MRB(s), e.g., in accordance with the QoS configuration(s) and/or the MRB ID(s). Alternatively, the DU 174 can generate the RLC configuration(s) with pre-configured RLC parameters. The DU 174 can assign logical channel ID(s) for the MRB(s) and include the logical channel ID(s) in the MBS session information IE or the RLC configuration(s). In another example, the DU 174 can generate the DRX information configuring a DRX cycle in accordance with the DRX cycle configuration received from the CU 172. Alternatively, the DU 174 determines the DRX cycle, e.g., in accordance with the QoS configuration(s) received from the CU 172. In yet another example, the DU 174 can assign the G-RNTI and associate the G-RNTI with the third MBS session ID. In such cases, the DU 174 can generate the MBS session information and the MBS configuration (e.g., an MBS broadcast configuration message) including the MBS session information, and transmit 569 the MBS configuration via the MCCH on the one or more cells. In some implementations, the CU-to-DU message can be a CU-to-DU message of the MBS resource setup procedure 585, similar to the event 506. In other implementations, the CU-to-DU message can be a (second) message other than the CU-to-DU message of the MBS resource setup procedure 585.

In other implementations, the DU 174 can transmit to the CU 172 a DU-to-CU message including the RLC bearer configuration(s), the DRX information and the G-RNTI. In such implementations, the CU 172 generates the MRB configuration(s), which includes the PDCP configuration(s), the MRB ID(s) and/or the third MBS session ID. After receiving the DU-to-CU message, the CU 172 generates the MBS session information and the MBS configuration (e.g., an MBS broadcast configuration message) including the MBS session information, for (each of) the one or more cells. Then the CU 172 transmits a CU-to-DU message including the MBS configuration to the DU 174. After receiving the MBS configuration from the CU 172, the DU 174 transmits 569 the MBS configuration via the MCCH. In some implementations, the CU 172 can send a CU-to-DU message to the DU 174 to request the DU 174 to send the DU-to-CU message. In such cases, the DU 174 sends the DU-to-CU message to the CU 172 in response to the CU-to-DU message.

In some implementations, the DU 174 can transmit a DU-to-CU message of the procedure 585 to the CU 172 after transmitting 567 the system information and/or transmitting 569 the MBS configuration, similar to the event 508. In other implementations, the DU 174 can transmit the DU-to-CU message to the CU 172 before transmitting 567 the system information and/or transmitting 569 the MBS configuration.

After the MBS resource setup procedure 585, the CN 110 sends 575 MBS data of the third MBS session to the CU 172 via the first common CN-to-BS DL tunnel. In turn, the CU 172 transmits 577 the MBS data to the DU 174 via the first common CU-to-DU DL tunnel in accordance with the PDCP configuration(s) in the MBS configuration 569. The DU 174 then transmits (i.e., broadcast) 579 the MBS data in accordance with the MBS configuration 569 (e.g., via the logical channel(s) identified by the logical channel ID(s), and/or using the RLC configuration(s) and/or the G-RNTI). The UE 102 receives 579 the MBS data in accordance with the MBS configuration 569. For example, the CU 172 receives 575 an MBS data packet, generates a PDCP PDU including the MBS data packet in accordance with the PDCP configuration, and transmits 577 the PDCP PDU to the DU 174 via the first common CU-to-DU DL tunnel. In turn, the DU 174 generates a MAC PDU including the logical channel ID and the PDCP PDU, and transmits 579 the MAC PDU to the UE 102 using the G-RNTI. The UE 102 receives 579 the MAC PDU using the G-RNTI, retrieves the PDCP PDU and the logical channel ID from the MAC PDU, identifies the PDCP PDU associated with the MRB, and retrieves the MBS data packet from the PDCP PDU in accordance with the PDCP configuration. In some implementations, the UE 102 operating in connected state (e.g., RRC_CONNECTED state), inactive state (e.g., RRC_INACTIVE state), or idle state (e.g., RRC_IDLE state) receives 579 the MBS data.

In some implementations, the CU 172 can apply a null security protection to the MBS data that the CU 172 received at event 575 as described above. In such cases, the UE 102 can also apply a null security protection to the MBS data that the UE 102 received at event 579 as described above.

Next, several example scenarios or implementations that involve several components of FIGS. 1A and 1B and relate to managing security protection are discussed next with reference to FIGS. 6A-9B. For simplicity, “multicast” in these figures refers to both multicast and broadcast. These methods can be executed by processing hardware, e.g., one or more processors executing sets of instructions stored on a non-transitory computer-readable medium.

Figure 6A:
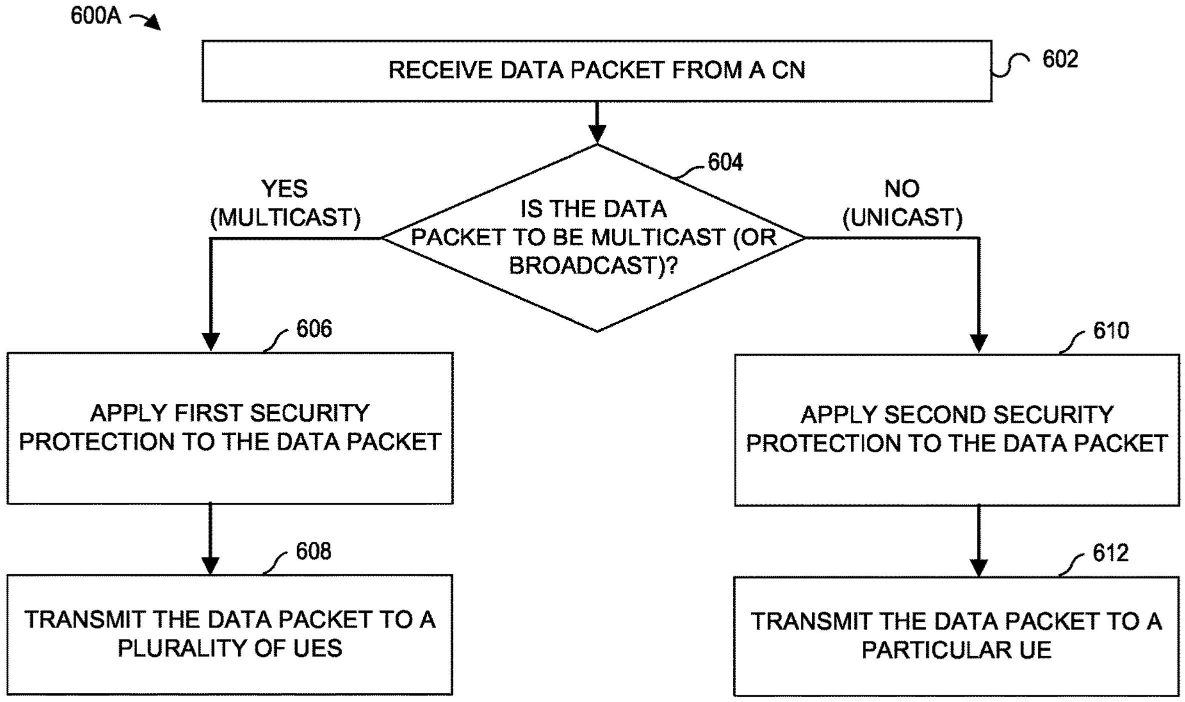
FIG. 6A is a flow diagram of an example method in which a RAN node of FIG. 1A manages security protection on a data packet based on whether the data packet is to be multicast (or broadcast) or unicast to a UE of FIG. 1A.

Referring first to FIG. 6A, in a scenario 600A, a node of a RAN (e.g., RAN 105) at block 602 initially receives a data packet from a CN (e.g., CN 110) for a plurality of UEs (e.g., UE 102A, UE 102B, UE 103) (e.g., at event 524, 544). The data packet can be an IP packet, Ethernet packet, or NAS PDU, for example. More generally, the data packet can be either an MBS data packet or a non-MBS data packet. The RAN node can be any one of base stations described in FIG. 1A (e.g., base station 104, base station 106). Each of the plurality of UEs can be operating in connected state (e.g., RRC_CONNECTED state), inactive state (e.g., RRC_INACTIVE state), or idle state (e.g., RRC_IDLE state). In some implementations, prior to receiving the data packet, the RAN node can provide, to the CN, a transport layer configuration that includes a first transport layer address (e.g., an IP address) and a first DL tunnel ID that identifies a DL tunnel. The CN can provide a second transport layer address and a second DL tunnel ID along with the data packet to the RAN node to indicate a DL tunnel where the CN transmits the data packet. For example, the CN can generate a tunnel packet including the second transport layer address, a second DL tunnel ID along with the data packet, and transmit the tunnel packet to the RAN node.

At block 604, the RAN node determines whether the data packet is to be multicast to the plurality of UEs. In some implementations, the RAN node can determine whether the CN provided the data packet to the RAN node via a common DL tunnel to determine whether the data packet is to be multicast to the plurality of UEs. If the RAN node determines that it received the data packet via the common DL tunnel, the RAN node can determine that the data packet is to be multicast to the plurality of UEs. If the RAN node determines that it received the data packet via a DL tunnel specific to only a particular UE (e.g., UE 102A but not UE 103), the RAN node can determine that the data packet is to be unicast to the UE 102A. In some implementations, to determine whether the CN provided the data packet to the RAN node via the common DL tunnel, the RAN node can compare the second transport layer address and the second DL tunnel ID with the first transport layer address and the first DL tunnel ID described above. If the RAN node sets the first DL tunnel ID to an identity of a common DL tunnel, and the RAN node determines that the second transport layer address and the second DL tunnel ID match the first transport layer address and the first DL tunnel ID, respectively, the RAN node can determine that the CN provided the data packet to the RAN node via the common DL tunnel. If the RAN node set the first DL tunnel ID to an identity of a common DL tunnel, and the RAN node determines that the second transport layer address and the second DL tunnel ID do not match the first transport layer address and the first DL tunnel ID, respectively, the RAN node can determine that the CN provided the data packet to the RAN node via a DL tunnel specific to the particular UE instead of the common DL tunnel.

Depending on whether the data packet is to be multicast to the plurality of UEs, the RAN node can determine which security check scheme and/or security protection to apply to the data packet (e.g., at event 525, 545). If the RAN node at block 604 determines that the data packet is to be multicast to the plurality of UEs, the RAN node at block 606 can apply a first security check scheme to the data packet. In one implementation, the first security check scheme can include or can be a null security protection, so that effectively, the RAN node at block 606 refrains from applying security protection to the data packet and can provide the original data packet to the plurality of UEs. In another implementation, the first security check scheme can include or can be a non-null security protection (e.g., a common security protection). In this implementation, the RAN node can use the same (i.e., common) security algorithm and same security key (e.g., a security key for one or more MRBs or MBS sessions) on the data packet for transmission to the plurality of UEs when applying the first security protection. In some implementations, the RAN node can send the same security key to each of the plurality of UEs or the same parameters to each of the plurality of UEs to derive the security key, using a UE-specific security protection. The plurality of UEs have UE-specific security keys to apply their respective UE-specific security protections. Subsequently, the RAN node at block 608 can transmit the data packet (i.e., either the original data packet or a security-protected data packet) to the UE. On the other hand, if the RAN node at block 604 determines that the data packet is to be unicast to the particular UE, the RAN node at block 610 can apply a second security protection to the data packet. In one implementation, the second security protection can be a non-null security protection specific to the particular UE (i.e., a UE-specific security protection). The UE-specific security protection in some cases can be a null security protection if the RAN node does not require security protection to be applied to the data packet. Subsequently, the RAN node at block 612 can transmit the security-protected data packet to the particular UE.

Figure 6B:
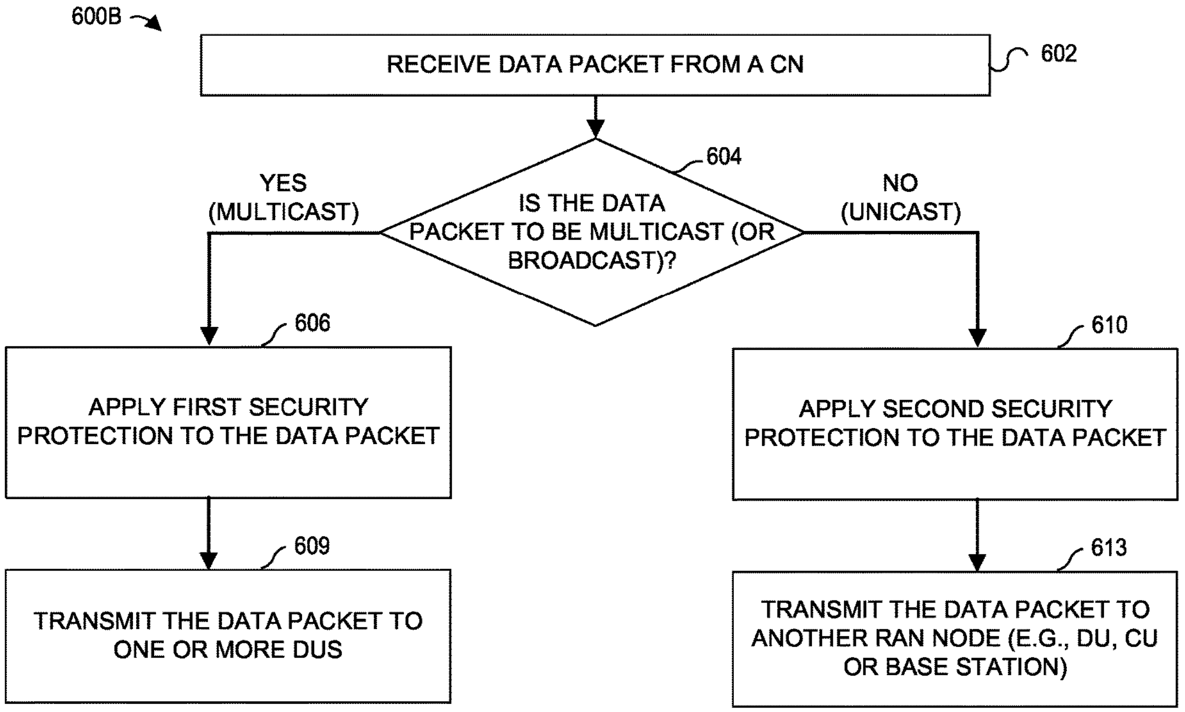
FIG. 6B is a flow diagram of an example method similar to the flow diagram of FIG. 6A, but where the RAN node is part of a distributed base station of FIG. 1B.

Turning to FIG. 6B, a scenario 600B is similar to the scenario 600A in blocks 602, 604, 606, and 610. Whereas the RAN node of scenario 600A can be base station 104, for example, the RAN node of scenario 600B is a CU (e.g., CU 172) of base station 104, for example. Subsequent to the RAN node at block 606 applying the first security protection to the data packet, the RAN node at block 609 can transmit the data packet (i.e., either the original data packet or a security-protected data packet) to one or more DUs (e.g., DU 174) of the base station 104. Subsequent to the RAN node at block 610 applying the second security protection to the data packet, the RAN node at block 613 can transmit the security-protected data packet to another RAN node, such as a DU (e.g., DU 174) of the base station 104, another CU (e.g., CU 172) of another base station (e.g., base station 106), or another base station (e.g., base station 106).

Figure 6C:
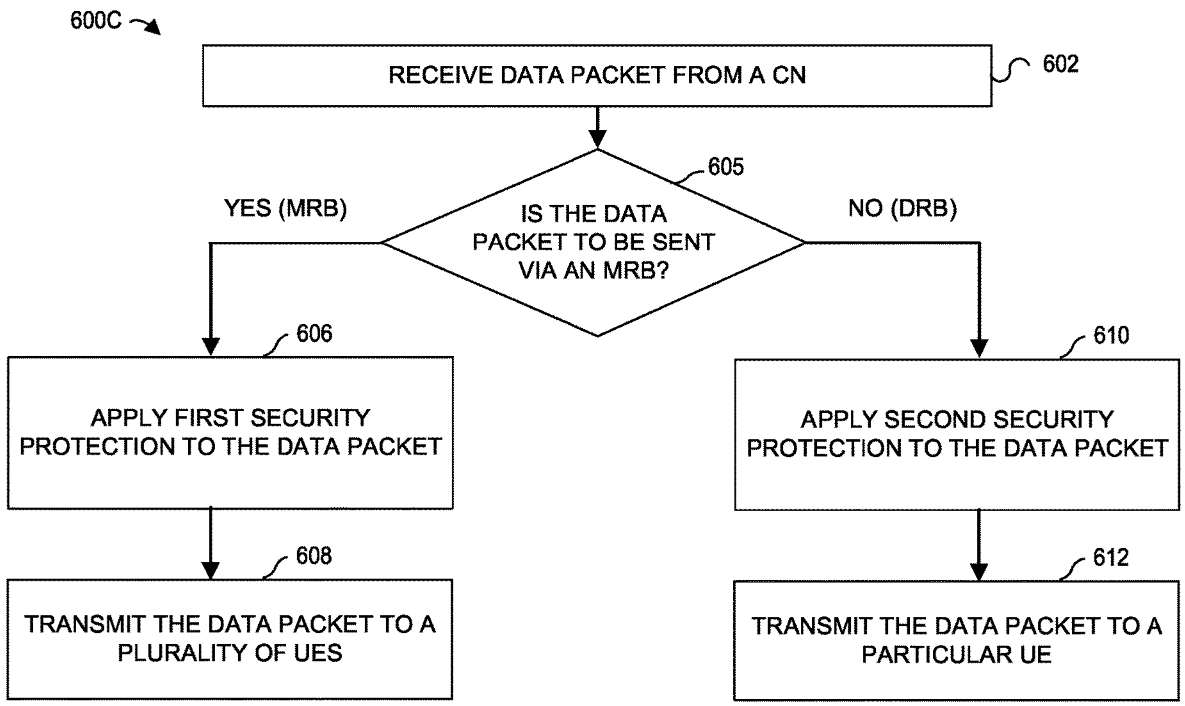
FIG. 6C is a flow diagram of an example method similar to the flow diagram of FIG. 6A, but where the RAN node manages security protection based on whether the data packet is to be transmitted to the UE via an MRB.

Turning to FIG. 6C, a scenario 600C is similar to the scenario 600A except for block 604. Whereas the RAN node of scenario 600A determines whether the data packet is to be multicast to the plurality of UEs at block 604, the RAN node of scenario 600C determines whether the data packet is to be transmitted to the plurality of UEs via an MRB at block 605. In some implementations, the RAN node can determine whether the CN provided the data packet to the RAN node via the common DL tunnel to determine whether the data packet is to be transmitted to the plurality of UEs via the MRB. If the RAN node determines that it received the data packet via the common DL tunnel, the RAN node can determine that the data packet is to be transmitted to the plurality of UEs via the MRB, and proceed to blocks 606 and 608 as described above. If the RAN node determines that it received the data packet via a DL tunnel specific to only the particular UE, the RAN node can determine that the data packet is to be transmitted to the particular UE via a DRB, and proceed to blocks 610 and 612 as described above. The RAN node in some implementations can set an MRB ID that identifies the MRB to a value different from a DRB ID that identifies the DRB, so as to distinguish the MRB from the DRB.

Figure 6D:
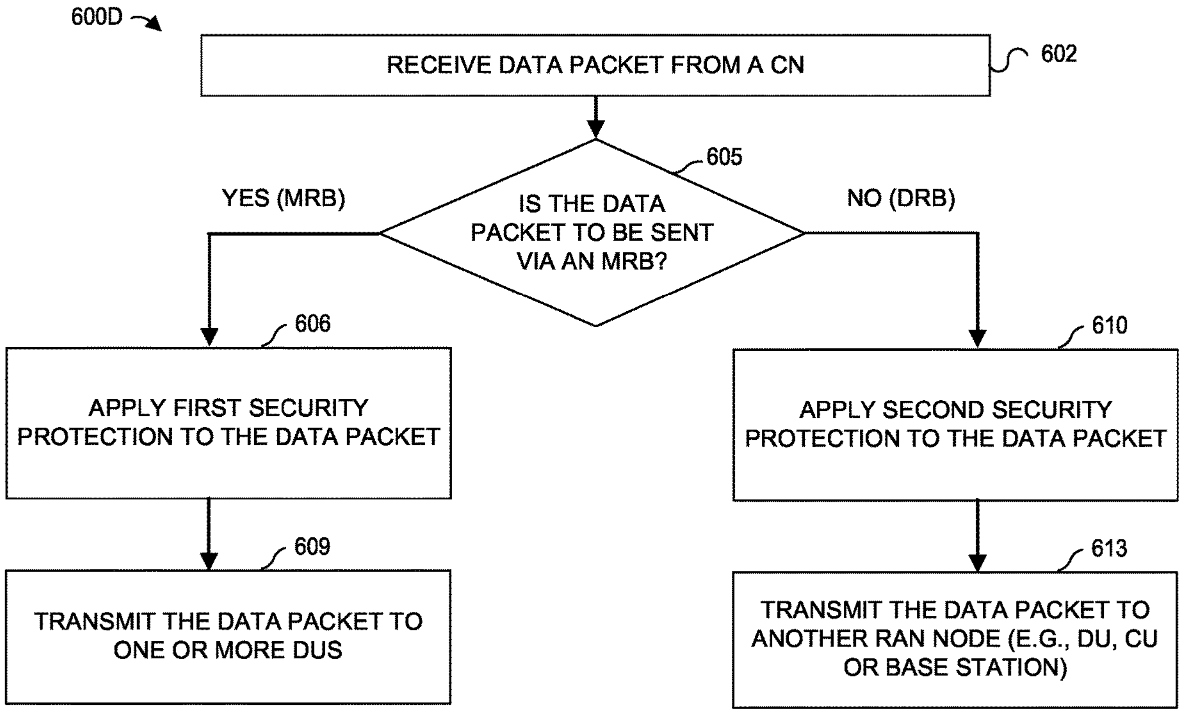
FIG. 6D is a flow diagram of an example method similar to the flow diagram of FIG. 6C, but where the RAN node is part of a distributed base station of FIG. 1B.

Turning to FIG. 6D, a scenario 600D is similar to the scenario 600C in blocks 602, 605, 606, and 610. Whereas the RAN node of scenario 600C can be base station 104, for example, the RAN node of scenario 600D is a CU (e.g., CU 172) of base station 104, for example. Subsequent to the RAN node at block 606 applying the first security protection to the data packet, the RAN node at block 609 can transmit the data packet (i.e., either the original data packet or a security-protected data packet) to one or more DUs (e.g., DU 174) of the base station 104. Subsequent to the RAN node at block 610 applying the second security protection to the data packet, the RAN node at block 613 can transmit the security-protected data packet to another RAN node, such as a DU (e.g., DU 174) of the base station 104, another CU (e.g., CU 172) of another base station (e.g., base station 106), or another base station (e.g., base station 106).

Figure 6E:
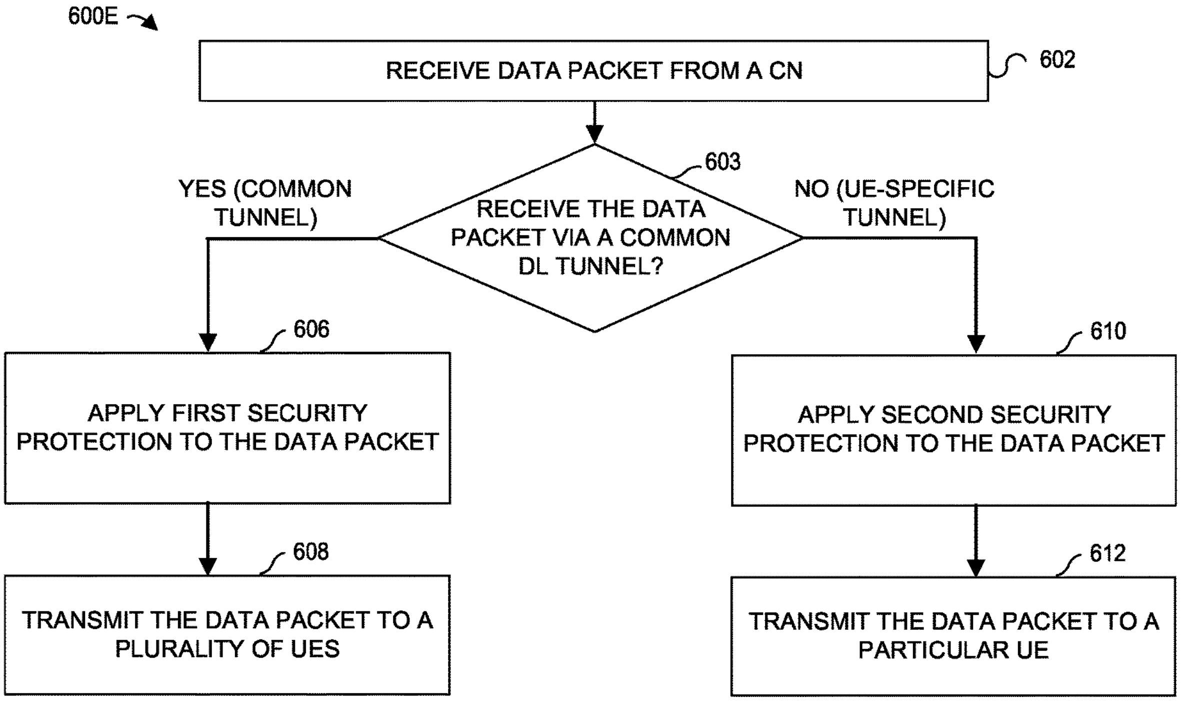
FIG. 6E is a flow diagram of an example method similar to the flow diagram of FIG. 6A, but where the RAN node manages security protection based on whether the data packet is received from a CN of FIG. 1A via a common DL tunnel.

Turning to FIG. 6E, a scenario 600E is similar to the scenario 600A except for block 604. Whereas the RAN node of scenario 600A determines whether the data packet is to be multicast to the plurality of UEs at block 604, the RAN node of scenario 600E determines whether the CN provided the data packet to the RAN node via the common DL tunnel at block 603. As described above with respect to FIG. 6A, the RAN node can determine that the CN provided the data packet via the common DL tunnel if the second transport layer address and the second DL tunnel ID match the first transport layer address and the first DL tunnel ID, respectively. If there is no match, the RAN node can determine that the CN provided the data packet via a UE-specific DL tunnel. If the RAN node at block 603 determines that it received the data packet via the common DL tunnel, the RAN node can proceed to blocks 606 and 608 as described above. If the RAN node at block 603 determines that it received the data packet via a DL tunnel specific to only the particular UE instead of the common DL tunnel, the RAN node can proceed to blocks 610 and 612 as described above.

Figure 6F:
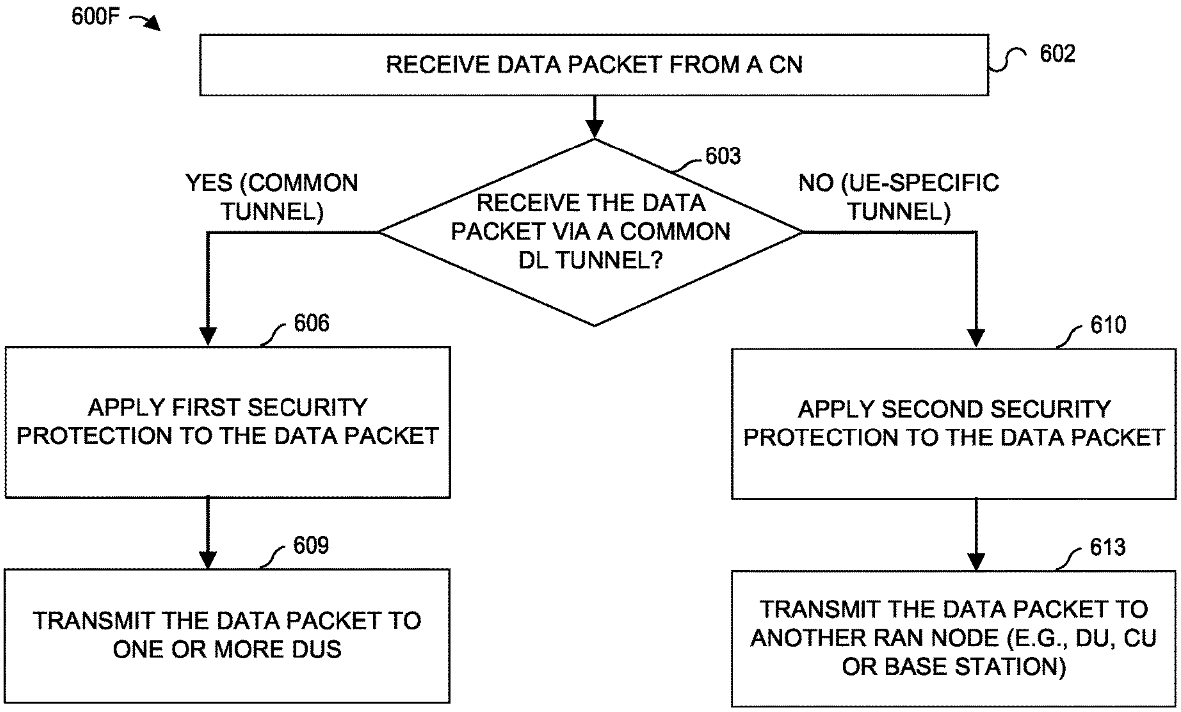
FIG. 6F is a flow diagram of an example method similar to the flow diagram of FIG. 6E, but where the RAN node is part of a distributed base station of FIG. 1B.

Turning to FIG. 6F, a scenario 600F is similar to the scenario 600E in blocks 602, 603, 606, and 610. Whereas the RAN node of scenario 600E can be base station 104, for example, the RAN node of scenario 600F is a CU (e.g., CU 172) of base station 104, for example. Subsequent to the RAN node at block 606 applying the first security protection to the data packet, the RAN node at block 609 can transmit the data packet (i.e., either the original data packet or a security-protected data packet) to one or more DUs (e.g., DU 174) of the base station 104. Subsequent to the RAN node at block 610 applying the second security protection to the data packet, the RAN node at block 613 can transmit the security-protected data packet to another RAN node, such as a DU (e.g., DU 174) of the base station 104, another CU (e.g., CU 172) of another base station (e.g., base station 106), or another base station (e.g., base station 106).

Figure 6G:
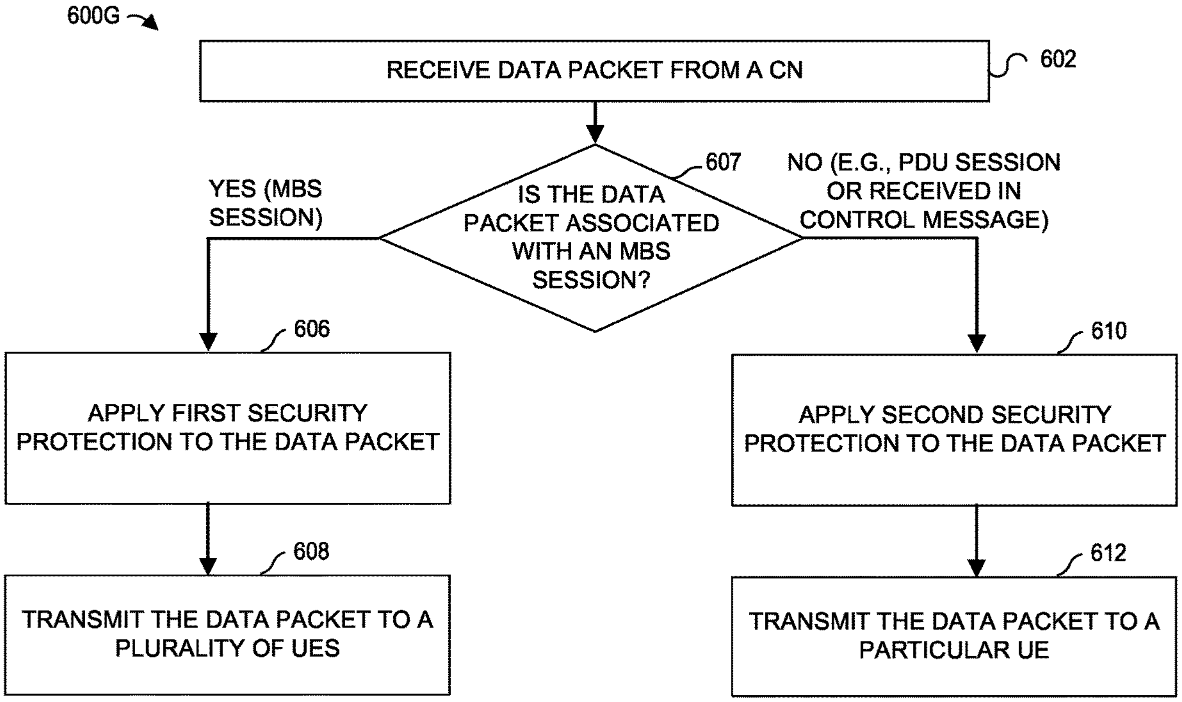
FIG. 6G is a flow diagram of an example method similar to the flow diagram of FIG. 6A, but where the RAN node manages security protection based on whether the data packet is associated with an MBS session.

Turning to FIG. 6G, a scenario 600G is similar to the scenario 600A except for block 604. Whereas the RAN node of scenario 600A determines whether the data packet is to be multicast to the plurality of UEs at block 604, the RAN node of scenario 600G determines whether the data packet is associated with an MBS session at block 607. In some implementations, the RAN node can determine whether the CN provided the data packet to the RAN node via the common DL tunnel to determine whether the data packet is associated with an MBS session. If the RAN node determines that it received the data packet via the common DL tunnel, the RAN node can determine that the data packet is associated with an MBS session, and proceed to blocks 606 and 608 as described above. If the RAN node determines that it received the data packet via a DL tunnel specific to only the particular UE, the RAN node can determine that the data packet is not associated with an MBS session at block 607. For example, the RAN node can determine that the data packet is associated with a PDU session (i.e., but not an MBS session), or the data packet is included in a control message (e.g., a NGAP message) received over a control plane interface (e.g., NG-C), and thus cannot be associated with an MBS session. Subsequently, the RAN node proceeds to blocks 610 and 612 as described above.

Figure 6H:
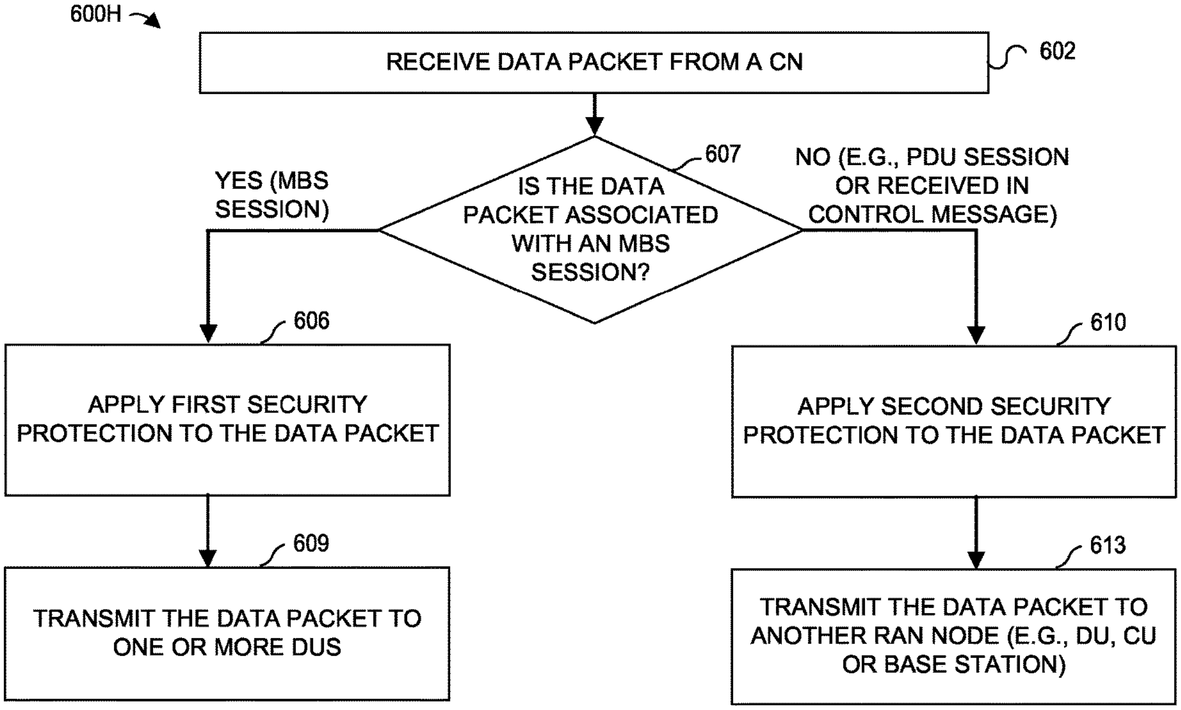
FIG. 6H is a flow diagram of an example method similar to the flow diagram of FIG. 6G, but where the RAN node is part of a distributed base station of FIG. 1B.

Turning to FIG. 6H, a scenario 600H is similar to the scenario 600G in blocks 602, 607, 606, and 610. Whereas the RAN node of scenario 600G can be base station 104, for example, the RAN node of scenario 600H is a CU (e.g., CU 172) of base station 104, for example. Subsequent to the RAN node at block 606 applying the first security protection to the data packet, the RAN node at block 609 can transmit the data packet (i.e., either the original data packet or a security-protected data packet) to one or more DUs (e.g., DU 174) of the base station 104. Subsequent to the RAN node at block 610 applying the second security protection to the data packet, the RAN node at block 613 can transmit the security-protected data packet to another RAN node, such as a DU (e.g., DU 174) of the base station 104, another CU (e.g., CU 172) of another base station (e.g., base station 106), or another base station (e.g., base station 106).

Figure 6I:
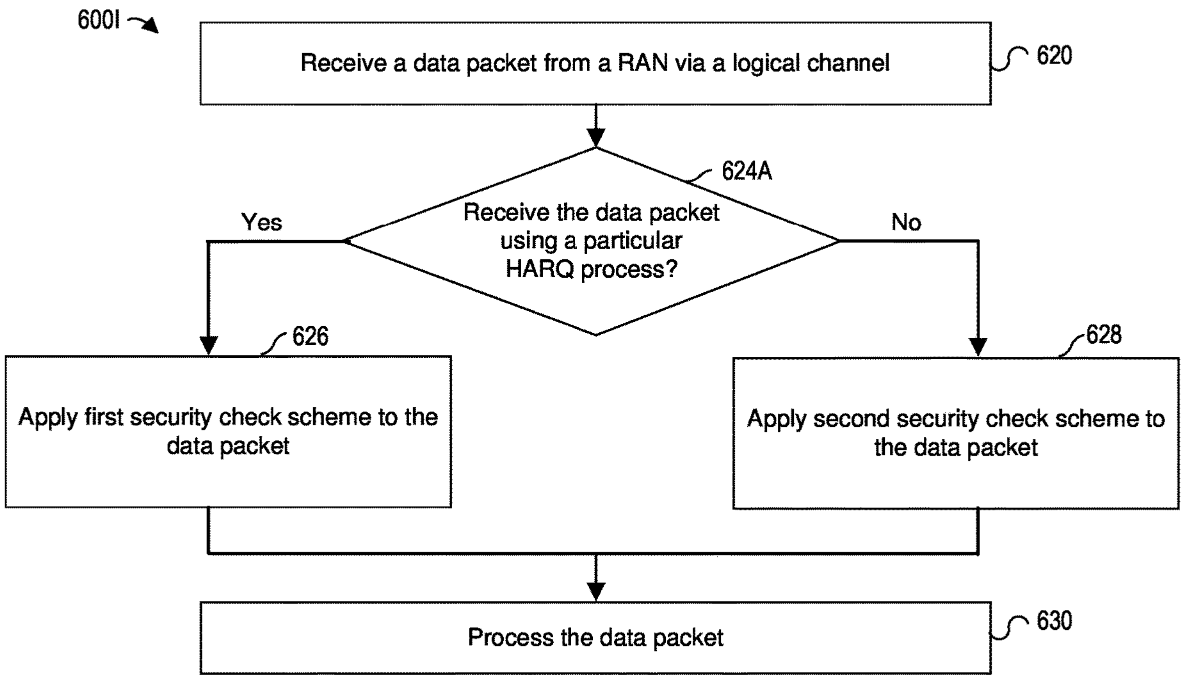
FIG. 6I is a flow diagram of an example method of selecting a security check procedure for a received data packet based on whether the data packet is associated with a particular a HARQ process, which can be implemented in a UE of this disclosure.

Referring next to FIG. 6I, a UE such as the UE 102A, UE 102B, or UE 103 can implement a method 600I. At block 620, the UE initially receives, from a RAN node, a data packet via a (first) logical channel (e.g., at event 528, 529, 548). The data packet can be a PDCP SDU, an IP packet, Ethernet packet, or NAS PDU, that may or may not be security-protected by the RAN, for example. More generally, the data packet can be either an MBS data packet or a non-MBS data packet. The RAN node can be any one of base stations described in FIG. 1A (e.g., base station 104, base station 106), or a CU (e.g., CU 172) of any one of the base stations. The UE can be operating in a connected state (e.g., RRC_CONNECTED state), inactive state (e.g., RRC_INACTIVE state), or idle state (e.g., RRC_IDLE state). In some implementations, prior to receiving the data packet, the RAN node can provide to the UE a configuration for establishing the logical channel on which the UE receives the data packet. The configuration can include a logical channel identity (ID) (value) that identifies the logical channel. In some implementations, the UE at block 620 receives from the RAN node a MAC PDU including the logical channel ID (value) and the data packet, which represents that the UE receives the data packet via the logical channel.

In some implementations, the logical channel (ID) can be associated with a radio bearer (RB) (ID). The RB (ID) can be an MRB (ID), DRB (ID) or SRB (ID). The UE can receive from the RAN an RB configuration which includes the RB ID configuring the RB, similar to events 520, 540. In some implementations, the logical channel can be an MTCH, DTCH or DCCH associated with the MRB, DRB or SRB respectively. If the logical channel ID is associated with an MRB, the UE determines that it received the data packet via an MTCH. If the logical channel ID is not associated with an MRB, the UE determines that it received the data packet not via an MTCH. In some implementations, if the logical channel ID is associated with a DRB, the UE determines that it received the data packet via a DTCH, and if the logical channel ID is associated with an SRB, the UE determines that it received the data packet via a DCCH.

In some implementations, the MRB (ID) can be a multicast, broadcast or unicast MRB (ID). In some implementations, the logical channel can be a multicast MTCH, a broadcast MTCH or a unicast MTCH associated with the multicast MRB, broadcast MRB or unicast MRB respectively. In case of the multicast MRB, the RAN in some implementations can configure the UE a second logical channel (ID) associated with the multicast MRB, similar to events 520, 540. The second logical channel can be a (multicast) MTCH or a DTCH. In case of the unicast MRB, the RAN can configure the UE a DTCH associated with the unicast MRB instead of the (unicast) MTCH. In this case, the first logical channel ID configures the DTCH.

At block 624A, the UE determines whether it received the data packet using a particular HARQ process (number). Depending on whether the UE received the data packet via the particular HARQ process, the UE can determine which security protection to apply to the data packet (e.g., at event 529, 549). If the UE at block 624A determines that it received the data packet using the particular HARQ process (number), the UE at block 626 can apply a corresponding first security protection to the data packet. In one implementation, the first security protection can be a null security protection, so that effectively, the UE at block 626 refrains from applying security protection to the data packet and can simply receive the data packet in its original form from the RAN node. In another implementation, the first security protection can be a non-null security protection, such as a common security protection. In this implementation, the UE can use a common security key (e.g., a security key for one or more MRBs or MBS sessions) when applying the first security protection on the data packet, which has been previously security-protected by the RAN node, to obtain the original data packet. On the other hand, if the UE at block 624A determines that it received the data packet using the particular HARQ process (number), the UE at block 628 can apply a corresponding second security protection to the data packet. Generally, the second security protection differs from the first security protection at least with respect to the security key used. The security algorithm used in the second security protection may be the same or different than the one used in the first security protection. In one implementation, the second security protection can be a non-null security protection specific to the UE (i.e., a UE-specific security protection). In this implementation, the UE can use UE-specific security key(s) (e.g., integrity key and/or encryption key as described above) when applying the second security protection on the data packet, which has been previously security-protected by the RAN, to obtain the original data packet. The UE-specific security protection in some cases can be a null security protection if the RAN does not require security protection to be applied to the data packet. Subsequent to either block 626 or 628, the UE at block 630 can process the original data packet.

In some implementations, the UE can (attempt to) receive a DCI and a scrambled CRC of the DCI on a PDCCH from the RAN to receive the data packet. In some implementations, the UE can verify the scrambled CRC by using a C-RNTI and the DCI. If the UE verifies that the scrambled CRC is valid, the UE receives a dynamic scheduling unicast transmission in accordance with the DCI and retrieves the data packet from the dynamic scheduling unicast transmission at block 620. In some implementations, the UE can (attempt to) receive a DCI and a scrambled CRC of the DCI on a PDCCH from the RAN to receive the data packet. In some implementations, the UE can verify the scrambled CRC by using a G-RNTI and the DCI. If the UE verifies that the scrambled CRC is valid, the UE receives a dynamic scheduling multicast transmission in accordance with the DCI and retrieves the data packet from the dynamic scheduling multicast transmission at block 620. In some implementations, the UE can (attempt to) receive a DCI and a scrambled CRC of the DCI on a PDCCH from the RAN to before receiving the data packet at block 620. The UE can verify the scrambled CRC by using the CS-RNTI and the DCI. If the UE verifies that the scrambled CRC is valid, the UE can (determine to) activate a SPS unicast radio resource and periodically receive a SPS unicast transmission on the SPS unicast radio resource in accordance with the DCI. The UE retrieves a data packet from the SPS unicast transmission. In such implementations, the UE at block 620 can receive a SPS unicast transmission on the SPS unicast radio resource in accordance with the DCI and retrieves data packet from the SPS unicast transmission. In other implementations, the UE can (attempt to) receive a DCI and a scrambled CRC of the DCI on a PDCCH from the RAN to before receiving the data packet at block 620. The UE can verify the scrambled CRC by using the G-CS-RNTI and the DCI. If the UE verifies that the scrambled CRC is valid, the UE can (determine to) activate a SPS multicast radio resource and periodically receive a data packet on the SPS multicast radio resource in accordance with the DCI. In such implementations, the UE at block 620 can receive a SPS multicast transmission on the SPS multicast radio resource in accordance with the DCI and retrieves the data packet from the SPS multicast transmission.

In some implementations, the DCI includes a HARQ process number. The UE associates a HARQ process with the HARQ process number and uses the HARQ process to receive a transmission including the MAC PDU in accordance with the DCI. If the HARQ process number in the DCI is the particular HARQ process number of block 624A, the UE determines that it received the data packet using the particular HARQ process (number). In some implementations, the UE uses the particular HARQ process (number) of block 624A to receive a dynamic scheduling multicast transmission or a SPS multicast transmission.

If the HARQ process number in the DCI is not the particular HARQ process number of block 624A, the UE determines that it received the data packet not using the particular HARQ process (number). For example, the particular HARQ process number is a first HARQ process number. If the HARQ process number in the DCI is the first HARQ process number, the UE applies the first security protection to the data packet. If the HARQ process number in the DCI is a second HARQ process number, the UE applies the second security protection to the data packet.

Figure 6J:
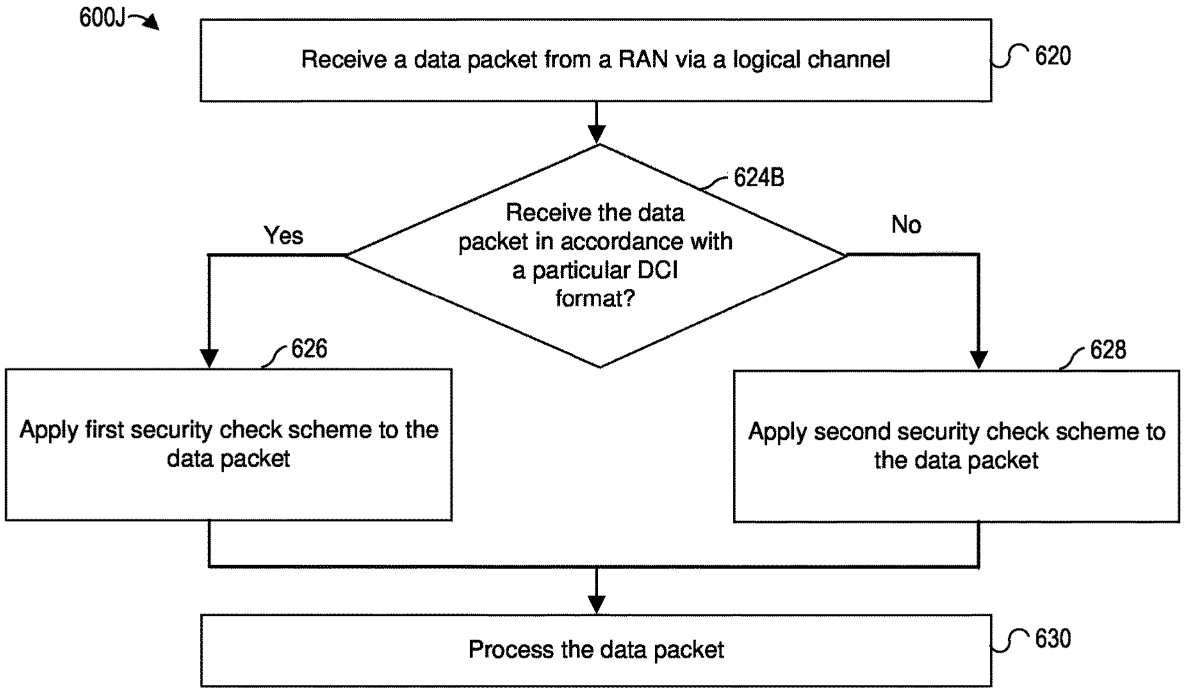
FIG. 6J is a flow diagram of an example method of selecting a security check procedure for a received data packet based on whether a base station transmitted the data packet in according with a particular DCI format, which can be implemented in a UE of this disclosure.

Turning to FIG. 6J, a scenario 600J is similar to the scenario 600I except for block 624A. Whereas the UE of scenario 600I determines whether it received the data packet transmitted by the RAN node using a particular HARQ process (number) at block 624A, the UE of scenario 600J determines whether it received the data packet at block 620 in accordance with a particular DCI format at block 624B. If the UE at block 624B determines that it received the data packet in accordance with the particular DCI format, the flow proceeds to the block 626. If the UE at block 624B determines that it received the data packet not in accordance with the particular DCI format, the flow proceeds to the block 628.

To receive the data packet, the UE can (attempt to) receive a DCI and a scrambled CRC of the DCI on a PDCCH from the RAN as described above. If a DCI format of the DCI is the particular DCI format of block 624B, the UE determines that it received the data packet in accordance with the particular DCI format. If the DCI format of the DCI is not the particular DCI format of block 624B, the UE determines that it received the data packet not in accordance with the particular DCI format. For example, the particular DCI format is a first DCI format. If the DCI format of the DCI is the first DCI format, the UE applies the first security protection to the data packet. If the DCI format of the DCI is a second DCI format, the UE applies the second security protection to the data packet. In some implementations, a DCI format of a DCI scheduling a unicast transmission and a DCI format of a DCI scheduling a multicast transmission can be the first DCI format and the second DCI format, respectively.

Figure 6K:
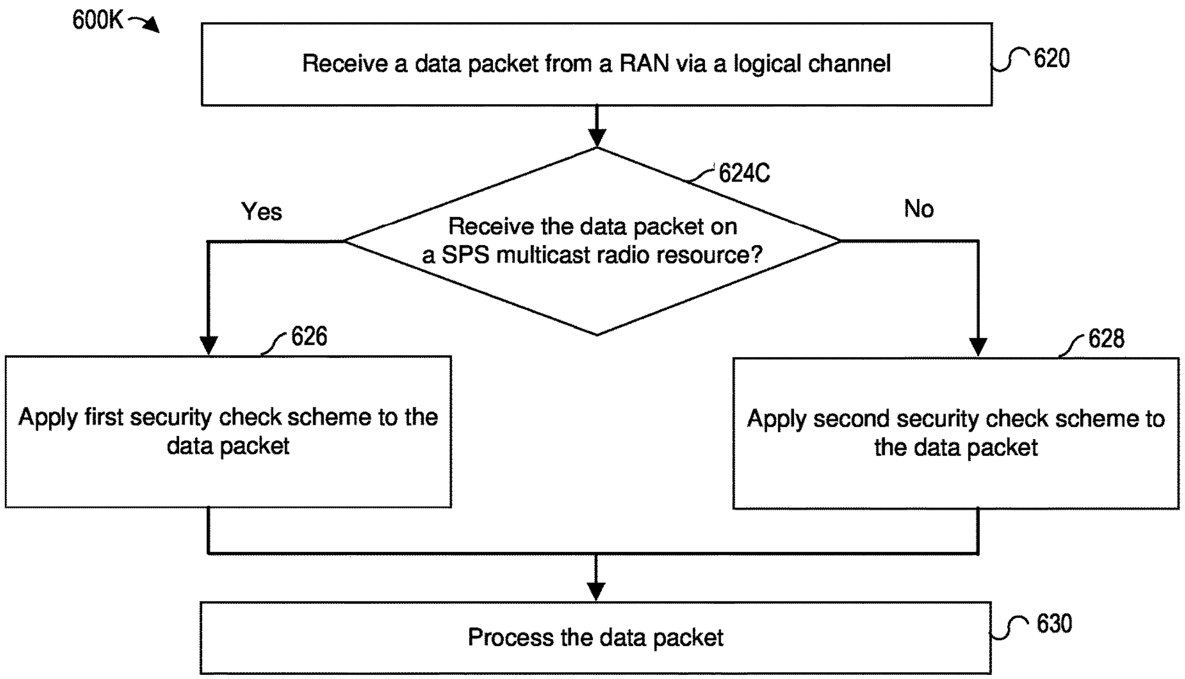
FIG. 6K is a flow diagram of an example method of selecting a security check procedure for a received data packet based on whether a base station transmitted the data packet over a semi-persistent scheduling (SPS) multicast radio resource, which can be implemented in a UE of this disclosure.

Turning to FIG. 6K, a scenario 600K is similar to the scenario 600I except for block 624A. Whereas the UE of scenario 600I determines whether it received the data packet transmitted by the RAN node using a particular HARQ process (number) at block 624A, the UE of scenario 600K determines whether it received the data packet at block 620 on a SPS multicast radio resource at block 624C. In some implementations, the UE can determine whether the configuration provided by the RAN for establishing the logical channel includes a G-CS-RNTI for the UE to use to access the data packet. If the UE at block 624C determines that it received the data packet on a SPS multicast radio resource, the UE can proceed to blocks 626 and 630 as described above. If the UE at block 624C determines that it received the data packet not on a SPS multicast radio resource, the UE can proceed to blocks 628 and 630 as described above. For example, in cases where the UE can receive the data packet on a unicast radio resource (e.g., dynamic scheduling or SPS unicast radio resource) from the RAN as described above, the UE determines that it received the data packet not on a SPS multicast radio resource. In some scenarios and implementations, if the UE determines that it received the data packet on a dynamic scheduling multicast radio resource as described above, the UE can proceed to blocks 626 and 630 as described above.

Figure 6L:
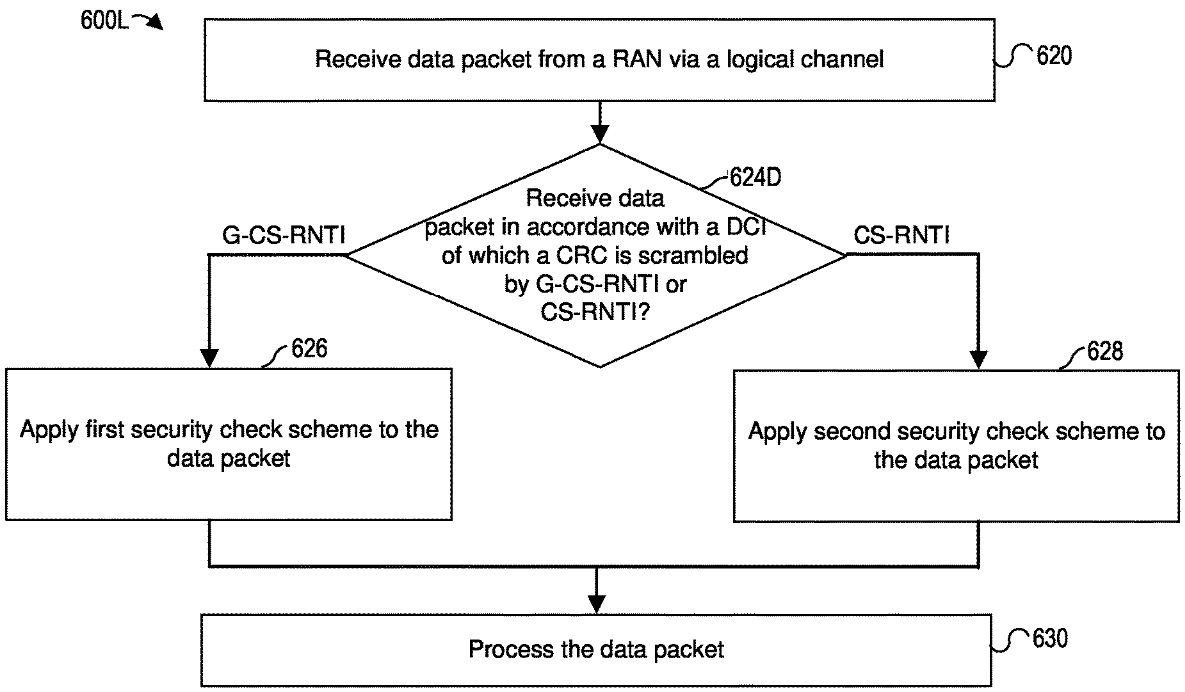
FIG. 6L is a flow diagram of an example method of selecting a security check procedure for a received data packet based on a type of a temporary identifier a base station used to scramble the CRC for the data packet, which can be implemented in a UE of this disclosure.

Turning to FIG. 6L, a scenario 600L is similar to the scenario 600I except for block 624A. Whereas the UE of scenario 600I determines whether it received the data packet transmitted by the RAN node using a particular HARQ process (number) at block 624A, the UE of scenario 600L determines whether it received the data packet at block 620 in accordance with a DCI of which a cyclic redundancy check (CRC) is scrambled by a G-CS-RNTI or CS-RNTI at block 624D. If the UE at block 624D determines that it received the data packet in accordance with a DCI of which a CRC is scrambled by the G-CS-RNTI, the UE can proceed to blocks 626 and 630 as described above. If the UE at block 624D determines that it received the data packet in accordance with a DCI of which a CRC is scrambled by the CS-RNTI, the UE can proceed to blocks 628 and 630 as described above.

Figure 6M:
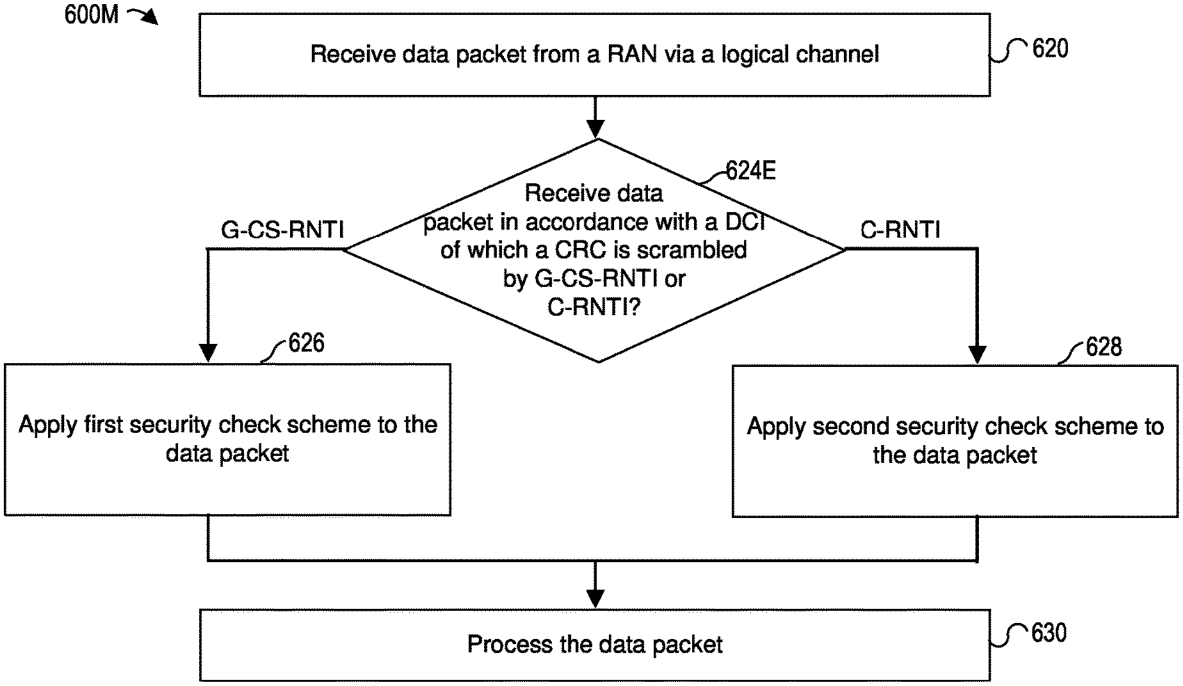
FIG. 6M is a flow diagram of an example method similar to that of FIG. 6L, but according to which a UE compares a cell RNTI rather than a configured scheduling (CS) RNTI to a group CS RNTI.

Turning to FIG. 6M, a scenario 600M is similar to the scenario 600I except for block 624A. Whereas the UE of scenario 600I determines whether it received the data packet transmitted by the RAN node using a particular HARQ process (number) at block 624A, the UE of scenario 600M determines whether it received the data packet at block 620 in accordance with a DCI of which a cyclic redundancy check (CRC) is scrambled by a G-CS-RNTI or C-RNTI at block 624E. If the UE at block 624E determines that it received the data packet in accordance with a DCI of which a CRC is scrambled by the G-CS-RNTI, the UE can proceed to blocks 626 and 630 as described above. If the UE at block 624E determines that it received the data packet in accordance with a DCI of which a CRC is scrambled by the C-RNTI, the UE can proceed to blocks 628 and 630 as described above.

Figure 6N:
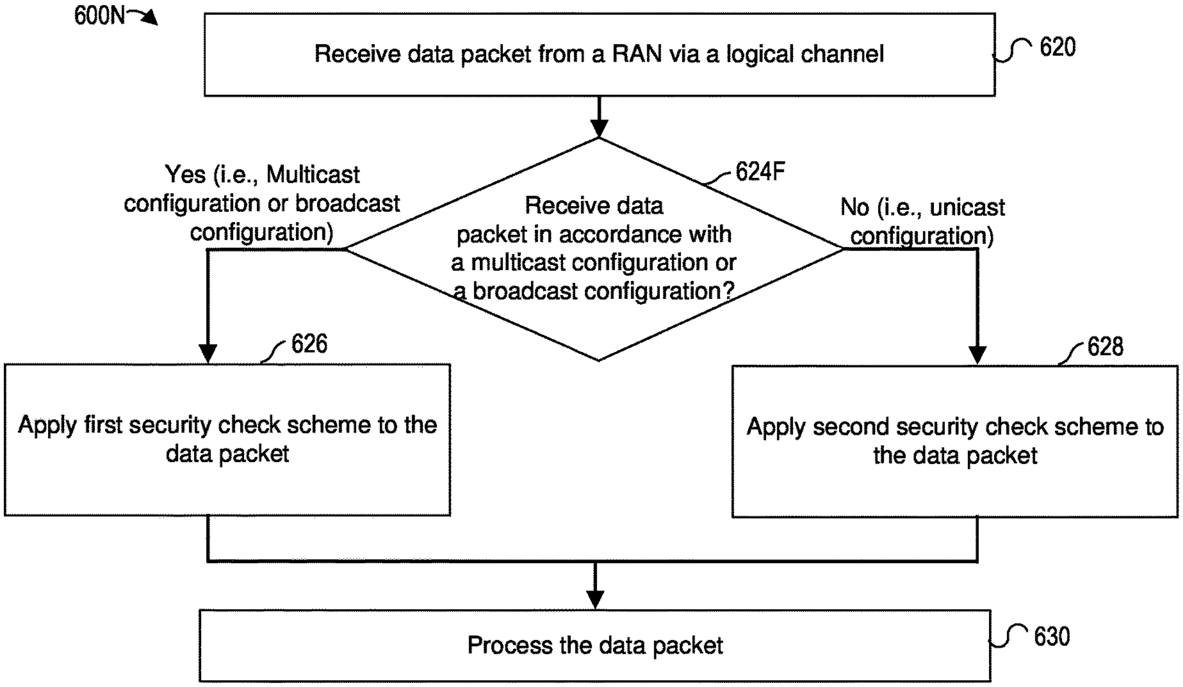
FIG. 6N is a flow diagram of an example method of selecting a security check procedure for a received data packet based on whether the UE received the data packet in accordance with a multicast configuration or a broadcast configuration, which can be implemented in a UE of this disclosure.

Turning to FIG. 6N, a scenario 600N is similar to the scenario 600I except for block 624A. In the scenario 600N, "multicast" does not refer to both multicast and broadcast. Whereas the UE of scenario 600I determines whether it received the data packet transmitted by the RAN node using a particular HARQ process (number) at block 624A, the UE of scenario 600N determines whether it received the data packet at block 620 in accordance with a multicast configuration or broadcast configuration at block 624F. If the UE at block 624F determines that it received the data packet in accordance with a multicast configuration or a broadcast configuration, the UE can proceed to blocks 626 and 630 as described above. If the UE at block 624F determines that it received the data packet neither in accordance with a multicast configuration nor a broadcast configuration, the UE can proceed to blocks 628 and 630 as described above. For example, the UE received the data packet in accordance with a unicast configuration.

In some implementations, the UE can receive the multicast configuration in a RRC reconfiguration message from the RAN, similar to the configuration parameters in the DU configuration of the events 520, 540. The multicast configuration includes configuration parameters to receive MBS data multicast by the RAN. For example, the multicast configuration includes a RLC bearer configuration and/or a MRB configuration. The RLC bearer configuration can be associated with the MRB configuration. In some implementations, the UE can receive a MCCH message including the broadcast configuration from the RAN, similar to the MBS configuration of the event 569. The broadcast configuration includes configuration parameters to receive MBS data broadcast by the RAN. For example, the broadcast configuration includes a RLC bearer configuration and may or may not include a MRB configuration. In some implementations, the UE can receive the unicast configuration in a RRC reconfiguration message from the RAN. The unicast configuration includes configuration parameters to receive non-MBS data unicast by the RAN. For example, the unicast configuration includes a RLC bearer configuration and/or a DRB configuration. The RLC bearer configuration can be associated with the DRB configuration.

Figure 6P:
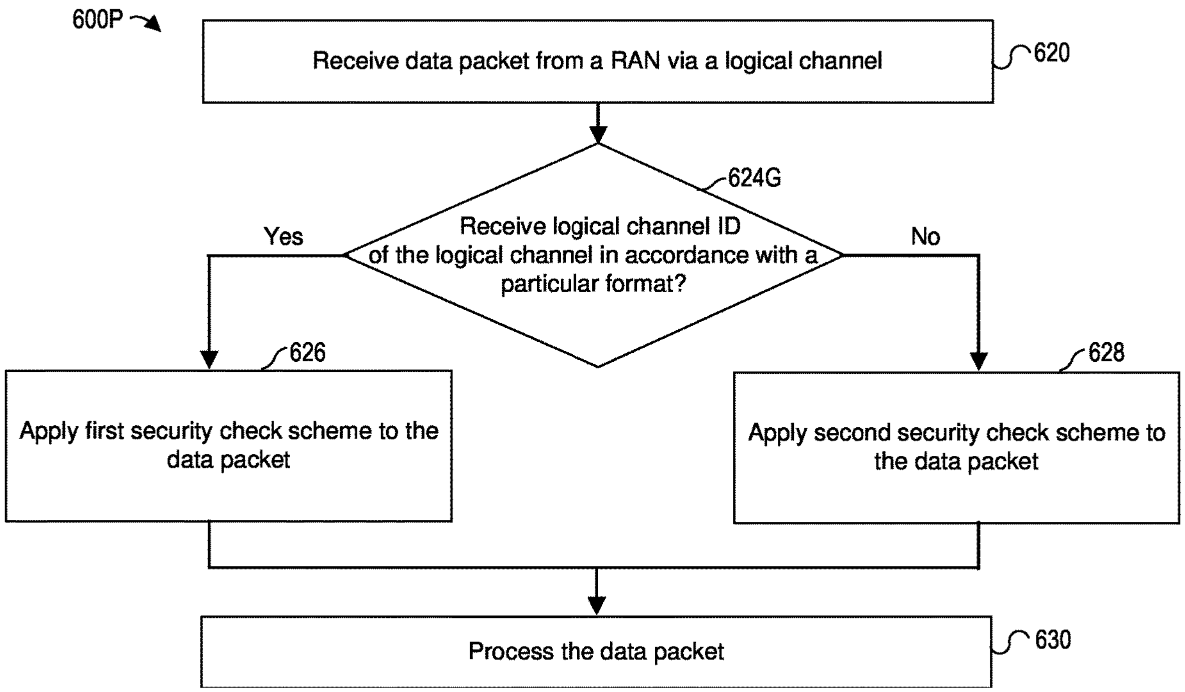
FIG. 6P is a flow diagram of an example method of selecting a security check procedure for a received data packet based on whether the logical channel ID with which the data packet is associated has a particular format, which can be implemented in a UE of this disclosure.

Turning to FIG. 6P, a scenario 600P is similar to the scenario 600I except for block 624A. Whereas the UE of scenario 600I determines whether it received the data packet transmitted by the RAN node using a particular HARQ process (number) at block 624A, the UE of scenario 600P determines whether received the logical channel ID of the logical channel in accordance with a particular format at block 624G. If the UE at block 624G determines that it received the logical channel ID in accordance with the particular format, the UE can proceed to blocks 626 and 630 as described above. If the UE at block 624G determines that it received the logical channel ID not in accordance with the particular format, the UE can proceed to blocks 628 and 630 as described above.

As described above, the UE at block 620 receives the MAC PDU including the logical channel ID and the data packet from the RAN. If the UE retrieves the logical channel ID in accordance with the particular format (e.g., a first format) the UE determines that the UE receives the logical channel ID in accordance with the particular format and the UE proceed to blocks 626 and 630. For example, the first format is a one-octet extended logical channel ID (eLCID) format. If the UE retrieves the logical channel ID in accordance with a second format, the UE determines that the UE receives the logical channel ID not in accordance with the particular format and the UE proceed to blocks 628 and 630. For example, the second format is a LCID format (i.e., not the one-octet eLCID format).

Figure 6Q:
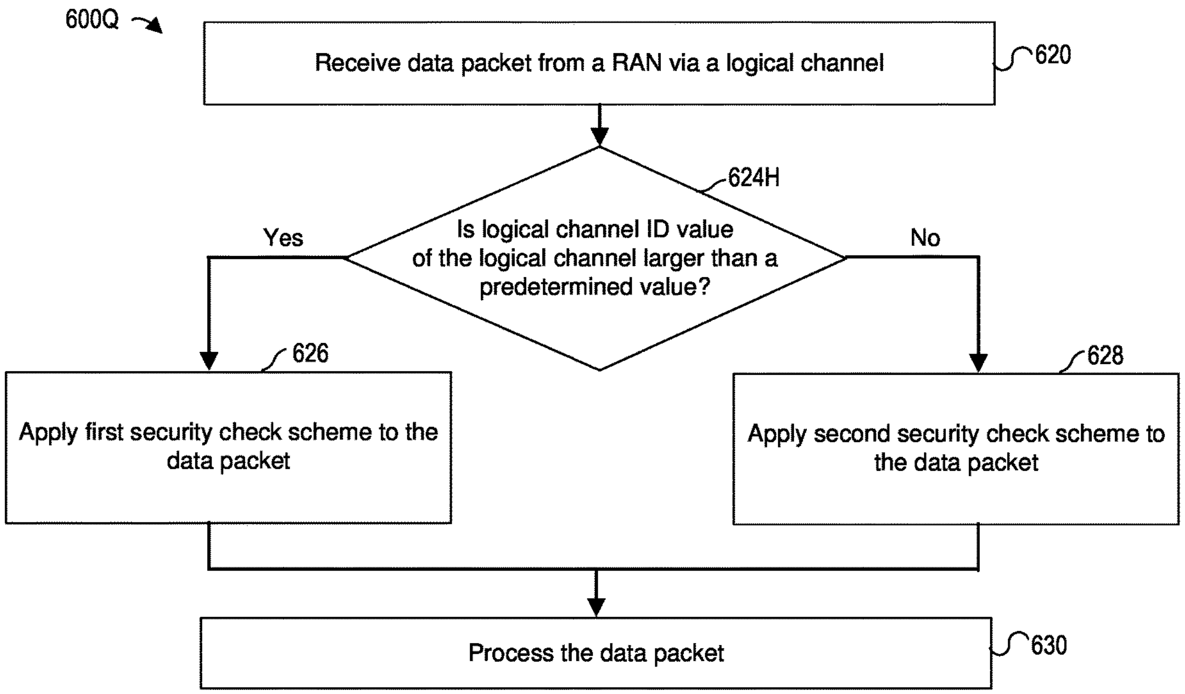
FIG. 6Q is a flow diagram of an example method of selecting a security check procedure for a received data packet based on whether the logical channel ID with which the data packet is associated exceeds a certain predefined value, which can be implemented in a UE of this disclosure.

Turning to FIG. 6Q, a scenario 600Q is similar to the scenario 600I except for block 624A. Whereas the UE of scenario 600I determines whether it received the data packet transmitted by the RAN node using a particular HARQ process (number) at block 624A, the UE of scenario 600Q determines whether the logical channel ID value of the logical channel is larger than a predetermined value at block 624H. For example, the predetermined value can be 63. If the UE at block 624H determines that the logical channel ID value is larger than the predetermined value, the UE can proceed to blocks 626 and 630 as described above. If the UE at block 624H determines that the logical channel ID value is smaller than or equal to the predetermined value, the UE can proceed to blocks 628 and 630 as described above.

Figure 6R:
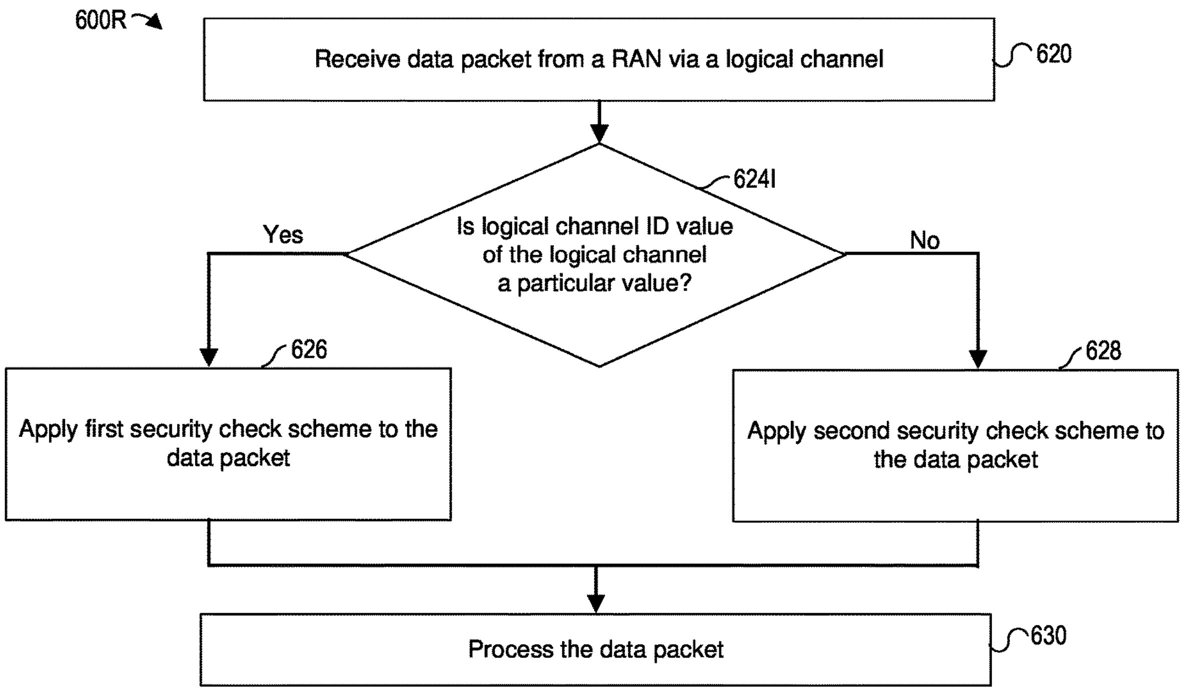
FIG. 6R is a flow diagram of an example method of selecting a security check procedure for a received data packet based on whether the logical channel ID with which the data packet is has a particular value, which can be implemented in a UE of this disclosure.

Turning to FIG. 6R, a scenario 600R is similar to the scenario 600I except for block 624A. Whereas the UE of scenario 600I determines whether it received the data packet transmitted by the RAN node using a particular HARQ process (number) at block 624A, the UE of scenario 600R determines whether the logical channel ID value of the logical channel is a particular value (i.e., a particular logical channel ID value) at block 624I. If the UE at block 624I determines that the logical channel ID value is the particular value, the UE can proceed to blocks 626 and 630 as described above. If the UE at block 624I determines that the logical channel ID value is not the particular value, the UE can proceed to blocks 628 and 630 as described above.

Prior to receiving the data packet at block 620, the UE can receive from the RAN a first RRC message which includes a first configuration including the particular value (i.e., a first value). Prior to receiving the data packet at block 620, the UE can receive from the RAN a second RRC message which includes a second configuration including a second value (i.e., a second logical channel ID value) to configure a second logical channel. As described above, the UE at block 620 receives the MAC PDU including the logical channel ID value and the data packet. If the logical channel ID value is the first value, the UE proceeds to blocks 626 and 630. If the logical channel ID value is the second value, the UE proceeds to the blocks 628 and 630. In some implementations, the first RRC message and the second RRC message are the same message (e.g., RRC reconfiguration message). In other implementations, the first RRC message and the second RRC message are different messages. For example, the first RRC message and the second RRC message can be a RRC reconfiguration message and a RRC setup respectively. In another example, the first RRC message and the second RRC messages can be RRC reconfiguration messages. In yet another example, the first RRC message and the second RRC message can be a RRC reconfiguration message and a RRC resume respectively.

Figure 6S:
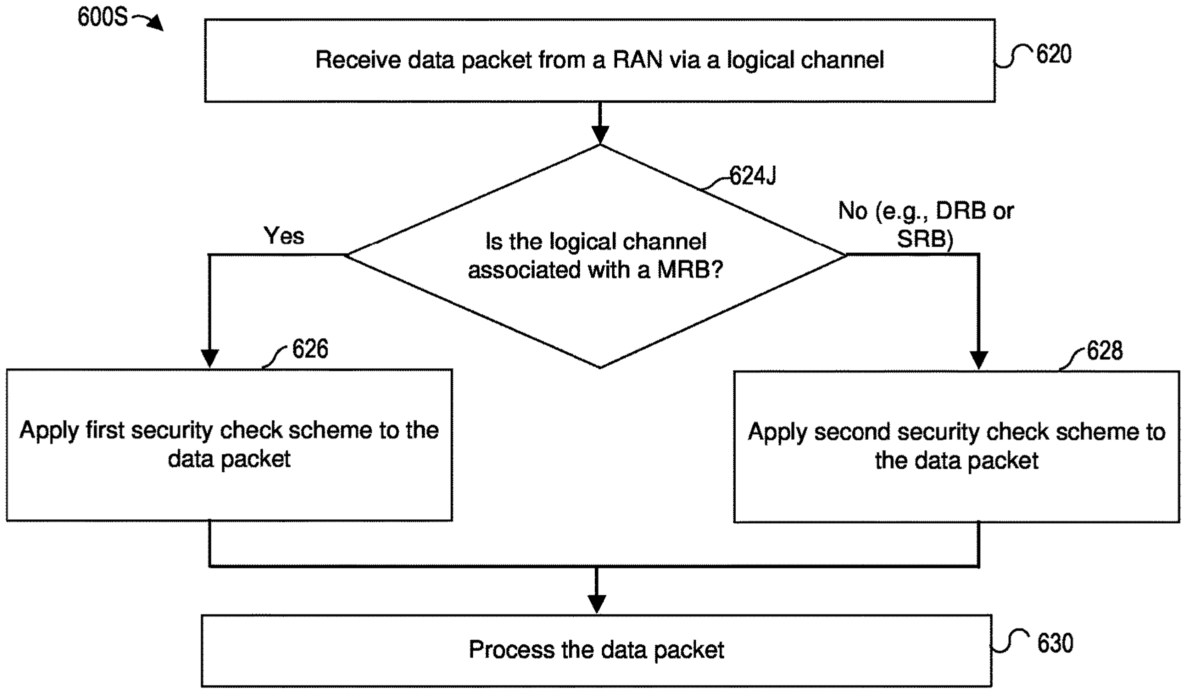
FIG. 6S is a flow diagram of an example method of selecting a security check procedure for a received data packet based on whether the logical channel ID with which the data packet is associated corresponds to an MRB, which can be implemented in a UE of this disclosure.

Turning to FIG. 6S, a scenario 600S is similar to the scenario 600I except for block 624A. Whereas the UE of scenario 600I determines whether it received the data packet transmitted by the RAN node using a particular HARQ process (number) at block 624A, the UE of scenario 600S determines whether the logical channel (ID) is associated with a MRB (ID) at block 624J. If the UE at block 624J determines that the logical channel (ID) is associated with a MRB (ID), the UE can proceed to blocks 626 and 630 as described above. If the UE at block 624J determines that the logical channel (ID) is not associated with a MRB (ID), the UE can proceed to blocks 628 and 630 as described above. For example, the UE at block 624J determines that the logical channel (ID) is associated with a DRB or an SRB.

The logical channel can be a DTCH, MTCH or DCCH. In some implementations, the logical channel can be a DTCH associated with a MRB or a DRB. In other implementations, the logical channel can be a MTCH associated with an MRB (e.g., multicast MRB or broadcast MRB). The MTCH can be a multicast MTCH or a broadcast MTCH associated with a multicast MRB or a broadcast MRB, respectively. In yet other implementations, the logical channel can be a DCCH associated with an SRB.

Prior to receiving the data packet at block 620, the UE can receive from the RAN a first RRC message which includes a first configuration including a first logical channel ID (value) configuring a first logical channel associated with an MRB (ID). Prior to receiving the data packet at block 620, the UE can receive from the RAN a second RRC message which includes a second configuration including a second logical channel ID (value) configuring a second logical channel associated with a DRB (ID) or a SRB (ID). If the UE received the data packet via the first logical channel, the UE proceeds to blocks 626 and 630. If the UE received the data packet via the second logical channel, the UE proceeds to the blocks 628 and 630. In some implementations, the first RRC message and the second RRC message are the same message (e.g., RRC reconfiguration message). In other implementations, the first RRC message and the second RRC message are different messages. For example, the first RRC message and the second RRC message can be a RRC setup message and a RRC reconfiguration message respectively. In another example, the first RRC message and the second RRC messages can be RRC reconfiguration messages.

The UE can receive from the RAN multiple data packets via different logical channel and perform the example methods 600I-600S for each of the data packets as described above.

Figure 7A:
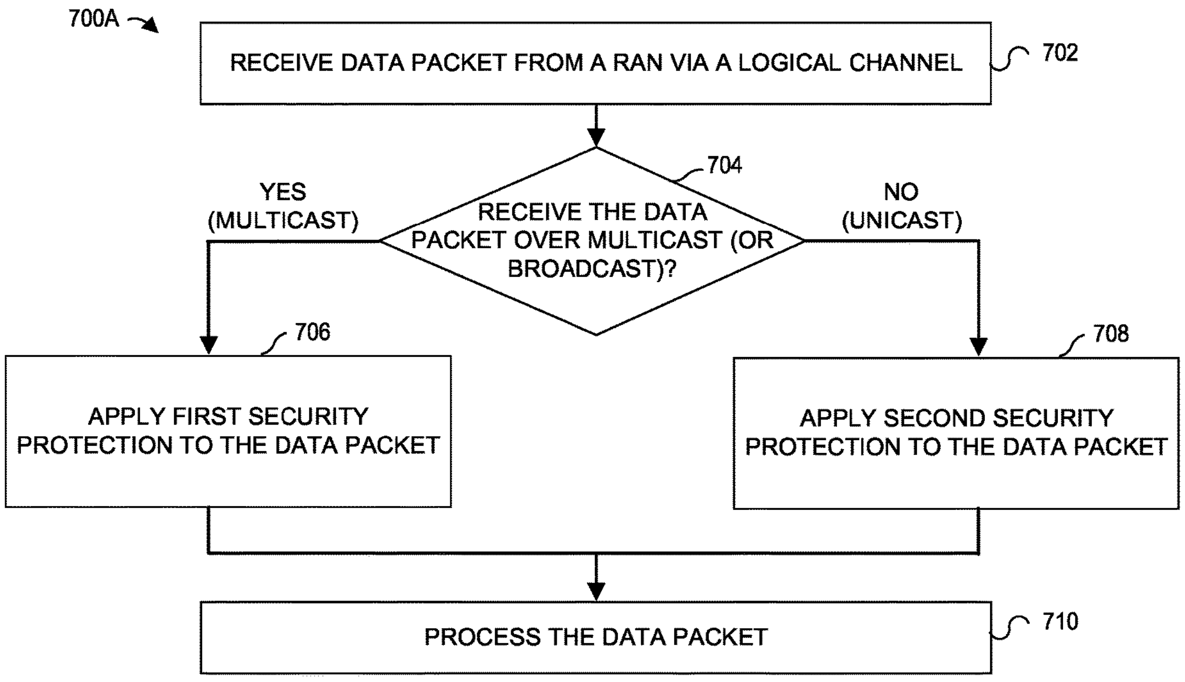
FIG. 7A is a flow diagram of an example method in which a UE of FIG. 1A manages security protection on a data packet based on whether the data packet is received over multicast (or broadcast) from a RAN of FIG. 1A or 1B.
Figure 7B:
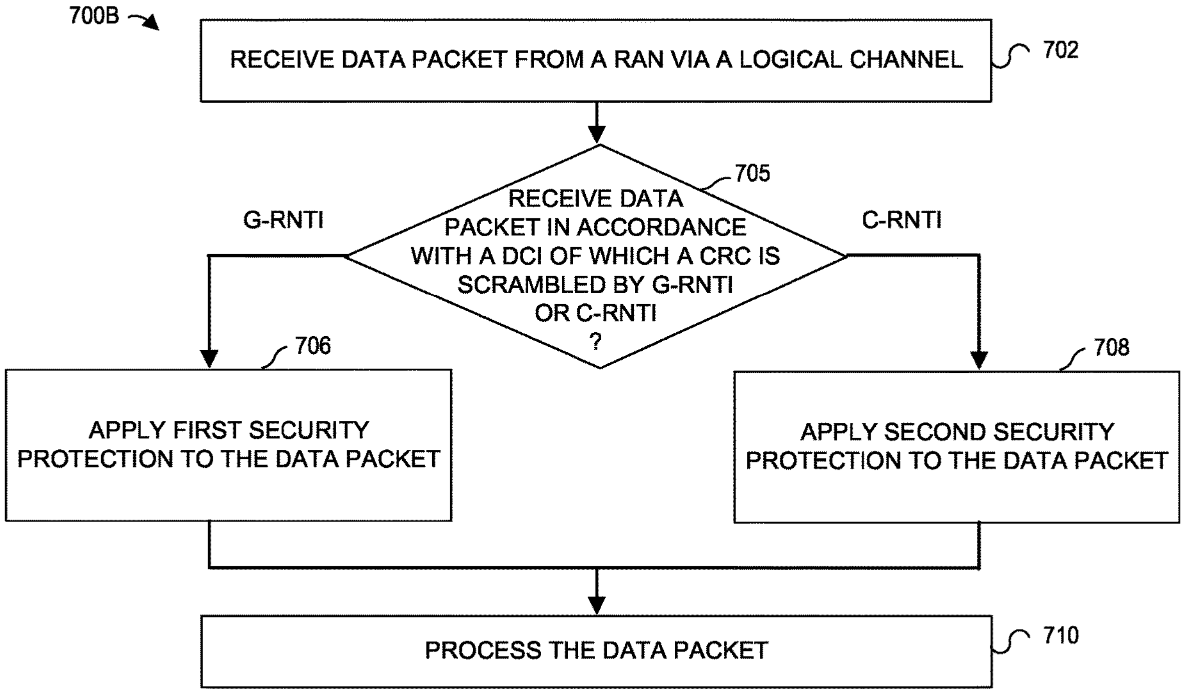
FIG. 7B is a flow diagram of an example method similar to the flow diagram of FIG. 7A, but where the UE manages security protection based on whether the RAN provides a group radio network temporary identifier (G-RNTI) to the UE.
Figure 7C:
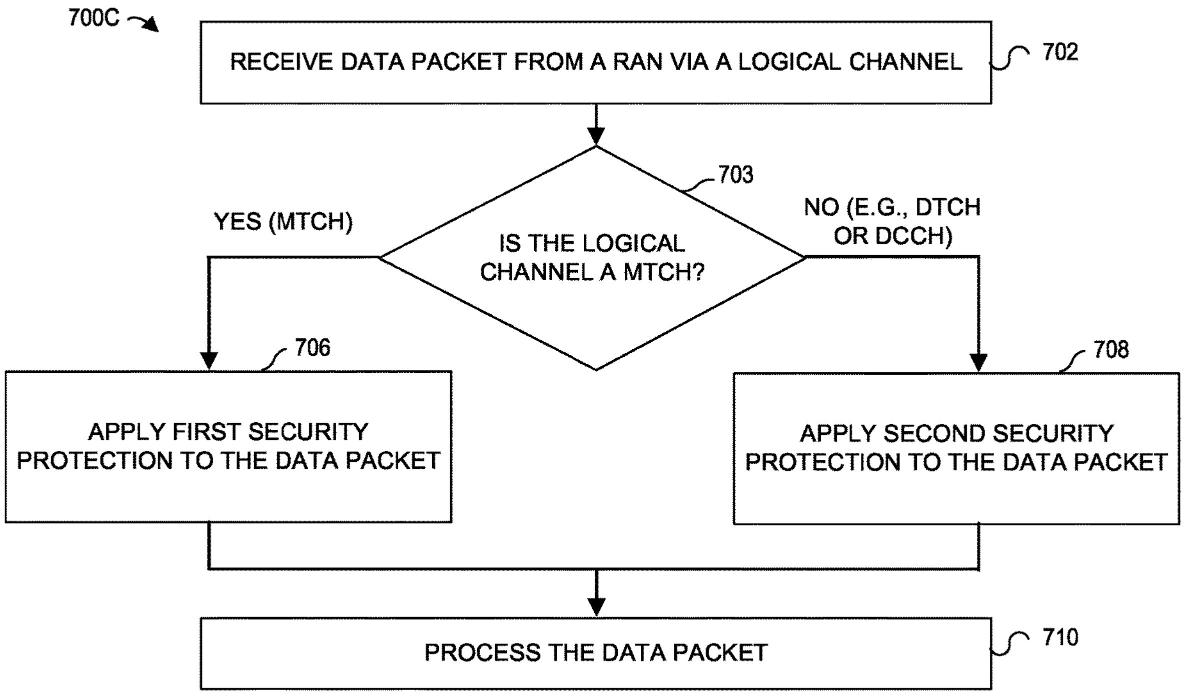
FIG. 7C is a flow diagram of an example method similar to the flow diagram of FIG. 7A, but where the UE manages security protection based on whether the data packet is received over a multicast traffic channel (MTCH) from the RAN.

Referring now to FIGS. 7A-7C, generally speaking, whereas the RAN node of FIGS. 6A-6H determines which security protection to apply to the data packet, a UE of FIGS. 7A-7C similarly determines which security protection to apply upon receiving the data packet (i.e., either the original data packet or a security-protected data packet) from the RAN node. Generally speaking, if the RAN node applies security protection (e.g., encryption, integrity protection) to the data packet, the UE performs a corresponding security protection (e.g., decryption, check integrity) to retrieve the original data packet. If the RAN node refrains from applying security protection to the data packet, the UE need not perform any corresponding security protection.

Referring first to FIG. 7A, in a scenario 700A, a UE (e.g., any one of UE 102A, UE 102B, UE 103) at block 702 initially receives, from a RAN node, a data packet via a logical channel (e.g., at event 528, 548). The data packet can be an IP packet, Ethernet packet, or NAS PDU, that may or may not be security-protected by the RAN, for example. More generally, the data packet can be either an MBS data packet or a non-MBS data packet. The RAN node can be any one of base stations described in FIG. 1A (e.g., base station 104, base station 106), or a CU (e.g., CU 172) of any one of the base stations. The UE can be operating in connected state (e.g., RRC_CONNECTED state), inactive state (e.g., RRC_INACTIVE state), or idle state (e.g., RRC_IDLE state). In some implementations, prior to receiving the data packet, the RAN node can provide to the UE a configuration for establishing the logical channel on which the UE receives the data packet. The configuration can include an identity that indicates that the logical channel is an MTCH or other type of logical channel (e.g., DTCH, or DCCH), for example.

At block 704, the UE determines whether it received the data packet transmitted by the RAN node using multicast. In some implementations, the UE can determine whether the configuration received from the RAN node indicates that the logical channel is an MTCH or other type of logical channel (e.g., DTCH, or DCCH) to determine whether it received the data packet transmitted by the RAN node using multicast. For example, the configuration includes a logical channel ID (value) identifying the logical channel. If the logical channel ID is associated with a MRB, the logical channel is a MTCH. If the logical channel ID is associated with a DRB, the logical channel is a DTCH. If the logical channel ID is associated with a SRB, the logical channel is a DCCH. In some implementations, if the UE determines that it received the data packet via an MTCH, the UE can determine that it received the data packet transmitted from the RAN node using multicast, and that the data packet has not been security-protected by the RAN node (e.g., the RAN node applied a null security protection to the data packet). In other implementations, if the UE determines that it received the data packet via the MTCH, the UE can determine that it received the data packet transmitted from the RAN node using multicast, and that the data packet has been security-protected by the RAN node (e.g., the RAN node applied a non-null security protection, such as a common security protection, to the data packet). If the UE determines that it received the data packet via another type of logical channel (e.g., a DTCH or DCCH), the UE can determine that it received the data packet via unicast, and that the data packet has been security-protected by the RAN node (e.g., the RAN node applied a non-null security protection, such as a UE-specific security protection, to the data packet).

The UE at block 702 receives from the RAN node a MAC PDU including the logical channel ID and the data packet. If the logical channel ID is associated with an MRB, the UE determines that it received the data packet via an MTCH. If the logical channel ID is not associated with an MRB, the UE determines that it received the data packet not via an MTCH. In some implementations, if the logical channel ID is associated with a DRB, the UE determines that it received the data packet via a DTCH, and if the logical channel ID is associated with an SRB, the UE determines that it received the data packet via a DCCH.

Depending on whether the UE received the data packet transmitted by the RAN node using multicast, the UE can determine which security protection to apply to the data packet (e.g., at event 529, 549). If the UE at block 704 determines that it received the data packet transmitted by the RAN node using multicast, the UE at block 706 can apply a corresponding first security protection to the data packet. In one implementation, the first security protection can be a null security protection, so that effectively, the UE at block 706 refrains from applying security protection to the data packet and can simply receive the data packet in its original form from the RAN node. In another implementation, the first security protection can be a non-null security protection, such as a common security protection. In this implementation, the UE can use a common security key (e.g., a security key for one or more MRBs or MBS sessions) when applying the first security protection on the data packet, which has been previously security-protected by the RAN node, to obtain the original data packet. On the other hand, if the UE at block 704 determines that it received the data packet transmitted by the RAN node using unicast, the UE at block 708 can apply a corresponding second security protection to the data packet. Generally, the second security protection differs from the first security protection at least with respect to the security key used. The security algorithm used in the second security protection may be the same or different than the one used in the first security protection. In one implementation, the second security protection can be a non-null security protection specific to the UE (i.e., a UE-specific security protection). In this implementation, the UE can use UE-specific security key(s) (e.g., integrity key and/or encryption key as described above) when applying the second security protection on the data packet, which has been previously security-protected by the RAN node, to obtain the original data packet. The UE-specific security protection in some cases can be a null security protection if the RAN node does not require security protection to be applied to the data packet. Subsequent to either block 706 or 708, the UE at block 710 can process the original data packet.

Turning to FIG. 7B, a scenario 700B is similar to the scenario 700A except for blocks 702 and 704. Whereas the UE of scenario 700A determines whether it received the data packet transmitted by the RAN node using multicast at block 704, the UE of scenario 700B determines whether it received the data packet at block 702 in accordance with a DCI of which a cyclic redundancy check (CRC) is scrambled by a G-RNTI or C-RNTI at block 705. In some implementations, the UE can determine whether the configuration provided by the RAN for establishing the logical channel includes a G-RNTI for the UE to use to access the data packet. If the configuration includes the G-RNTI, the UE can verify the scrambled CRC by using the G-RNTI and the DCI. If the UE verifies that the scrambled CRC is valid, the UE can (determine to) receive the data packet at block 702 by using the DCI to access the data packet. Irrespective of whether the configuration includes or excludes the G-RNTI, the UE can verify a scrambled CRC by using a unique C-RNTI that is already known by the UE and the DCI. If the UE verifies that the scrambled CRC is valid, the UE can (determine to) receive the data packet at block 702 by using the DCI. If the UE determines that it received the data packet in accordance with a DCI of which a CRC is scrambled by G-RNTI, the UE can proceed to blocks 706 and 710 as described above. If the UE determines that it received the data packet in accordance with a DCI of which a CRC is scrambled by C-RNTI, the UE can proceed to blocks 708 and 710 as described above.

Turning to FIG. 7C, a scenario 700C is similar to the scenario 700A except for block 704. Whereas the UE of scenario 700A determines whether it received the data packet transmitted by the RAN node using multicast at block 704, the UE of scenario 700C determines whether the logical channel on which it received the data packet is an MTCH at block 703. As described above with respect to FIG. 7A, the UE can determine whether the configuration received from the RAN node indicates that the logical channel is an MTCH or other type of logical channel (e.g., DTCH, or DCCH). If the UE determines that it received the data packet on an MTCH, the UE can proceed to blocks 706 and 710 as described above. If the UE determines that it received the data packet on another type of logical channel (e.g., a DTCH or DCCH), the UE can proceed to blocks 708 and 710 as described above.

Figure 7D:
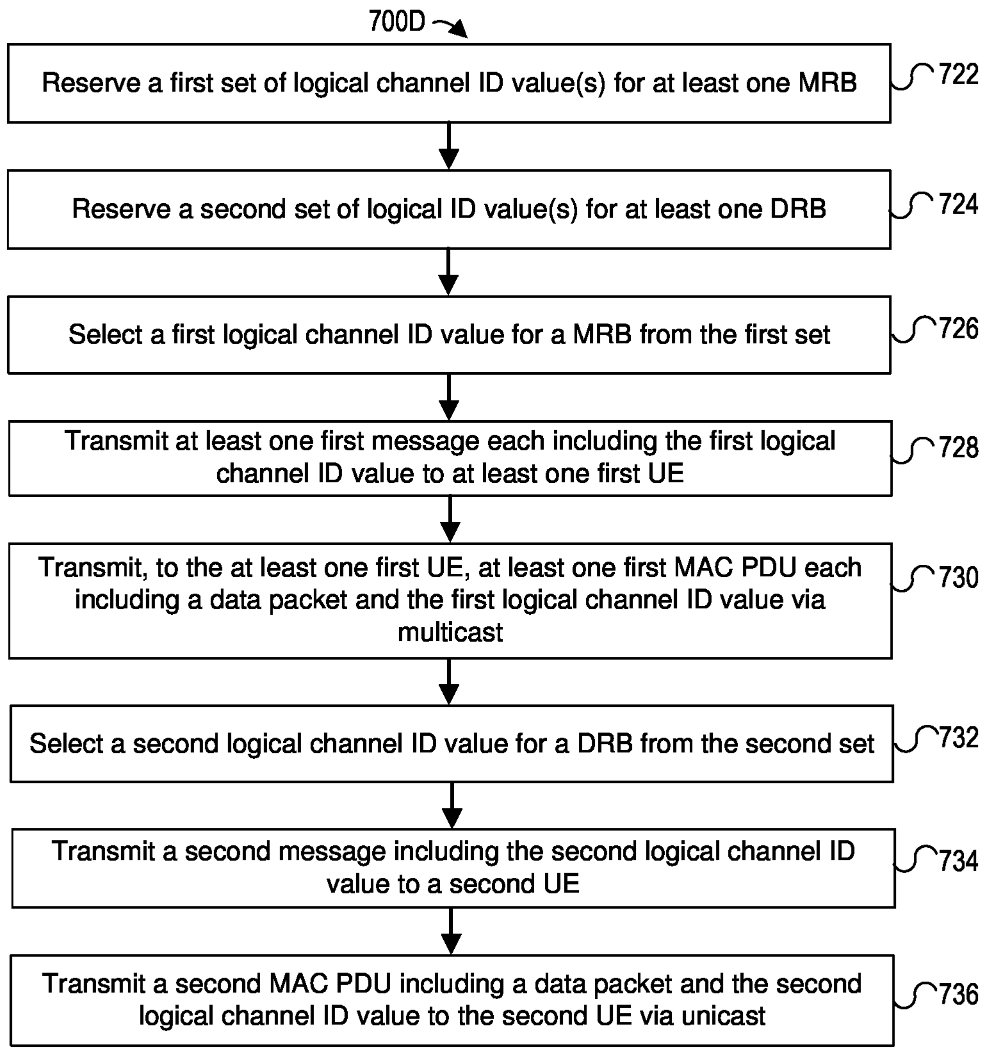
FIG. 7D is a flow diagram of an example method for selecting and assigning logical channel identifiers values for DRBs and MRBs, which can be implemented in a RAN node of this disclosure.
Figure 7E:
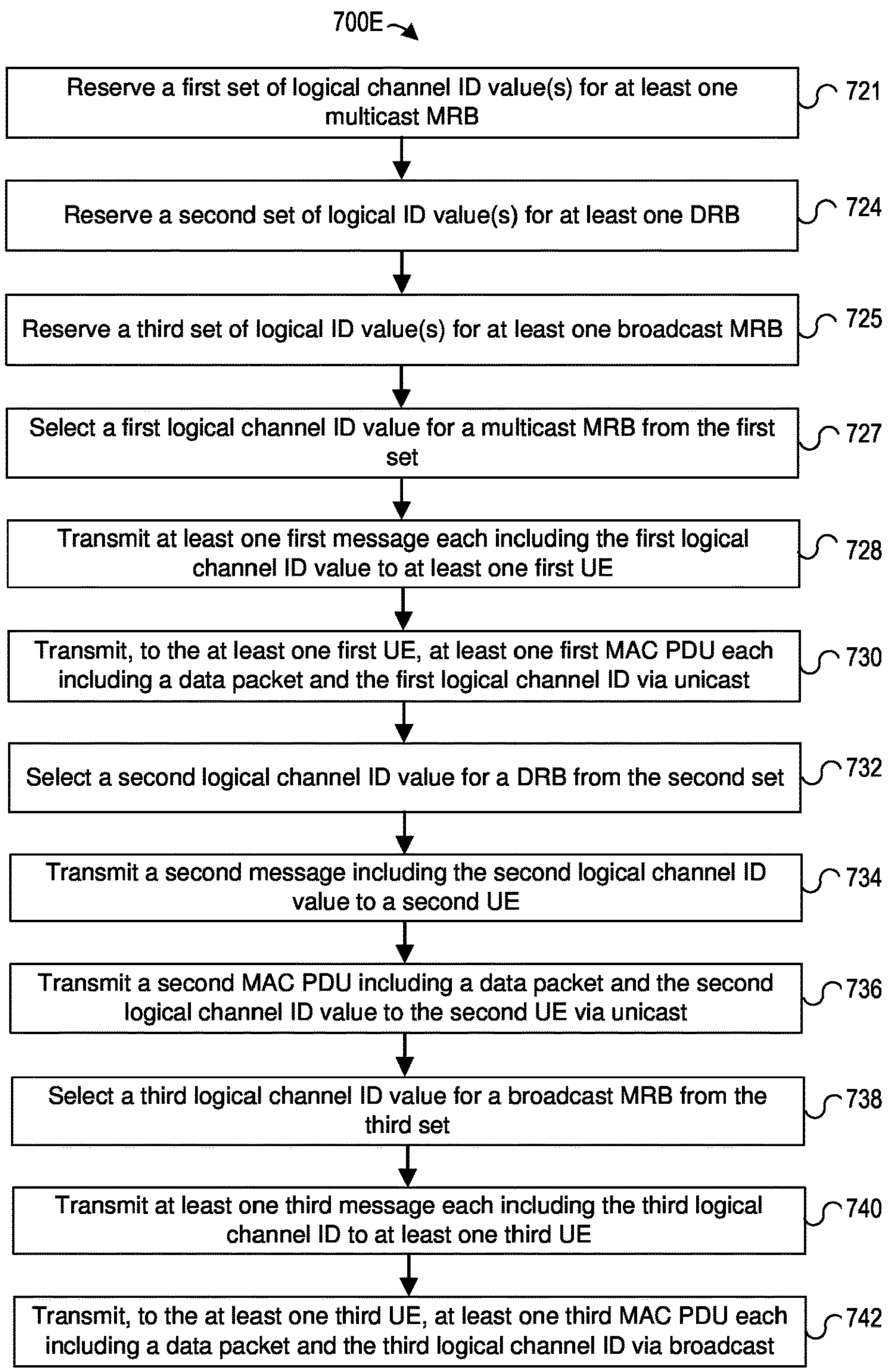
FIG. 7E is a flow diagram of an example method for selecting and assigning logical channel identifiers values for DRBs, multicast MRBs, and broadcast MRBs, which can be implemented in a RAN node of this disclosure.

Turning next to FIG. 7D, a RAN (e.g., RAN 105, base station 104, base station 106, DU 174) can implement an example method 700D for managing logical channels for communicating MBS data and non-MBS data. The method 700 begins at block 722, where the RAN reserves a first set of logical channel ID value(s) for at least one MRB. At block 724, the RAN reserves a second set of logical ID value(s) for at least one DRB. At block 726, the RAN selects a first logical channel ID value for a MRB from the first set to configure a first logical channel (ID) associated with the MRB. At block 728, the RAN transmits at least one first message, each including the first logical channel ID value, to at least one first UE (e.g., events 520, 540, 569). At block 730, the RAN transmits, to the at least one first UE, at least one first MAC PDU each including a data packet and the first logical channel ID via multicast (e.g., events 528, 548, 579). At block 732, the RAN selects a second logical channel ID value for a DRB from the second set to configure a second logical channel (ID) associated with the DRB. At block 734, the RAN transmits a second message including the second logical channel ID value to a second UE. At block 736, the RAN transmits a second MAC PDU including a data packet and the second logical channel ID value to the second UE via unicast.

In some implementations, the data packet in the second MAC PDU can be an IP packet, Ethernet packet or an application packet for a unicast service that the second UE performs. For example, the unicast service can be a web browsing service, Gmail, YouTube, Facebook, WhatsApp, Instant Gram or Netflix.

In some implementations, the at least one first UE can include the second UE. In other implementations the at least one first UE does not include the second UE. In some implementations, the at least one first message and the second message can be RRC reconfiguration message(s) and/or RRC resume message(s).

In some implementations, the first set includes at least one first logical channel ID value, and the second set includes at least one second logical channel ID value different from the at least one first logical channel ID value. In some implementations, the at least one first logical channel ID value is larger than the at least one second logical channel ID value. For example, the first set include integer value(s) larger than 63 and smaller than 309, and the second set includes integer value(s) larger than 4 and smaller than 64 or 33. In another example, the first set value include integer value(s) larger than 63 and smaller than 72, 80, 88, 96, 104, 112, 120 or 128, and the second set include integer value(s) larger than 4 and smaller than 64 or 33. In yet another example, the first set include integer value(s) larger than 244, 252, 260, 268, 276, 284, 292 or 300, and smaller than 309, and the second set include value(s) larger than 4 and smaller than 64 or 33.

In other implementations, the first set and the second set include different values which are larger than 4 and smaller than a predetermined value N, where N is larger than 4 and smaller than 33, for example. In such implementations, the RAN can partition or divide the values 5, . . . , the predetermined value into the first set and the second set. For example, the first set includes value(s) X, . . . , 32 where X is an integer larger than 6 and smaller than 33, and the second set includes value(s) 5, . . . , (X−1).

In some implementations, the RAN can generate a first logical channel ID field/IE to include the first logical channel ID value and include the first logical channel ID field/IE in the first message. Similarly, the RAN can generate a second logical channel ID field/IE to include the second logical channel ID value and include the second logical channel ID field/IE in the second message. In some implementations, the first and second logical channel ID fields/IEs are different fields/IEs. For example, the first logical channel ID field can be a logicalChannelIdentity-Ext(−r17), logicalChannelIdentityExt(−r17), eLogicalChannelIdentity(−r17) or extLogicalChannelIdentity(−r17) field, and the second logical channel ID field can be a logicalChannelIdentity field. In another example, the first logical channel ID IE can be a LogicalChannelIdentity-Ext(−r17), LogicalChannelIdentityExt(−r17), ELogicalChannelIdentity(−r17) or ExtLogicalChannelIdentity(−r17) IE, and the second logical channel ID field can be a LogicalChannelIdentity IE. In other implementations, the first and second logical channel ID fields/IEs are different instances of the same field/IE. For example, the field can be a logicalChannelIdentity, logicalChannelIdentity-Ext(−r17), logicalChannelIdentityExt(−r17), eLogicalChannelIdentity(−r17) or extLogicalChannelIdentity(−r17) field. In another example, the IE can be a LogicalChannelIdentity, LogicalChannelIdentity-Ext(−r17), LogicalChannelIdentityExt(−r17), ELogicalChannelIdentity (−r17) or ExtLogicalChannelIdentity(−r17) IE.

In some implementations, the RAN at block 730 generates a (first) mapping value to represent the first logical channel ID value. In such implementations, the RAN includes the mapping value in the first MAC PDU instead of the first logical channel ID value. In some implementations, the RAN can further include, in the first MAC PDU, an indication indicating existence of the mapping value. The indication can be a particular logical channel ID value. For example, the particular logical channel ID value can be a predetermined logical channel ID value (e.g., 34). Thus, when the UE receives the first MAC PDU, the UE (e.g., MAC 204B) can determine existence of the mapping value in accordance with the indication and obtains the first logical channel ID value from the mapping value. In some implementations, the RAN may not include the indication in the second MAC PDU. In such cases, when the UE receives the first MAC PDU, the UE (e.g., MAC 204B) can determine existence of the mapping value in accordance with the indication.

In some implementations, the mapping value can be one of numbers 0, 1, . . . , 244 which maps to logical channel ID values 64, 65, . . . , 308, respectively. For example, the mapping value can be one of numbers 0, 1, . . . , M which maps to logical channel ID values 64, 65, . . . , 64+M, respectively, where M can be 7, 15, 23, 31, 39, 47, 55, 63. In this example, the RAN refrains from using numbers M+1, . . . , 244 and logical channel ID values (65+M), . . . , 308 for the mapping value and the first set, respectively. In yet another example, the mapping value can be one of values (181+N), 182, . . . , 244 which maps to logical channel ID values (245+N), 246, . . . , 308, respectively, where N=0, 8, 16, 24, 32, 48, 56. In this example, the RAN refrains from using numbers 0, . . . , (180+N) and logical channel ID values 64, . . . , (244+N) for the mapping value and the first set, respectively.

A benefit of dividing logical channel ID values into different sets for MRB(s) and DRB(s) is to simplify the implementation of the RAN. Without the method 700D, every time the RAN is requested to configure a logical channel (ID) for a MRB for plural UEs (e.g., the first UE(s)), the RAN has to check which logical channel ID value(s) are assigned to the plural UEs Turning to FIG. 7E, a scenario 700E is similar to the scenario 700D except that multicast and broadcast are separately described in the scenario 700E. The method 700E begins at block 721, where the RAN reserves a first set of logical channel ID value(s) for at least one multicast MRB. At block 725, the RAN reserves a third set of logical channel ID value(s) for at least one broadcast MRB. At block 727, the RAN selects a first logical channel ID value for a multicast MRB from the first set. At block 728, the RAN transmits at least one first message, each including the first logical channel ID value, to at least one first UE (e.g., events 520, 540). At block 738, the RAN selects a third logical channel ID value for a broadcast MRB from the third set to configure a third logical channel (ID) associated with the broadcast MRB. At block 740, the RAN transmits at least one third message, each including the third logical channel ID value, to at least one third UE (e.g., event 569). At block 742, the RAN transmits a third MAC PDU including a data packet and the third logical channel ID value to the at least one third UE via unicast (e.g., event 579).

In some implementations, the at least one first UE can include the second UE. In other implementations the at least one first UE does not include the second UE. In some implementations, the at least one third UE can include the second UE. In other implementations the at least one third UE does not include the second UE. In some implementations, the at least one first UE and the at least one third UE may include the same UE(s) and/or different UE(s).

In some implementations, the third set includes at least one third logical channel ID value different from the at least one first logical channel ID value and the at least one second logical channel ID value. In some implementations, the at least one third logical channel ID value is larger than the at least one second logical channel ID value. For example, the third set includes value(s) larger than 63 and smaller than 309, and the second set includes integer value(s) larger than 4 and smaller than 64 or 33. In another example, the third set include integer value(s) larger than 63 and smaller than 72, 80, 88, 96, 104, 112, 120 or 128, and the second set includes integer value(s) larger than 4 and smaller than 64 or 33. In yet another example, the third set includes value(s) larger than 244, 252, 260, 268, 276, 284, 292 or 300, and smaller than 309, and the second set include integer value(s) larger than 4 and smaller than 64 or 33.

In other implementations, the first set, the second set and the third set include different values which are larger than 4 and smaller than a predetermined value N, where Nis larger than 4 and smaller than 33, for example. In such implementations, the RAN can divide the values 5, . . . , the predetermined value into the first set, the second set and third set. For example, the first and third sets include value(s) X, . . . , 32 where X is an integer larger than 6 and smaller than 33. In such case, the second set includes value(s) 5, . . . , (X−1).

In some implementations, the RAN can generate a third logical channel ID field/IE to include the third logical channel ID value and include the third logical channel ID field/IE in the third message. In some implementations, the third and second logical channel ID fields/IEs are different fields/IEs. For example, the third logical channel ID field can be a logicalChannelIdentity-Ext(−r17), logicalChannelIdentityExt(−r17), eLogicalChannelIdentity(−r17) or extLogicalChannelIdentity(−r17) field, and the second logical channel ID field can be a logicalChannelIdentity field. In another example, the first logical channel ID IE can be a LogicalChannelIdentity-Ext(−r17), LogicalChannelIdentityExt(−r17), ELogicalChannelIdentity(−r17) or ExtLogicalChannelIdentity(−r17) IE, and the second logical channel ID field can be a LogicalChannelIdentity IE. In other implementations, the third and second logical channel ID fields/IEs are different instances of the same field/IE. For example, the field can be a logicalChannelIdentity, logicalChannelIdentity-Ext(−r17), logicalChannelIdentityExt(−r17), eLogicalChannelIdentity(−r17) or extLogicalChannelIdentity(−r17) field. In another example, the IE can be a LogicalChannelIdentity, LogicalChannelIdentity-Ext(−r17), LogicalChannelIdentityExt(−r17), ELogicalChannelIdentity(−r17) or ExtLogicalChannelIdentity(−r17) IE.

In some implementations, the RAN at block 742 generates a (second) mapping value to represent the first logical channel ID value. In such implementations, the RAN includes the mapping value in the third MAC PDU instead of directly including the third logical channel ID value. In some implementations, the RAN can further include, in the third MAC PDU, an indication indicating existence of the mapping value. The indication can be a particular logical channel ID value (e.g., 34). Examples and implementations of the second mapping value are similar to the first mapping value described for FIG. 7D.

Figure 8A:
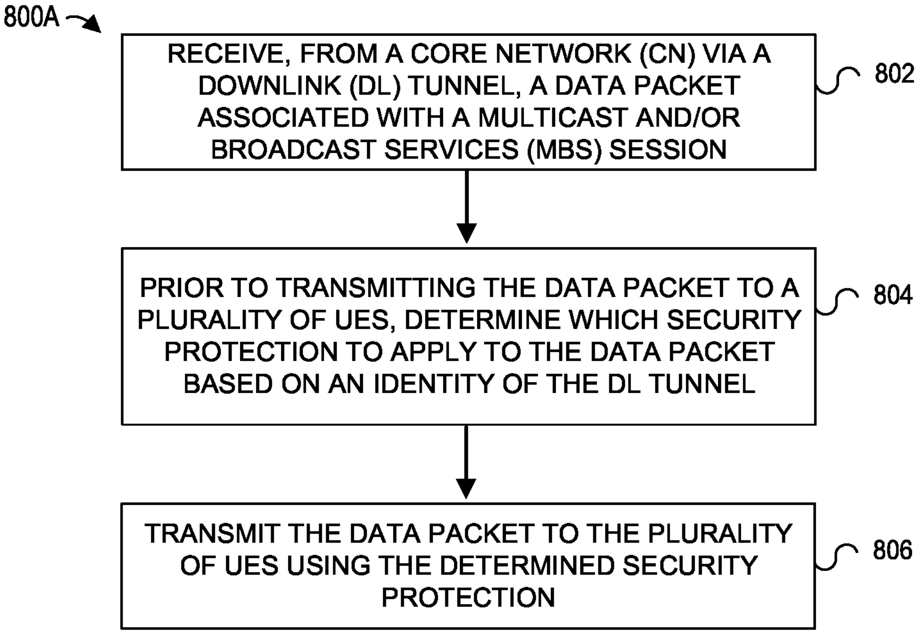
FIG. 8A is a flow diagram of an example method in which a RAN of FIG. 1A or FIG. 1B manages security protection for MBS.

Turning to FIG. 8A, a RAN (e.g., RAN 105, base station 104, base station 106, CU 172) can implement an example method 800A for managing security protection for MBS.

At block 802, the RAN receives, from a CN (e.g., CN 110) via a DL tunnel, a data packet associated with an MBS session (e.g., events or blocks 524, 544, 602).

At block 804, prior to transmitting the data packet to a plurality of UEs (e.g., UE 102A, UE 102B, UE 103), the RAN determines which security protection to apply to the data packet based on an identity (e.g., TEID, IP address) of the DL tunnel (e.g., events or blocks 525, 545, 603, 604, 605, 607). In some implementations, when the RAN determines that the identity of the DL tunnel indicates that the DL tunnel is a common DL tunnel, the RAN can apply a null security protection so that the RAN effectively refrains from applying security protection to the data packet. In other implementations, when the RAN determines that the identity of the DL tunnel indicates that the DL tunnel is a common DL tunnel, the RAN can apply a non-null security protection, such as a common security protection, to the data packet. In yet other implementations, when the RAN determines that the identity of the DL tunnel indicates that the DL tunnel is a UE-specific DL tunnel, the RAN can apply a non-null security protection, such as a UE-specific security protection, to the data packet. The UE-specific security protection in some cases can be a null security protection if the RAN does not require security protection to be applied to the data packet.

At block 806, the RAN transmits the data packet to the plurality of UEs using the security protection determined at block 804 (e.g., events or blocks 526, 528, 546, 548, 608, 609, 612, 613).

Figure 8B:
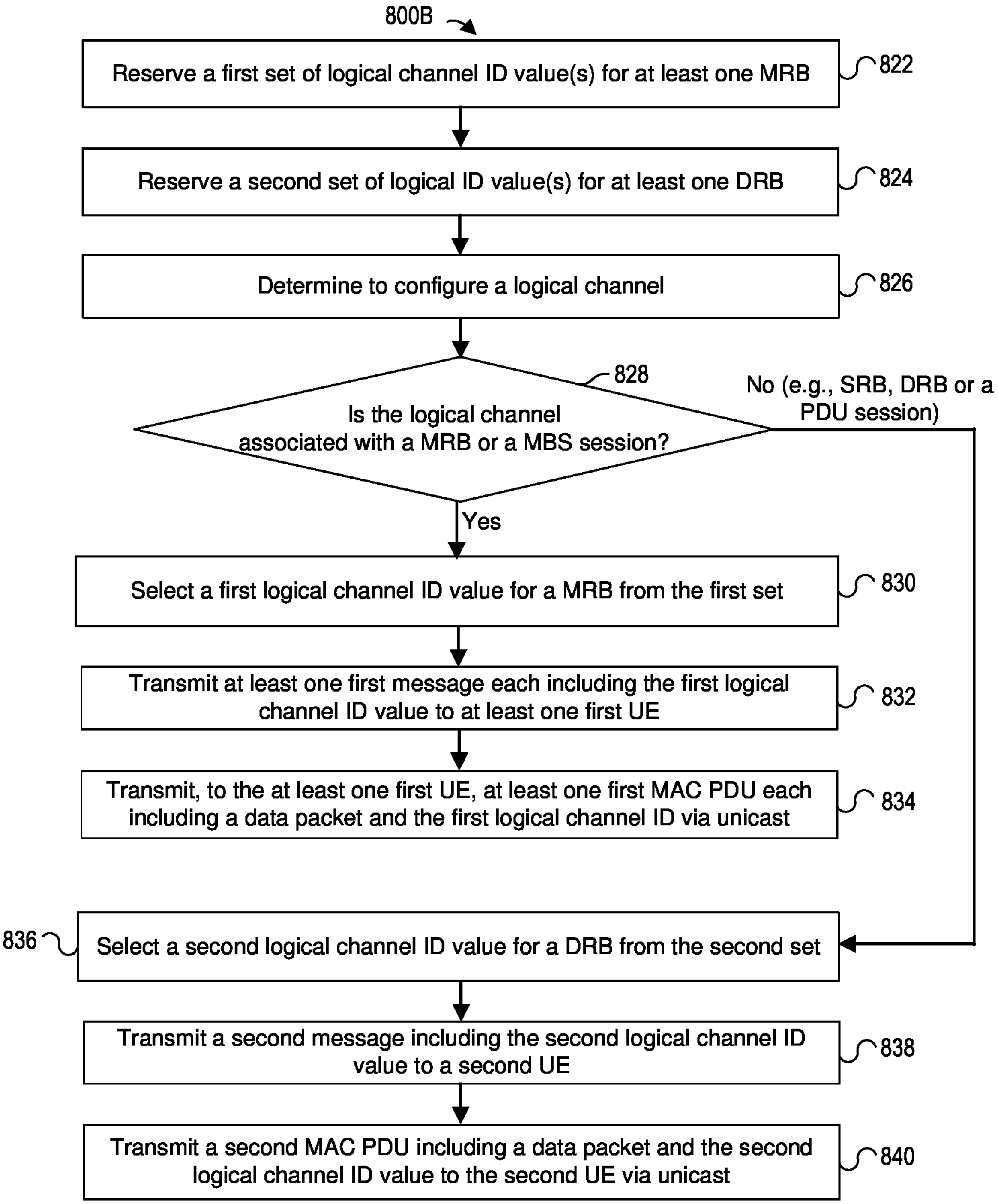
FIG. 8B is a flow diagram of an example method similar to that of FIG. 7D, but according to which a base station also determines whether a logical channel is associated with an MRB or an MBS session.

Turning to FIG. 8B, a RAN (e.g., RAN 105, base station 104, base station 106, DU 174) can implement an example method 800B for managing logical channels for communicating MBS data and non-MBS data. The method 800B is similar to the method 700D. Examples and implementations described for FIG. 7D can apply to FIG. 8B.

The method 800B begins at block 822, where the RAN reserves a first set of logical channel ID value(s) for at least one MRB. At block 824, the RAN reserves a second set of logical ID value(s) for at least one DRB. At block 826, the RAN determines to configure a logical channel. At block 828, the RAN determines whether the logical channel is associated with a MRB or an MBS session. When RAN determines the logical channel is associated with a MRB or a MBS session, the flow proceeds to block 830. At block 830, the RAN selects a first logical channel ID value for the MRB from the first set. At block 832, the RAN transmits at least one first message, each including the first logical channel ID value, to at least one first UE (e.g., events 520, 540, 569). At block 834, the RAN transmits, to the at least one first UE, at least one first MAC PDU each including a data packet and the first logical channel ID via multicast (e.g., events 528, 548, 579).

Otherwise, when UE determines the logical channel is neither associated with a MRB nor an MBS session (e.g., the logical channel is associated with SRB, DRB or a PDU session) at block 808, the flow proceeds to block 836. At block 836, the RAN selects a second logical channel ID value for a DRB from the second set. At block 838, the RAN transmits a second message including the second logical channel ID value to a second UE. At block 840, the RAN transmits a second MAC PDU including a data packet and the second logical channel ID value to the second UE via unicast.

Figure 8C:
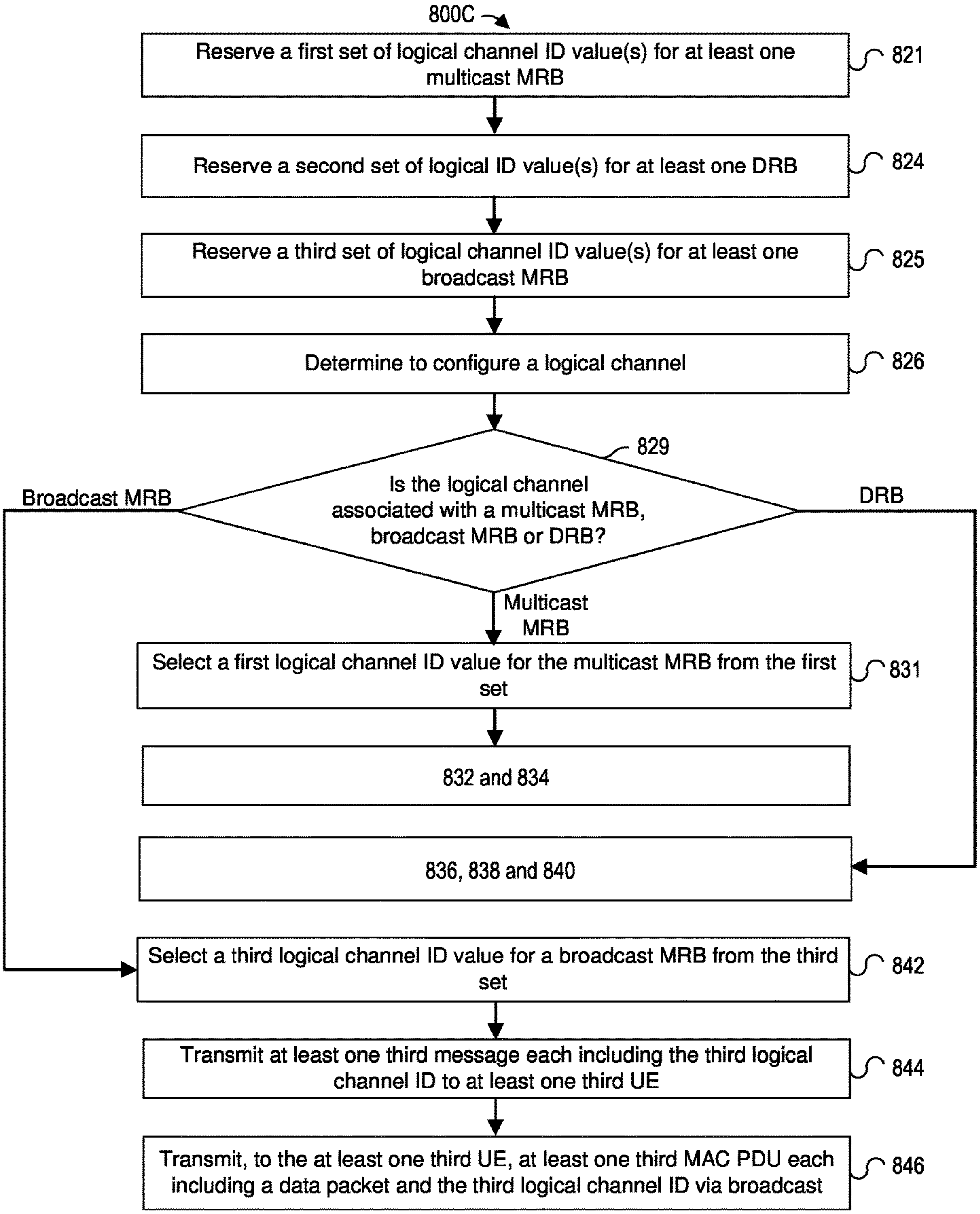
FIG. 8C is a flow diagram of an example method similar to that of FIG. 7E, but according to which a base station also determines whether a logical channel is associated with a multicast MRB, a broadcast MRB, or a DRB.

Turning to FIG. 8C, a method 800C is similar to the methods 800A, 700D, and 700E. Examples and implementations described for FIGS. 7D and 7E can apply to FIG. 8C. The method 800C begins at block 821, where the RAN reserves a first set of logical channel ID value(s) for at least one multicast MRB. Optionally, at block 824, the RAN can reserve a second set of logical ID value(s) for at least one DRB. At block 825, the RAN reserves a third set of logical ID value(s) for at least one broadcast MRB. At block 826, the RAN determines to configure a logical channel. At block 829, the RAN determines whether the logical channel is associated with a multicast MRB, broadcast MRB or DRB. When RAN determines the logical channel is associated with a multicast MRB, the flow proceeds to blocks 831, 832 and 834. At block 831, the RAN selects a first logical channel ID value for the multicast MRB from the first set. At block 832, the RAN transmits at least one first message, each including the first logical channel ID value, to at least one first UE (e.g., events 520, 540). At block 834, the RAN transmits, to the at least one first UE, at least one first MAC PDU each including a data packet and the first logical channel ID via multicast (e.g., events 528, 548).

When UE determines the logical channel is associated with a DRB at block 829, the flow proceeds to blocks 836, 838, and 840. When UE determines the logical channel is associated with a broadcast MRB at block 829, the flow proceeds to blocks 842, 844, and 846. At block 842, the RAN selects a third logical channel ID value for the broadcast MRB from the third set. At block 844, the RAN transmits at least one third message, each including the third logical channel ID value, to at least one third UE. At block 846, the RAN transmits, to the at least one third UE, at least one third MAC PDU, each including a data packet and the third logical channel ID value, to the at least one third UE via broadcast.

Figure 9A:
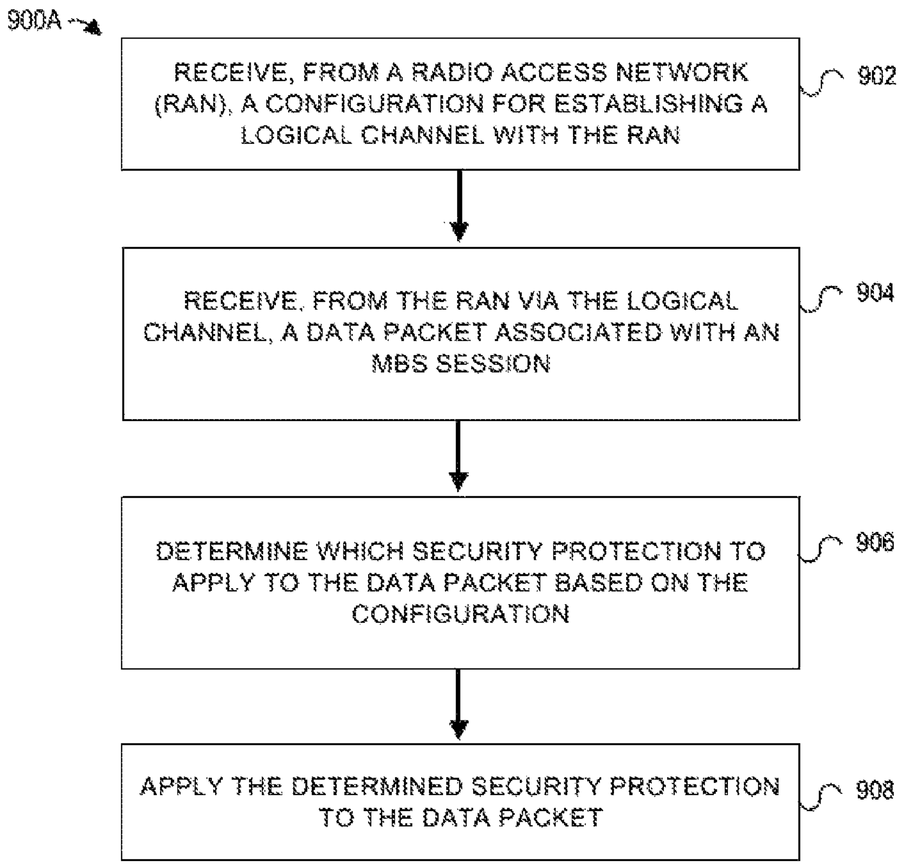
FIG. 9A is a flow diagram of an example method in which a UE of FIG. 1A manages security protection for MBS.

Turning to FIG. 9A, a UE (e.g., UE 102A, UE 102B, UE 103) can implement an example method 900A for managing security protection for MBS.

At block 902, the UE receives, from a RAN (e.g., RAN 105, base station 104, base station 106, CU 172), a configuration for establishing a logical channel with the RAN (e.g., event 520).

At block 904, the UE receives, from the RAN via the logical channel, a data packet associated with an MBS session (e.g., events or blocks 528, 548, 702).

At block 906, the UE determines which security protection to apply to the data packet based on the configuration (e.g., events or blocks 529, 549, 703, 704, 705). In some implementations, when the UE determines that the configuration includes an identity of the logical channel that indicates that the logical channel is a MTCH, the UE can apply a null security protection so that the UE effectively refrains from applying security protection to the data packet. In other implementations, when the UE determines that the configuration includes an identity of the logical channel that indicates that the logical channel is a MTCH, the UE can apply a non-null security protection, such as a common security protection, to the data packet. In yet other implementations, when the UE determines that the configuration includes an identity of the logical channel that indicates that the logical channel is not an MTCH (e.g., instead, a DTCH or DCCH), the UE can apply a non-null security protection, such as a UE-specific security protection, to the data packet. The UE-specific security protection in some cases can be a null security protection if the RAN does not require security protection to be applied to the data packet.

At block 908, the UE applies, to the data packet, the security protection determined at block 906 (e.g., events or blocks 529, 549, 706, 708).

Figure 9B:
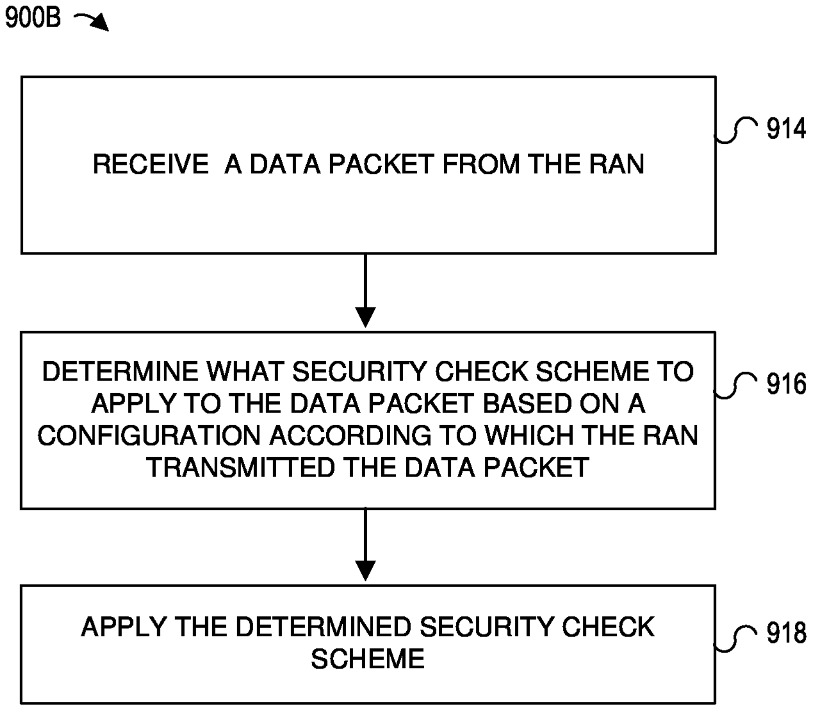
FIG. 9B is a flow diagram of an example method in which a UE of this disclosure performs a security check on a downlink data packet.

Turning to FIG. 9B, a UE (e.g., UE 102A, UE 102B, UE 103) can implement an example method 900B for managing security protection for MBS.

At block 914, the UE receives, from the RAN via the logical channel, a data packet associated with an MBS session (e.g., events or blocks 528, 548, 579, 620). In some implementations, the UE receives, from the RAN, the configuration according to which the data packet is to be received (e.g., events or blocks 520, 540, 567, 569).

At block 916, the UE selects (e.g., events or blocks 529, 549, 624A-624J), from a plurality of security check schemes, a first security check scheme to apply to the data packet based on a configuration according to which the data packet was received 914 from the RAN. In some implementations, when the UE determines that the configuration includes an identity of the logical channel that indicates that the logical channel is a MTCH, the UE can select a security check scheme (e.g., the first security check scheme) that includes a null security protection so that the UE effectively refrains from applying security protection to the data packet. In other implementations, when the UE determines that the configuration includes an identity of the logical channel that indicates that the logical channel is a MTCH, the UE can select a security check scheme (e.g., the first security check scheme) that includes a non-null security protection, such as a common security protection, to the data packet. In yet other implementations, when the UE determines that the configuration includes an identity of the logical channel that indicates that the logical channel is not an MTCH (e.g., instead, a DTCH or DCCH), the UE can select a security check scheme (e.g., the first security check scheme) that includes a non-null security protection, such as a UE-specific security protection, to the data packet. The UE-specific security protection in some cases can be a null security protection if the RAN does not require security protection to be applied to the data packet.

At block 918, the UE applies, to the data packet, the first security check scheme selected at block 916 (e.g., events or blocks 529, 549, 626, 628).

The following additional considerations apply to the foregoing discussion.

In some implementations, "message" is used and can be replaced by "information element (IE)". In some implementations, "IE" is used and can be replaced by "field". In some implementations, "configuration" can be replaced by "configurations" or the configuration parameters. In some implementations, "MBS" can be replaced by "multicast" or "broadcast".

A user device in which the techniques of this disclosure can be implemented (e.g., the UE 102A, 102B, UE 103) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for communicating MBS through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a radio access network (RAN) for managing security protection for multicast and/or broadcast services (MBS), the method comprising:

receiving, by the RAN and from a core network (CN), a data packet associated with an MBS session;

prior to transmitting the data packet to a plurality of UEs, determining, by the RAN, whether the data packet is to be transmitted to the plurality of UEs by using multicast or unicast;

when the data packet associated with the MBS session is to be transmitted to the plurality of UEs by using multicast based on the determining, transmitting, by a first node of the RAN via a second node of the RAN, the data packet to the plurality of UEs or to a UE included in the plurality of UEs using a first security protection of a plurality of security protections, the first node being a first central unit (CU) in a first distributed base station included in the RAN or a first base station, and the second node being a distributed unit (DU) in the distributed base station, a second CU in a second distributed base station, or a second base station; and when the data packet associated with the MBS session is to be transmitted by using unicast based on the determining, transmitting, by the the first node and via the second node, the data packet to the plurality of UEs or to the UE using a second security protection of the plurality of security protections.

2. The method of claim 1, wherein:

the receiving of the data packet from the CN includes receiving the data packet from the CN via a downlink (DL) data tunnel; and the determining of whether the data packet is to be transmitted to the plurality of UEs by using multicast or unicast is based on an identity of the DL data tunnel.

3. The method of claim 2, wherein:

the identity indicates that the DL tunnel is common to the plurality of UEs or that the DL tunnel is specific to only one UE of the plurality of UEs; and the first security protection is a null security protection.

4. The method of claim 2, wherein:

the identity indicates that the DL tunnel is common to the plurality of UEs or that the DL tunnel is specific to only one UE of the plurality of UEs; and the first security protection is a non-null security protection.

5. The method of claim 4, wherein the non-null security protection is a common security protection.

6. The method of claim 1, further comprising at least one of:

determining that the data packet is to be transmitted by using multicast to the plurality of UEs;

determining that the data packet is to be transmitted to the plurality of UEs via an MBS radio bearer (MRB); or determining that the data packet is associated with the MBS session.

7. The method of claim 2, further comprising:

determining that the data packet is to be transmitted to only one UE of the plurality of UEs using unicast; or determining that the data packet is to be transmitted to the only one UE of the plurality of UEs via a data radio bearer (DRB).

8. A method in a user equipment (UE) for managing security checking for multicast and/or broadcast services (MBS), the method comprising:

receiving, by the UE, a configuration from a radio access network (RAN), the configuration for establishing a logical channel with the RAN;

receiving, by the UE from the RAN, a data packet associated with an MBS session;

determining, by the UE and based on the configuration, whether the data packet was received from the RAN via multicast or unicast;

when the data packet associated with the MBS session is determined to have been received from the RAN via multicast, selecting, from a plurality of security check schemes and by the UE, a first security check scheme to apply to the data packet;

when the data packet associated with the MBS session is determined to have been received from the RAN via unicast, selecting, by the UE and from the plurality of security check schemes, a second security check scheme to apply to the data packet; and processing the data packet according to the selected security check scheme.

9. The method of claim 8, wherein the selecting of the first security check scheme includes:

selecting a null security scheme so that the UE refrains from applying any security keys to thereby implement a null-security check; or selecting a non-null security scheme so that the UE applies a security key to the received data packet.

10. The method of claim 9, wherein at least one of:

the security key includes a common security key associated with a multicast and/or broadcast service (MBS) or a UE-specific security key allocated to the UE; or the security key is associated with a decryption procedure or an integrity check procedure.

11. The method of claim 8, wherein:

the configuration includes a group radio network temporary identifier (G-RNTI), an identity that indicates that the logical channel is a multicast traffic channel (MTCH), or an identity that indicates that the logical channel is a dedicated traffic channel (DTCH) or a dedicated control channel (DCCH); and the first security check scheme includes a null security protection.

12. The method of claim 8, wherein:

the configuration includes a G-RNTI, an identity that indicates that the logical channel is an MTCH, or an identity that indicates that the logical channel is a DTCH or a DCCH; and the first security check scheme includes a non-null security protection.

13. The method of claim 12, wherein the non-null security protection is a common security protection.

14. The method of claim 8, wherein the configuration includes an identity that indicates that the logical channel is a dedicated traffic channel (DTCH) or a dedicated control channel (DCCH), and the selecting of the first security check scheme based on the configuration includes selecting the first security check scheme based on the identity.

15. The method of claim 8, wherein the determining of whether the data packet is received from the RAN via multicast or unicast based on the configuration includes determining that the data packet is transmitted from the RAN using unicast.

* * * * *